US012726784B2

(12) United States Patent
Beckhardt

(10) Patent No.: US 12,726,784 B2
(45) Date of Patent: Sep. 1, 2026

(54) WIRELESS MULTI-CHANNEL HEADPHONE SYSTEMS AND METHODS

(71) Applicant: Sonos, Inc., Santa Barbara, CA (US)

(72) Inventor: Steven Beckhardt, Boston, MA (US)

(73) Assignee: Sonos, Inc., Goleta, CA (US)

( * ) Notice: Subject to any disclaimer, the term of this patent is extended or adjusted under 35 U.S.C. 154(b) by 0 days.

(21) Appl. No.: 18/485,065

(22) Filed: Oct. 11, 2023

(65) Prior Publication Data

US 2024/0137726 A1 Apr. 25, 2024
US 2024/0236604 A9 Jul. 11, 2024

Related U.S. Application Data

(63) Continuation of application No. 17/516,391, filed on Nov. 1, 2021, now Pat. No. 11,812,253, which is a
(Continued)

(51) Int. Cl.
*H04S 7/00* (2006.01)
*H04R 1/10* (2026.01)
(Continued)

(52) U.S. Cl.
CPC ........... *H04S 7/304* (2013.01); *H04R 1/1041* (2013.01); *H04R 3/02* (2013.01); *H04R 3/12* (2013.01);
(Continued)

(58) Field of Classification Search
CPC ...... H04S 7/304; H04S 3/008; H04S 2400/01; H04R 1/1041; H04R 1/26; H04R 1/10; H04R 3/02; H04R 3/12; H04R 5/033; H04R 5/04; H04R 2420/07; H04R 2227/005; H04R 2430/01; H04R 27/00; H04R 29/007; G06F 3/162; G06F 3/165; G06F 3/04847;
(Continued)

(56) References Cited

U.S. PATENT DOCUMENTS 5,440,644 A 8/1995 Farinelli et al.
5,761,320 A 6/1998 Farinelli et al.
(Continued)

FOREIGN PATENT DOCUMENTS

EP 1389853 A1 2/2004
JP 2008177893 A * 7/2008
(Continued)

OTHER PUBLICATIONS

AudioTron Quick Start Guide, Version 1.0, Mar. 2001, 24 pages.
(Continued)

*Primary Examiner* — Leshui Zhang
(74) *Attorney, Agent, or Firm* — Akerman LLP

(57) ABSTRACT

Some disclosed systems and methods include a media playback system that includes a network device and a wearable playback device. The media playback system receives, via a hardware interface of the network device, multichannel audio. The media playback system determines a first position of the wearable playback device. The media playback system generates, based on the received multi-channel audio and the determined first position, first audio. The media playback system causes, via the wearable playback device, playback of the generated first audio.

20 Claims, 19 Drawing Sheets

Related U.S. Application Data continuation of application No. 16/415,783, filed on May 17, 2019, now Pat. No. 11,178,504.

(51) Int. Cl.

| | |
|---|---|
| ***H04R 3/02*** | (2006.01) |
| ***H04R 3/12*** | (2006.01) |
| ***H04R 5/033*** | (2006.01) |
| ***H04R 5/04*** | (2006.01) |
| ***H04S 3/00*** | (2006.01) |

(52) U.S. Cl.

CPC ............... *H04R 5/033* (2013.01); *H04R 5/04* (2013.01); *H04S 3/008* (2013.01); *H04R 2420/07* (2013.01); *H04S 2400/01* (2013.01)

(58) Field of Classification Search

CPC .. G06F 16/60; H03G 5/165; H04N 21/21805; H04N 21/43615

USPC .... 381/1–23, 123, 80–85, 300–311, 312, 74, 381/23.1, 61, 96–109; 700/94

See application file for complete search history.

(56) References Cited

U.S. PATENT DOCUMENTS

| | | | | |
|---|---|---|---|---|
| 5,923,902 | A | 7/1999 | Inagaki | |
| 6,032,202 | A | 2/2000 | Lea et al. | |
| 6,256,554 | B1 | 7/2001 | DiLorenzo | |
| 6,404,811 | B1 | 6/2002 | Cvetko et al. | |
| 6,469,633 | B1 | 10/2002 | Wachter | |
| 6,522,886 | B1 | 2/2003 | Youngs et al. | |
| 6,611,537 | B1 | 8/2003 | Edens et al. | |
| 6,631,410 | B1 | 10/2003 | Kowalski et al. | |
| 6,757,517 | B2 | 6/2004 | Chang | |
| 6,778,869 | B2 | 8/2004 | Champion | |
| 7,130,608 | B2 | 10/2006 | Hollstrom et al. | |
| 7,130,616 | B2 | 10/2006 | Janik | |
| 7,143,939 | B2 | 12/2006 | Henzerling | |
| 7,236,773 | B2 | 6/2007 | Thomas | |
| 7,295,548 | B2 | 11/2007 | Blank et al. | |
| 7,391,791 | B2 | 6/2008 | Balassanian et al. | |
| 7,483,538 | B2 | 1/2009 | McCarty et al. | |
| 7,571,014 | B1 | 8/2009 | Lambourne et al. | |
| 7,630,501 | B2 | 12/2009 | Blank et al. | |
| 7,643,894 | B2 | 1/2010 | Braithwaite et al. | |
| 7,657,910 | B1 | 2/2010 | McAulay et al. | |
| 7,853,341 | B2 | 12/2010 | McCarty et al. | |
| 7,987,294 | B2 | 7/2011 | Bryce et al. | |
| 8,014,423 | B2 | 9/2011 | Thaler et al. | |
| 8,045,952 | B2 | 10/2011 | Qureshey et al. | |
| 8,103,009 | B2 | 1/2012 | McCarty et al. | |
| 8,234,395 | B2 | 7/2012 | Millington | |
| 8,483,853 | B1 | 7/2013 | Lambourne | |
| 8,660,055 | B2 | 2/2014 | Ueda et al. | |
| 8,942,252 | B2 | 1/2015 | Balassanian et al. | |
| 9,143,595 | B1 | 9/2015 | Dowd | |
| 2001/0042107 | A1 | 11/2001 | Palm | |
| 2002/0022453 | A1 | 2/2002 | Balog et al. | |
| 2002/0026442 | A1 | 2/2002 | Lipscomb et al. | |
| 2002/0124097 | A1 | 9/2002 | Isely et al. | |
| 2003/0157951 | A1 | 8/2003 | Hasty, Jr. | |
| 2004/0024478 | A1 | 2/2004 | Hans et al. | |
| 2007/0142944 | A1 | 6/2007 | Goldberg et al. | |
| 2007/0253386 | A1 | 11/2007 | Li et al. | |
| 2008/0077261 | A1* | 3/2008 | Baudino | H04M 1/72412 700/94 |
| 2009/0058611 | A1* | 3/2009 | Kawamura | H04W 4/023 704/E11.001 |
| 2011/0150228 | A1 | 6/2011 | Yoon et al. | |
| 2012/0189140 | A1 | 7/2012 | Hughes | |
| 2015/0358754 | A1* | 12/2015 | Koppens | H04S 1/005 381/17 |
| 2016/0073215 | A1* | 3/2016 | De Bruijn | G10L 19/008 381/17 |
| 2016/0080886 | A1* | 3/2016 | De Bruijn | H04S 7/308 381/17 |
| 2016/0100253 | A1* | 4/2016 | Yliaho | H04R 5/02 381/306 |
| 2018/0279050 | A1* | 9/2018 | Ryu | H04L 67/12 |
| 2019/0014424 | A1 | 1/2019 | Lesimple et al. | |
| 2019/0174557 | A1 | 6/2019 | Ueda et al. | |

FOREIGN PATENT DOCUMENTS

| | | |
|---|---|---|
| WO | 200153994 | 7/2001 |
| WO | 2003093950 A2 | 11/2003 |

OTHER PUBLICATIONS

AudioTron Reference Manual, Version 3.0, May 2002, 70 pages.
AudioTron Setup Guide, Version 3.0, May 2002, 38 pages.
Bluetooth. "Specification of the Bluetooth System: The ad hoc SCATTERNET for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
Final Office Action mailed on Apr. 18, 2023, issued in connection with U.S. Appl. No. 17/516,391, filed Nov. 1, 2021, 23 pages.
Final Office Action mailed on May 25, 2021, issued in connection with U.S. Appl. No. 16/415,783, filed May 17, 2019, 27 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Non-Final Office Action mailed on Dec. 3, 2020, issued in connection with U.S. Appl. No. 16/415,783, filed May 17, 2019, 18 pages.
Non-Final Office Action mailed on Nov. 7, 2022, issued in connection with U.S. Appl. No. 17/516,391, filed Nov. 1, 2021, 34 pages.
Notice of Allowance mailed Aug. 6, 2021, issued in connection with U.S. Appl. No. 16/415,783, filed May 17, 2019, 8 pages.
Notice of Allowance mailed on Sep. 7, 2023, issued in connection with U.S. Appl. No. 17/516,391, filed Nov. 1, 2021, 8 pages.
Palm, Inc., "Handbook for the Palm VII Handheld," May 2000, 311 pages.
Restriction Requirement mailed on Mar. 20, 2020, issued in connection with U.S. Appl. No. 16/415,783, filed May 17, 2019, 9 pages.
Restriction Requirement mailed on Jul. 9, 2020, issued in connection with U.S. Appl. No. 16/415,783, filed May 17, 2019, 8 pages.
United States Patent and Trademark Office, U.S. Appl. No. 60/490,768, filed Jul. 28, 2003, entitled "Method for synchronizing audio playback between multiple networked devices," 13 pages.
United States Patent and Trademark Office, U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.

* cited by examiner

WIRELESS MULTI-CHANNEL HEADPHONE SYSTEMS AND METHODS

CROSS REFERENCE TO RELATED APPLICATIONS

This application is a continuation under 35 U.S.C. § 120 of U.S. patent application Ser. No. 17/516,391, filed Nov. 1, 2021, which is a continuation of U.S. patent application Ser. No. 16/415,783, filed on Apr. 17, 2019, and Issued as U.S. Pat. No. 11,178,504 on Nov. 16, 2021. The content of these applications is incorporated herein by reference in its entirety.

FIELD OF THE DISCLOSURE

The present disclosure is related to consumer goods and, more particularly, to methods, systems, products, features, services, and other elements directed to media playback and aspects thereof, including surround sound media.

BACKGROUND

Options for accessing and listening to digital audio in an out-loud setting were limited until in 2002, when SONOS, Inc. began development of a new type of playback system. Sonos then filed one of its first patent applications in 2003, entitled "Method for Synchronizing Audio Playback between Multiple Networked Devices," and began offering its first media playback systems for sale in 2005. The Sonos Wireless Home Sound System enables people to experience music from many sources via one or more networked playback devices. Through a software control application installed on a controller (e.g., smartphone, tablet, computer, voice input device), one can play what she wants in any room having a networked playback device. Media content (e.g., songs, podcasts, video sound) can be streamed to playback devices such that each room with a playback device can play back corresponding different media content. In addition, rooms can be grouped together for synchronous playback of the same media content, and/or the same media content can be heard in all rooms synchronously.

BRIEF DESCRIPTION OF THE DRAWINGS

Features, aspects, and advantages of the presently disclosed technology may be better understood with regard to the following description, appended claims, and accompanying drawings, as listed below. A person skilled in the relevant art will understand that the features shown in the drawings are for purposes of illustrations, and variations, including different and/or additional features and arrangements thereof, are possible.

Figure 1A:
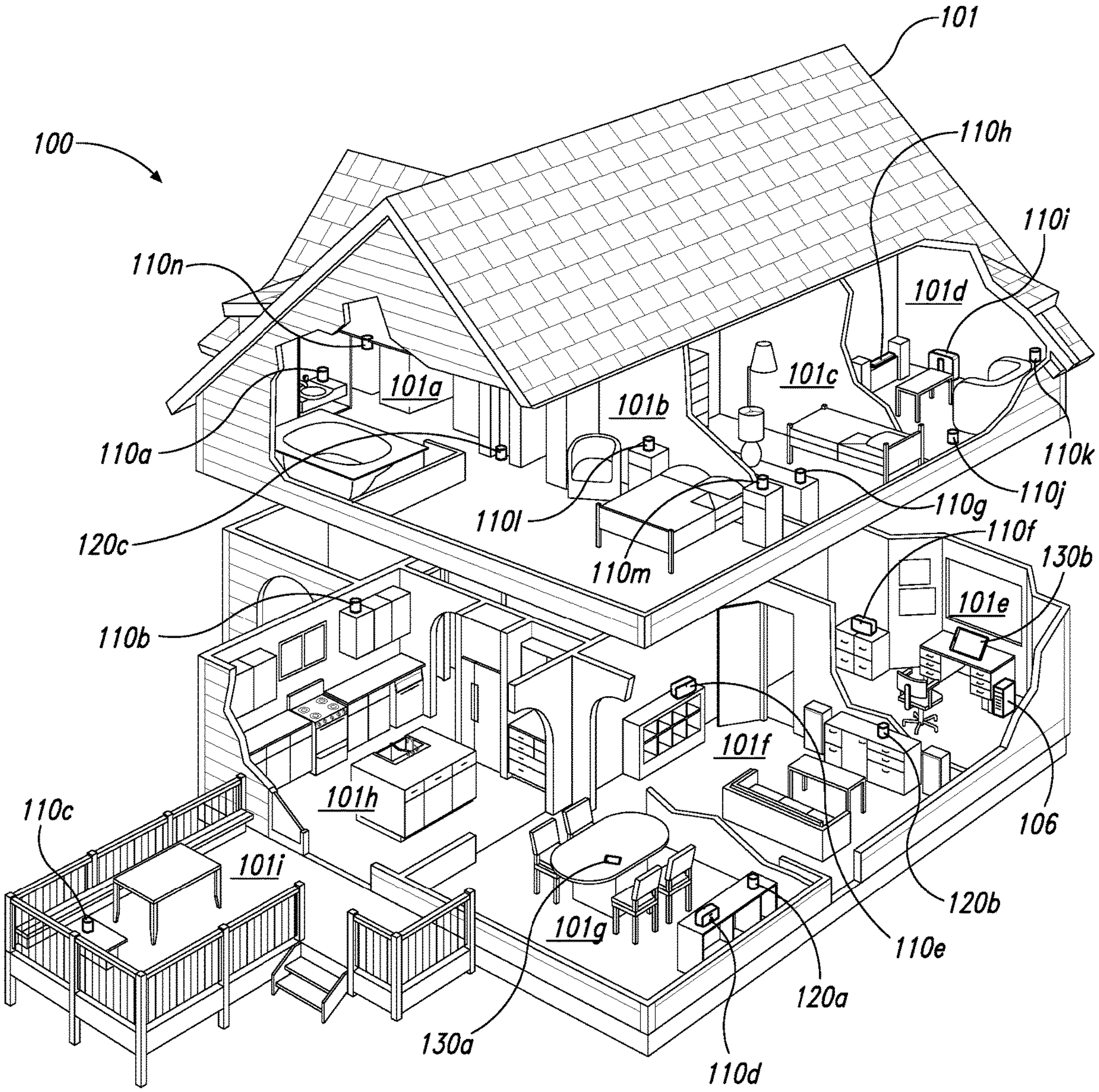
FIG. 1A shows a partial cutaway view of an environment having a media playback system configured in accordance with aspects of the disclosed technology.

The drawings are for the purpose of illustrating example embodiments, but those of ordinary skill in the art will understand that the technology disclosed herein is not limited to the arrangements and/or instrumentality shown in the drawings.

DETAILED DESCRIPTION

I. Overview

Surround sound systems with satellite speakers distributed within a listening area can provide listeners with a highly immersive multimedia experience when (i) listening to music, (ii) playing video games, and/or (iii) watching television, movies, and/or other video or multimedia content. Wireless surround sound systems are desirable because the satellite speakers can be implemented quickly and easily without the need to run speaker cabling throughout the room to connect the satellite speakers to a central surround sound processor, such a soundbar, an audio tuner, audio/video head end, or other central surround sound processor. Additionally, wireless surround sound systems can be upgraded to add more satellites more easily than wired systems because existing satellites can be repurposed/repositioned (e.g., reconfiguring a rear satellite to function as a side satellite) within a room as new satellites are added to the system over time.

Some surround sound systems additionally or alternatively include wireless headphones configured to play multi-channel audio content, including surround sound content that is associated with corresponding video content. For an immersive and enjoyable surround sound experience with wireless headphones, it is desirable for surround sound audio played by a wireless headphone set to be based at least in part on the position of the listener (and thus, the position of the headphone set) relative to a screen configured to display video content corresponding to the surround sound audio. For example, if a first listener is seated to the right of the screen, it is desirable for that first listener's wireless headphones to play surround sound audio content as though the first listener is positioned in the right side of the action on screen, e.g., so that explosions appearing on the left or middle of the screen sound as though they are to the left of the first listener, and explosions on the right side of the screen sound as though they are right in front of or next to the first listener. Similarly, if a second listener is seated to the left of the screen, it is desirable for that second listener's wireless headphones to play surround sound audio content as though the second listener is positioned in the left side of the action on screen, e.g., so that dialog from characters appearing on the right or middle of the screen sound as though they are to the right of the second listener, and dialog on the left side of the screen sounds as though it is right in front of or next to the second listener. It may be desirable in some instances for the multi-channel surround sound system to track or monitor the position of the listener (e.g., by tracking or monitoring the position of the listener's wireless headphone set) relative to the screen so that the surround sound audio generated by the listener's wireless headphone set remains consistent with the listener's position as the listener moves about the room (or perhaps even leaves the room, e.g., to go to the kitchen for a snack) where the screen is located.

To achieve this level of immersion and realism for wireless headphone wearers, the surround sound audio generated and played by the first listener's wireless headphones should be different (at least sound spatially different) than the surround sound audio generated and played by the second listener's wireless headphones. In some embodiments, for each wireless headphone set to play different surround sound audio, the surround sound processor, for each wireless headphone set: (i) generates surround sound audio information for the wireless headphone set and (ii) transmits the generated surround sound audio information to the wireless headphone set.

Various technical challenges arise when generating and transmitting surround sound audio information to multiple wireless headphone sets. In particular, the surround sound controller generates and transmits headphone-specific surround sound audio information to every wireless headphone set, and each wireless headphone set receives, processes, and plays surround sound content sufficiently fast so that viewers/listeners do not experience a "lip sync" delay. The time and wireless spectrum available to distribute content to every headphone set is finite. The surround sound controller and the headphone sets can use higher order wireless Modulation and Coding Schemes (MCS) for distributing surround sound audio information to all the wireless headphone sets. But while higher order MCSs may have greater throughput, they tend to have lower wireless link margin, which can affect wireless range and transmission signal quality.

More particularly, in the context of the disclosed systems, transmitting data at a higher MCS generally enables a surround sound controller to transmit more channel streams comprising surround sound audio information to more headphone sets more quickly (thereby avoiding or at least ameliorating undesirable "lip sync delay") because of the higher data throughput achievable at the higher MCS compared to lower MCSs. However, the higher MCS has lower wireless link margin, and thus, the higher MCS has lower range (i.e., shorter transmission distance) and is less robust when operating in environments having wireless interference, which can increase retransmissions and/or cause audio playback to drop out because of low wireless signal-to-noise ratio. Transmitting data at a lower MCS enables the surround sound processor to transmit channel streams comprising surround sound audio information to headphones with a higher wireless link margin, and thus more reliably, particularly over longer distances and in environments with greater wireless interference. However, the lower data throughput at the lower MCS compared to the higher MCSs reduces the number of headphone sets that the surround sound controller can support simultaneously, at least in embodiments where the surround sound controller is configured to generate and transmit separate channel streams comprising headphone-specific surround sound audio information to each wireless headphone set. To strike a balance between data throughput and wireless link robustness, in some embodiments, the surround sound controller and the headphone sets are configured to use different MCSs based on the number of headphone sets in concurrent operation.

In some embodiments, the systems and methods include a surround sound controller (or perhaps a surround sound controller component of a playback device, e.g., a soundbar) generating and transmitting channel streams comprising surround sound audio information to each set of headphones. In some embodiments, the surround sound controller generates a separate channel stream for each set of headphones based on each set of headphone's position relative to a screen displaying video content corresponding to the surround sound audio content that the surround sound controller transmits to each set of headphones.

In some embodiments, the surround sound controller determines whether it is (or should) operate in one of (i) a first headphone connectivity state, where the surround sound controller is configured to transmit a first channel stream comprising first surround sound audio information to a first pair of headphones, or (ii) a second headphone connectivity state, where the surround sound controller is configured to concurrently transmit (a) the first channel stream comprising the first surround sound audio information to the first pair of headphones and (b) a second channel stream comprising second surround sound audio information to a second pair of headphones. In response to determining that the surround sound controller is operating in the first headphone connectivity state, the surround sound controller uses the first MCS to transmit the first channel stream comprising the first surround sound audio information to the first pair of headphones. And in response to determining that the surround sound controller is operating in the second headphone connectivity state, the surround sound controller uses a second MCS to transmit (a) the first channel stream comprising the first surround sound audio information to the first pair of headphones and (b) the second channel stream comprising the second surround sound audio information to the second pair of headphones. In operation, the first MCS corresponds to a lower data rate at a higher wireless link margin than the second MCS.

In some embodiments, an individual pair of headphones is configured to perform functions in cooperation with the above-described surround sound controller functions. For example, in some embodiments, an individual pair of headphones receives a message from a surround sound controller associated with the pair of headphones. In some embodiments, the message indicates that the surround sound controller is configured in one of (i) a first headphone connectivity state or (ii) a second headphone connectivity state. In response to the message comprising an indication that the surround sound controller is configured in the first headphone connectivity state, the headphone set configures itself to receive a channel stream comprising surround sound audio information encoded via the first MCS from the surround sound controller. And in response to the message comprising an indication that the surround sound controller is configured in the second headphone connectivity state, the headphone set configures itself to receive a channel stream comprising surround sound audio information encoded via a second MCS from the surround sound controller.

While some examples described herein may refer to functions performed by given actors such as "users," "listeners," and/or other entities, it should be understood that this is for purposes of explanation only. The claims should not be interpreted to require action by any such example actor unless explicitly required by the language of the claims themselves.

In the figures, identical reference numbers identify generally similar, and/or identical, elements. To facilitate the discussion of any particular element, the most significant digit or digits of a reference number refers to the Figure in which that element is first introduced. For example, element 110*a* is first introduced and discussed with reference to FIG. 1A. Many of the details, dimensions, angles and other features shown in the Figures are merely illustrative of particular embodiments of the disclosed technology. Accordingly, other embodiments can have other details, dimensions, angles and features without departing from the spirit or scope of the disclosure. In addition, those of ordinary skill in the art will appreciate that further embodiments of the various disclosed technologies can be practiced without several of the details described below.

II. Suitable Operating Environment

FIG. 1A is a partial cutaway view of a media playback system 100 distributed in an environment 101 (e.g., a house). The media playback system 100 comprises one or more playback devices 110 (identified individually as playback devices 110*a-n*), one or more network microphone devices ("NMDs"), 120 (identified individually as NMDs 120*a-c*), and one or more control devices 130 (identified individually as control devices 130*a* and 130*b*).

As used herein the term "playback device" can generally refer to a network device configured to receive, process, and output data of a media playback system. For example, a playback device can be a network device that receives and processes audio content. In some embodiments, a playback device includes one or more transducers or speakers powered by one or more amplifiers. In other embodiments, however, a playback device includes one of (or neither of) the speaker and the amplifier. For instance, a playback device can comprise one or more amplifiers configured to drive one or more speakers external to the playback device via a corresponding wire or cable.

Moreover, as used herein the term NMD (i.e., a "network microphone device") can generally refer to a network device that is configured for audio detection. In some embodiments, an NMD is a stand-alone device configured primarily for audio detection. In other embodiments, an NMD is incorporated into a playback device (or vice versa).

The term "control device" can generally refer to a network device configured to perform functions relevant to facilitating user access, control, and/or configuration of the media playback system 100.

Each of the playback devices 110 is configured to receive audio signals or data from one or more media sources (e.g., one or more remote servers, one or more local devices) and play back the received audio signals or data as sound. The one or more NMDs 120 are configured to receive spoken word commands, and the one or more control devices 130 are configured to receive user input. In response to the received spoken word commands and/or user input, the media playback system 100 can play back audio via one or more of the playback devices 110. In certain embodiments, the playback devices 110 are configured to commence playback of media content in response to a trigger. For instance, one or more of the playback devices 110 can be configured to play back a morning playlist upon detection of an associated trigger condition (e.g., presence of a user in a kitchen, detection of a coffee machine operation). In some embodiments, for example, the media playback system 100 is configured to play back audio from a first playback device (e.g., the playback device 100*a*) in synchrony with a second playback device (e.g., the playback device 100*b*). Interactions between the playback devices 110, NMDs 120, and/or control devices 130 of the media playback system 100 configured in accordance with the various embodiments of the disclosure are described in greater detail below with respect to FIGS. 1B-1L.

In the illustrated embodiment of FIG. 1A, the environment 101 comprises a household having several rooms, spaces, and/or playback zones, including (clockwise from upper left) a master bathroom 101*a*, a master bedroom 101*b*, a second bedroom 101*c*, a family room or den 101*d*, an office 101*e*, a living room 101*f*, a dining room 101*g*, a kitchen 101*h*, and an outdoor patio 101*i*. While certain embodiments and examples are described below in the context of a home environment, the technologies described herein may be implemented in other types of environments. In some embodiments, for example, the media playback system 100 can be implemented in one or more commercial settings (e.g., a restaurant, mall, airport, hotel, a retail or other store), one or more vehicles (e.g., a sports utility vehicle, bus, car, a ship, a boat, an airplane), multiple environments (e.g., a combination of home and vehicle environments), and/or another suitable environment where multi-zone audio may be desirable.

The media playback system 100 can comprise one or more playback zones, some of which may correspond to the rooms in the environment 101. The media playback system 100 can be established with one or more playback zones, after which additional zones may be added, or removed to form, for example, the configuration shown in FIG. 1A. Each zone may be given a name according to a different room or space such as the office 101*e*, master bathroom 101*a*, master bedroom 101*b*, the second bedroom 101*c*, kitchen 101*h*, dining room 101*g*, living room 101*f*, and/or the patio 101*i*. In some aspects, a single playback zone may include multiple rooms or spaces. In certain aspects, a single room or space may include multiple playback zones.

In the illustrated embodiment of FIG. 1A, the master bathroom 101*a*, the second bedroom 101*c*, the office 101*e*, the living room 101*f*, the dining room 101*g*, the kitchen

101*h*, and the outdoor patio 101*i* each include one playback device 110, and the master bedroom 101*b* and the den 101*d* include a plurality of playback devices 110. In the master bedroom 101*b*, the playback devices 110*l* and 110*m* may be configured, for example, to play back audio content in synchrony as individual ones of playback devices 110, as a bonded playback zone, as a consolidated playback device, and/or any combination thereof. Similarly, in the den 101*d*, the playback devices 110*h-j* can be configured, for instance, to play back audio content in synchrony as individual ones of playback devices 110, as one or more bonded playback devices, and/or as one or more consolidated playback devices. Additional details regarding bonded and consolidated playback devices are described below with respect to, for example, FIGS. 1B and 1E and 1I-1M.

In some aspects, one or more of the playback zones in the environment 101 may each be playing different audio content. For instance, a user may be grilling on the patio 101*i* and listening to hip hop music being played by the playback device 110*c* while another user is preparing food in the kitchen 101*h* and listening to classical music played by the playback device 110*b*. In another example, a playback zone may play the same audio content in synchrony with another playback zone. For instance, the user may be in the office 101*e* listening to the playback device 110*f* playing back the same hip hop music being played back by playback device 110*c* on the patio 101*i*. In some aspects, the playback devices 110*c* and 110*f* play back the hip hop music in synchrony such that the user perceives that the audio content is being played seamlessly (or at least substantially seamlessly) while moving between different playback zones. Additional details regarding audio playback synchronization among playback devices and/or zones can be found, for example, in U.S. Pat. No. 8,234,395 entitled, "System and method for synchronizing operations among a plurality of independently clocked digital data processing devices," which is incorporated herein by reference in its entirety.

a. Suitable Media Playback System

Figure 1B:
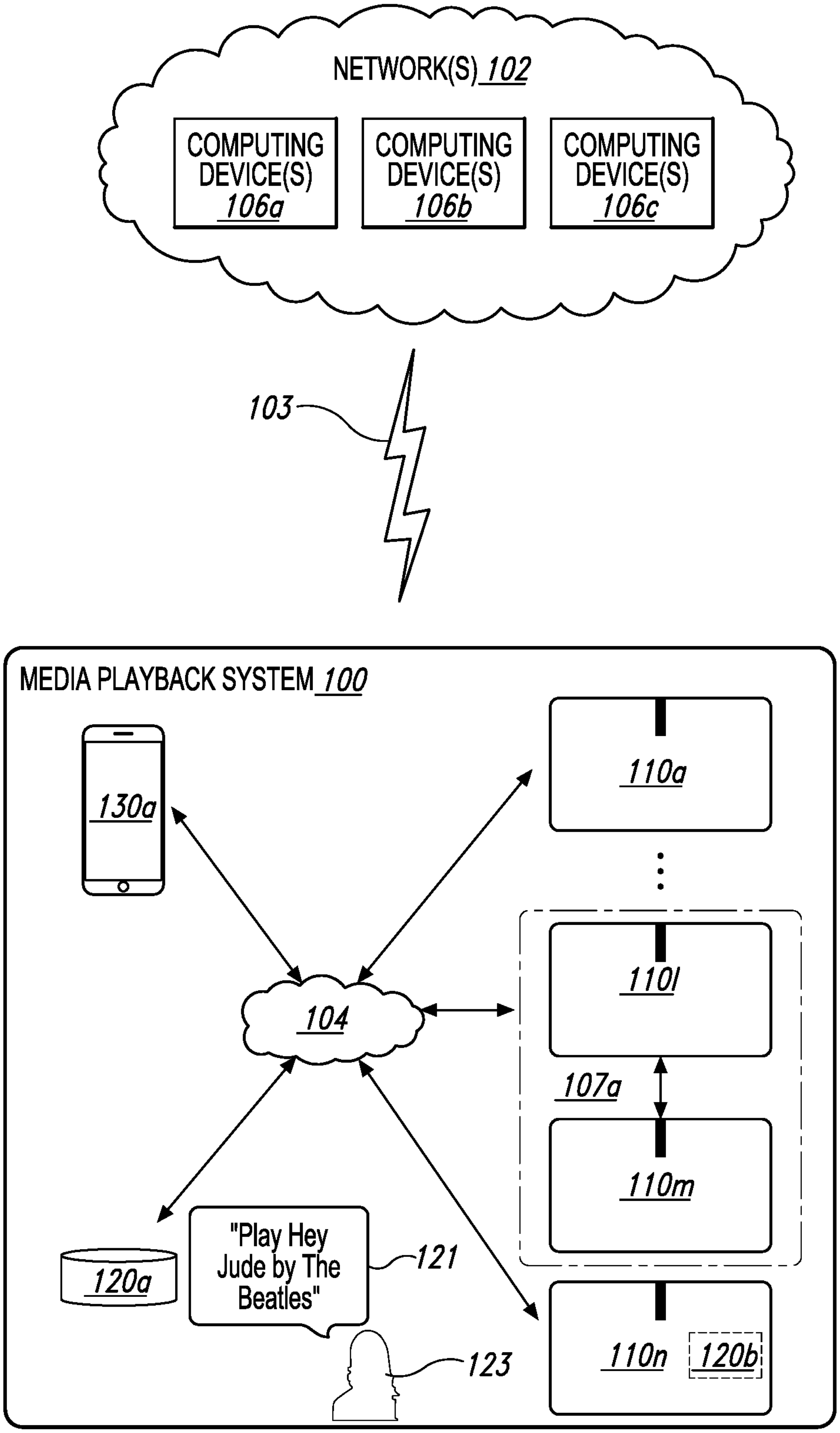
FIG. 1B shows a schematic diagram of the media playback system of FIG. 1A and one or more networks.

FIG. 1B is a schematic diagram of the media playback system 100 and a cloud network 102. For ease of illustration, certain devices of the media playback system 100 and the cloud network 102 are omitted from FIG. 1B. One or more communication links 103 (referred to hereinafter as "the links 103") communicatively couple the media playback system 100 and the cloud network 102.

The links 103 can comprise, for example, one or more wired networks, one or more wireless networks, one or more wide area networks (WAN), one or more local area networks (LAN), one or more personal area networks (PAN), one or more telecommunication networks (e.g., one or more Global System for Mobiles (GSM) networks, Code Division Multiple Access (CDMA) networks, Long-Term Evolution (LTE) networks, 5G communication network networks, and/or other suitable data transmission protocol networks), etc. The cloud network 102 is configured to deliver media content (e.g., audio content, video content, photographs, social media content) to the media playback system 100 in response to a request transmitted from the media playback system 100 via the links 103. In some embodiments, the cloud network 102 is further configured to receive data (e.g. voice input data) from the media playback system 100 and correspondingly transmit commands and/or media content to the media playback system 100.

The cloud network 102 comprises computing devices 106 (identified separately as a first computing device 106*a*, a second computing device 106*b*, and a third computing device 106*c*). The computing devices 106 can comprise individual computers or servers, such as, for example, a media streaming service server storing audio and/or other media content, a voice service server, a social media server, a media playback system control server, etc. In some embodiments, one or more of the computing devices 106 comprise modules of a single computer or server. In certain embodiments, one or more of the computing devices 106 comprise one or more modules, computers, and/or servers. Moreover, while the cloud network 102 is described above in the context of a single cloud network, in some embodiments the cloud network 102 comprises a plurality of cloud networks comprising communicatively coupled computing devices. Furthermore, while the cloud network 102 is shown in FIG. 1B as having three of the computing devices 106, in some embodiments, the cloud network 102 comprises fewer (or more than) three computing devices 106.

The media playback system 100 is configured to receive media content from the networks 102 via the links 103. The received media content can comprise, for example, a Uniform Resource Identifier (URI) and/or a Uniform Resource Locator (URL). For instance, in some examples, the media playback system 100 can stream, download, or otherwise obtain data from a URI or a URL corresponding to the received media content. A network 104 communicatively couples the links 103 and at least a portion of the devices (e.g., one or more of the playback devices 110, NMDs 120, and/or control devices 130) of the media playback system 100. The network 104 can include, for example, a wireless network (e.g., a WIFI network, a BLUETOOTH, a Z-Wave network, a ZIGBEE, and/or other suitable wireless communication protocol network) and/or a wired network (e.g., a network comprising Ethernet, Universal Serial Bus (USB), and/or another suitable wired communication). As those of ordinary skill in the art will appreciate, as used herein, "WIFI" can refer to several different communication protocols including, for example, Institute of Electrical and Electronics Engineers (IEEE) 802.11a, 802.11b, 802.11 g, 802.11n, 802.11ac, 802.11ac, 802.11ad, 802.11af, 802.11ah, 802.11ai, 802.11aj, 802.11aq, 802.11ax, 802.11ay, 802.15, etc. transmitted at 2.4 Gigahertz (GHz), 5 GHZ, and/or another suitable frequency.

In some embodiments, the network 104 comprises a dedicated communication network that the media playback system 100 uses to transmit messages between individual devices and/or to transmit media content to and from media content sources (e.g., one or more of the computing devices 106). In certain embodiments, the network 104 is configured to be accessible only to devices in the media playback system 100, thereby reducing interference and competition with other household devices. In other embodiments, however, the network 104 comprises an existing household communication network (e.g., a household WIFI network). In some embodiments, the links 103 and the network 104 comprise one or more of the same networks. In some aspects, for example, the links 103 and the network 104 comprise a telecommunication network (e.g., an LTE network, a 5G network). Moreover, in some embodiments, the media playback system 100 is implemented without the network 104, and devices comprising the media playback system 100 can communicate with each other, for example, via one or more direct connections, PANs, telecommunication networks, and/or other suitable communication links.

In some embodiments, audio content sources may be regularly added or removed from the media playback system 100. In some embodiments, for example, the media playback system 100 performs an indexing of media items when one or more media content sources are updated, added to, and/or removed from the media playback system 100. The media playback system 100 can scan identifiable media items in some or all folders and/or directories accessible to the playback devices 110, and generate or update a media content database comprising metadata (e.g., title, artist, album, track length) and other associated information (e.g., URIs, URLs) for each identifiable media item found. In some embodiments, for example, the media content database is stored on one or more of the playback devices 110, network microphone devices 120, and/or control devices 130.

In the illustrated embodiment of FIG. 1B, the playback devices 110*l* and 110*m* comprise a group 107*a*. The playback devices 110*l* and 110*m* can be positioned in different rooms in a household and be grouped together in the group 107*a* on a temporary or permanent basis based on user input received at the control device 130*a* and/or another control device 130 in the media playback system 100. When arranged in the group 107*a*, the playback devices 110*l* and 110*m* can be configured to play back the same or similar audio content in synchrony from one or more audio content sources. In certain embodiments, for example, the group 107*a* comprises a bonded zone in which the playback devices 110*l* and 110*m* comprise left audio and right audio channels, respectively, of multi-channel audio content, thereby producing or enhancing a stereo effect of the audio content. In some embodiments, the group 107*a* includes additional playback devices 110. In other embodiments, however, the media playback system 100 omits the group 107*a* and/or other grouped arrangements of the playback devices 110. Additional details regarding groups and other arrangements of playback devices are described in further detail below with respect to FIGS. 1-I through IM.

The media playback system 100 includes the NMDs 120*a* and 120*d*, each comprising one or more microphones configured to receive voice utterances from a user. In the illustrated embodiment of FIG. 1B, the NMD 120*a* is a standalone device and the NMD 120*d* is integrated into the playback device 110*n*. The NMD 120*a*, for example, is configured to receive voice input 121 from a user 123. In some embodiments, the NMD 120*a* transmits data associated with the received voice input 121 to a voice assistant service (VAS) configured to (i) process the received voice input data and (ii) transmit a corresponding command to the media playback system 100. In some aspects, for example, the computing device 106*c* comprises one or more modules and/or servers of a VAS (e.g., a VAS operated by one or more of SONOS®, AMAZON®, GOOGLE® APPLE®, MICROSOFT®). The computing device 106*c* can receive the voice input data from the NMD 120*a* via the network 104 and the links 103. In response to receiving the voice input data, the computing device 106*c* processes the voice input data (i.e., “Play Hey Jude by The Beatles”), and determines that the processed voice input includes a command to play a song (e.g., “Hey Jude”). The computing device 106*c* accordingly transmits commands to the media playback system 100 to play back “Hey Jude” by the Beatles from a suitable media service (e.g., via one or more of the computing devices 106) on one or more of the playback devices 110.

b. Suitable Playback Devices

Figure 1C:
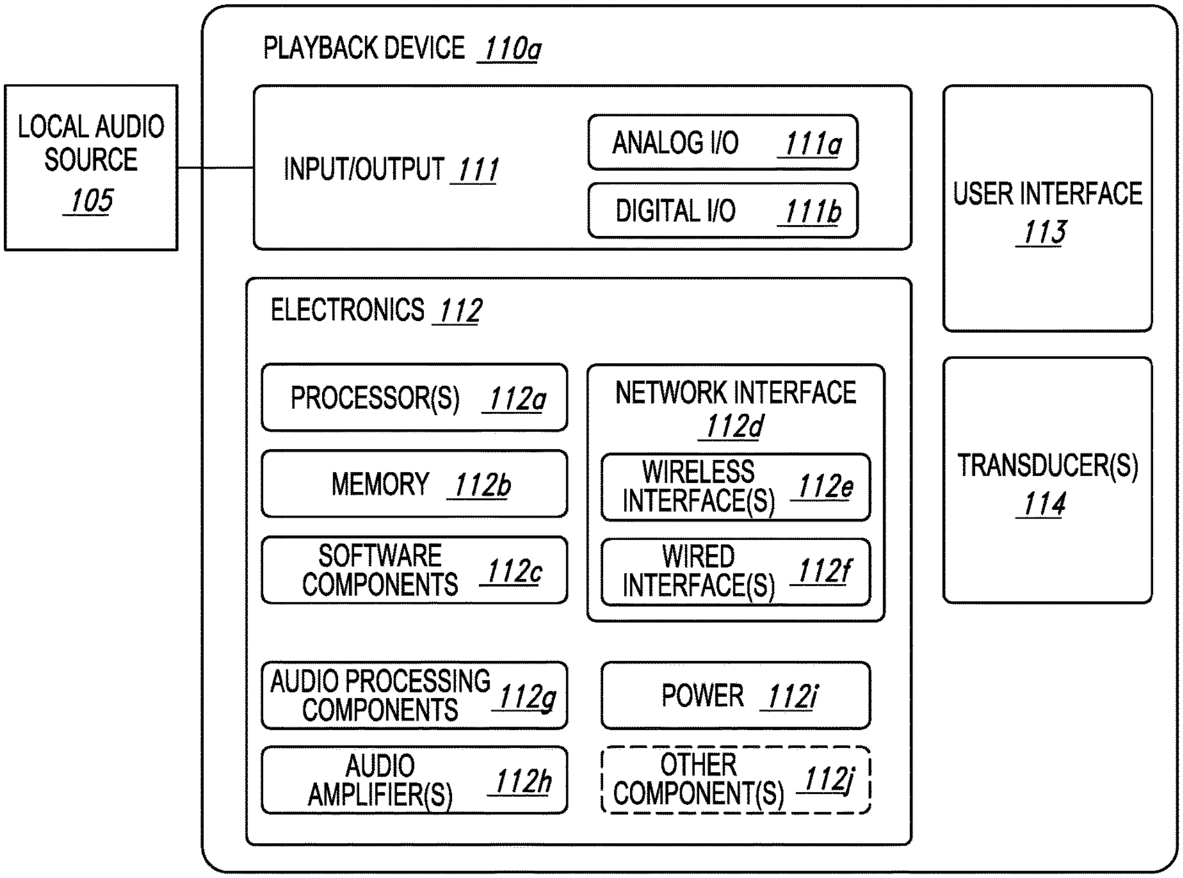
FIG. 1C shows a block diagram of a playback device.

FIG. 1C is a block diagram of the playback device 110*a* comprising an input/output 111. The input/output 111 can include an analog I/O 111*a* (e.g., one or more wires, cables, and/or other suitable communication links configured to carry analog signals) and/or a digital I/O 111*b* (e.g., one or more wires, cables, or other suitable communication links configured to carry digital signals). In some embodiments, the analog I/O 111*a* is an audio line-in input connection comprising, for example, an auto-detecting 3.5 mm audio line-in connection. In some embodiments, the digital I/O 111*b* comprises a Sony/Philips Digital Interface Format (S/PDIF) communication interface and/or cable and/or a Toshiba Link (TOSLINK) cable. In some embodiments, the digital I/O 111*b* comprises an High-Definition Multimedia Interface (HDMI) interface and/or cable. In some embodiments, the digital I/O 111*b* includes one or more wireless communication links comprising, for example, a radio frequency (RF), infrared, WIFI, BLUETOOTH, or another suitable communication protocol. In certain embodiments, the analog I/O 111*a* and the digital I/O 111*b* comprise interfaces (e.g., ports, plugs, jacks) configured to receive connectors of cables transmitting analog and digital signals, respectively, without necessarily including cables.

The playback device 110*a*, for example, can receive media content (e.g., audio content comprising music and/or other sounds) from a local audio source 105 via the input/output 111 (e.g., a cable, a wire, a PAN, a BLUETOOTH connection, an ad hoc wired or wireless communication network, and/or another suitable communication link). The local audio source 105 can comprise, for example, a mobile device (e.g., a smartphone, a tablet, a laptop computer) or another suitable audio component (e.g., a television, a desktop computer, an amplifier, a phonograph, a Blu-ray player, a memory storing digital media files). In some aspects, the local audio source 105 includes local music libraries on a smartphone, a computer, a networked-attached storage (NAS), and/or another suitable device configured to store media files. In certain embodiments, one or more of the playback devices 110, NMDs 120, and/or control devices 130 comprise the local audio source 105. In other embodiments, however, the media playback system omits the local audio source 105 altogether. In some embodiments, the playback device 110*a* does not include an input/output 111 and receives all audio content via the network 104.

The playback device 110*a* further comprises electronics 112, a user interface 113 (e.g., one or more buttons, knobs, dials, touch-sensitive surfaces, displays, touchscreens), and one or more transducers 114 (referred to hereinafter as “the transducers 114”). The electronics 112 is configured to receive audio from an audio source (e.g., the local audio source 105) via the input/output 111, one or more of the computing devices 106*a-c* via the network 104 (FIG. 1B)), amplify the received audio, and output the amplified audio for playback via one or more of the transducers 114. In some embodiments, the playback device 110*a* optionally includes one or more microphones 115 (e.g., a single microphone, a plurality of microphones, a microphone array) (hereinafter referred to as “the microphones 115”). In certain embodiments, for example, the playback device 110*a* having one or more of the optional microphones 115 can operate as an NMD configured to receive voice input from a user and correspondingly perform one or more operations based on the received voice input.

In the illustrated embodiment of FIG. 1C, the electronics 112 comprise one or more processors 112*a* (referred to hereinafter as “the processors 112*a*”), memory 112*b*, software components 112*c*, a network interface 112*d*, one or more audio processing components 112*g* (referred to hereinafter as “the audio components 112*g*”), one or more audio amplifiers 112*h* (referred to hereinafter as “the amplifiers 112*h*”), and power 112*i* (e.g., one or more power supplies, power cables, power receptacles, batteries, induction coils, Power-over Ethernet (POE) interfaces, and/or other suitable sources of electric power). In some embodiments, the electronics 112 optionally include one or more other components 112*j* (e.g., one or more sensors, video displays, touchscreens, battery charging bases).

The processors 112*a* can comprise clock-driven computing component(s) configured to process data, and the memory 112*b* can comprise a computer-readable medium (e.g., a tangible, non-transitory computer-readable medium, data storage loaded with one or more of the software components 112*c*) configured to store instructions for performing various operations and/or functions. The processors 112*a* are configured to execute the instructions stored on the memory 112*b* to perform one or more of the operations. The operations can include, for example, causing the playback device 110*a* to retrieve audio data from an audio source (e.g., one or more of the computing devices 106*a-c* (FIG. 1B)), and/or another one of the playback devices 110. In some embodiments, the operations further include causing the playback device 110*a* to send audio data to another one of the playback devices 110*a* and/or another device (e.g., one of the NMDs 120). Certain embodiments include operations causing the playback device 110*a* to pair with another of the one or more playback devices 110 to enable a multi-channel audio environment (e.g., a stereo pair, a bonded zone).

The processors 112*a* can be further configured to perform operations causing the playback device 110*a* to synchronize playback of audio content with another of the one or more playback devices 110. As those of ordinary skill in the art will appreciate, during synchronous playback of audio content on a plurality of playback devices, a listener will preferably be unable to perceive time-delay differences between playback of the audio content by the playback device 110*a* and the other one or more other playback devices 110. Additional details regarding audio playback synchronization among playback devices can be found, for example, in U.S. Pat. No. 8,234,395, which was incorporated by reference above.

In some embodiments, the memory 112*b* is further configured to store data associated with the playback device 110*a*, such as one or more zones and/or zone groups of which the playback device 110*a* is a member, audio sources accessible to the playback device 110*a*, and/or a playback queue that the playback device 110*a* (and/or another of the one or more playback devices) can be associated with. The stored data can comprise one or more state variables that are periodically updated and used to describe a state of the playback device 110*a*. The memory 112*b* can also include data associated with a state of one or more of the other devices (e.g., the playback devices 110, NMDs 120, control devices 130) of the media playback system 100. In some aspects, for example, the state data is shared during predetermined intervals of time (e.g., every 5 seconds, every 10 seconds, every 60 seconds) among at least a portion of the devices of the media playback system 100, so that one or more of the devices have the most recent data associated with the media playback system 100.

The network interface 112*d* is configured to facilitate a transmission of data between the playback device 110*a* and one or more other devices on a data network such as, for example, the links 103 and/or the network 104 (FIG. 1B). The network interface 112*d* is configured to transmit and receive data corresponding to media content (e.g., audio content, video content, text, photographs) and other signals (e.g., non-transitory signals) comprising digital packet data including an Internet Protocol (IP)-based source address and/or an IP-based destination address. The network interface 112*d* can parse the digital packet data such that the electronics 112 properly receives and processes the data destined for the playback device 110*a*.

In the illustrated embodiment of FIG. 1C, the network interface 112*d* comprises one or more wireless interfaces 112*e* (referred to hereinafter as "the wireless interface 112*e*"). The wireless interface 112*e* (e.g., a suitable interface comprising one or more antennae) can be configured to wirelessly communicate with one or more other devices (e.g., one or more of the other playback devices 110, NMDs 120, and/or control devices 130) that are communicatively coupled to the network 104 (FIG. 1B) in accordance with a suitable wireless communication protocol (e.g., WIFI, BLUETOOTH, LTE). In some embodiments, the network interface 112*d* optionally includes a wired interface 112*f* (e.g., an interface or receptacle configured to receive a network cable such as an Ethernet, a USB-A, USB-C, and/or Thunderbolt cable) configured to communicate over a wired connection with other devices in accordance with a suitable wired communication protocol. In certain embodiments, the network interface 112*d* includes the wired interface 112*f* and excludes the wireless interface 112*e*. In some embodiments, the electronics 112 excludes the network interface 112*d* altogether and transmits and receives media content and/or other data via another communication path (e.g., the input/output 111).

The audio processing components 112*g* are configured to process and/or filter data comprising media content received by the electronics 112 (e.g., via the input/output 111 and/or the network interface 112*d*) to produce output audio signals. In some embodiments, the audio processing components 112*g* comprise, for example, one or more digital-to-analog converters (DAC), audio preprocessing components, audio enhancement components, a digital signal processors (DSPs), and/or other suitable audio processing components, modules, circuits, etc. In certain embodiments, one or more of the audio processing components 112*g* can comprise one or more subcomponents of the processors 112*a*. In some embodiments, the electronics 112 omits the audio processing components 112*g*. In some aspects, for example, the processors 112*a* execute instructions stored on the memory 112*b* to perform audio processing operations to produce the output audio signals.

The amplifiers 112*h* are configured to receive and amplify the audio output signals produced by the audio processing components 112*g* and/or the processors 112*a*. The amplifiers 112*h* can comprise electronic devices and/or components configured to amplify audio signals to levels sufficient for driving one or more of the transducers 114. In some embodiments, for example, the amplifiers 112*h* include one or more switching or class-D power amplifiers. In other embodiments, however, the amplifiers include one or more other types of power amplifiers (e.g., linear gain power amplifiers, class-A amplifiers, class-B amplifiers, class-AB amplifiers, class-C amplifiers, class-D amplifiers, class-E amplifiers, class-F amplifiers, class-G and/or class H amplifiers, and/or another suitable type of power amplifier). In certain embodiments, the amplifiers 112*h* comprise a suitable combination of two or more of the foregoing types of power amplifiers. Moreover, in some embodiments, individual ones of the amplifiers 112*h* correspond to individual ones of the transducers 114. In other embodiments, however, the electronics 112 includes a single one of the amplifiers 112*h* configured to output amplified audio signals to a plurality of the transducers 114. In some other embodiments, the electronics 112 omits the amplifiers 112*h*.

The transducers 114 (e.g., one or more speakers and/or speaker drivers) receive the amplified audio signals from the amplifier 112*h* and render or output the amplified audio signals as sound (e.g., audible sound waves having a frequency between about 20 Hertz (Hz) and 20 kilohertz (kHz)). In some embodiments, the transducers 114 can comprise a single transducer. In other embodiments, however, the transducers 114 comprise a plurality of audio transducers. In some embodiments, the transducers 114 comprise more than one type of transducer. For example, the transducers 114 can include one or more low frequency transducers (e.g., subwoofers, woofers), mid-range frequency transducers (e.g., mid-range transducers, mid-woofers), and one or more high frequency transducers (e.g., one or more tweeters). As used herein, "low frequency" can generally refer to audible frequencies below about 500 Hz, "mid-range frequency" can generally refer to audible frequencies between about 500 Hz and about 2 kHz, and "high frequency" can generally refer to audible frequencies above 2 kHz. In certain embodiments, however, one or more of the transducers 114 comprise transducers that do not adhere to the foregoing frequency ranges. For example, one of the transducers 114 may comprise a mid-woofer transducer configured to output sound at frequencies between about 200 Hz and about 5 kHz.

Figure 1D:
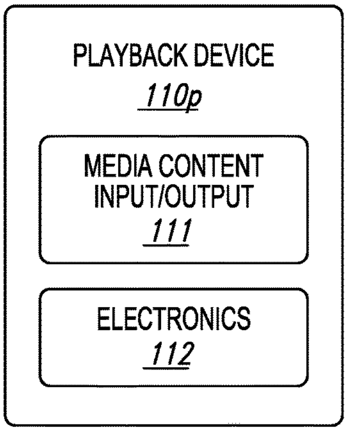
FIG. 1D shows a block diagram of a playback device.

By way of illustration, SONOS, Inc. presently offers (or has offered) for sale certain playback devices including, for example, a "SONOS ONE," "PLAY:1," "PLAY:3," "PLAY:5," "PLAYBAR," "PLAYBASE," "CONNECT:AMP," "CONNECT," and "SUB." Other suitable playback devices may additionally or alternatively be used to implement the playback devices of example embodiments disclosed herein. Additionally, one of ordinary skilled in the art will appreciate that a playback device is not limited to the examples described herein or to SONOS product offerings. In some embodiments, for example, one or more playback devices 110 comprises wired or wireless headphones (e.g., over-the-ear headphones, on-ear headphones, in-ear earphones). In other embodiments, one or more of the playback devices 110 comprise a docking station and/or an interface configured to interact with a docking station for personal mobile media playback devices. In certain embodiments, a playback device may be integral to another device or component such as a television, a lighting fixture, or some other device for indoor or outdoor use. In some embodiments, a playback device omits a user interface and/or one or more transducers. For example, FIG. 1D is a block diagram of a playback device 110*p* comprising the input/output 111 and electronics 112 without the user interface 113 or transducers 114.

Figure 1E:
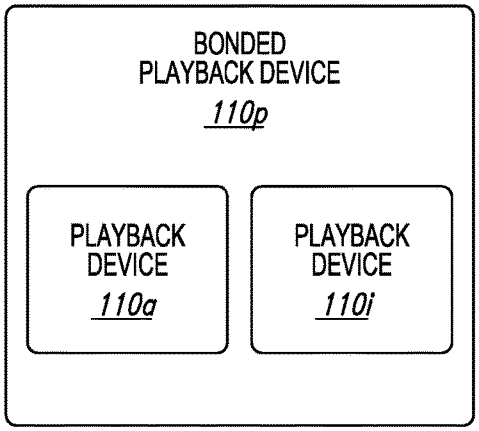
FIG. 1E shows a block diagram of a network microphone device.

FIG. 1E is a block diagram of a bonded playback device 110*q* comprising the playback device 110*a* (FIG. 1C) sonically bonded with the playback device 110*i* (e.g., a subwoofer) (FIG. 1A). In the illustrated embodiment, the playback devices 110*a* and 110*i* are separate ones of the playback devices 110 housed in separate enclosures. In some embodiments, however, the bonded playback device 110*q* comprises a single enclosure housing both the playback devices 110*a* and 110*i*. The bonded playback device 110*q* can be configured to process and reproduce sound differently than an unbonded playback device (e.g., the playback device 110*a* of FIG. 1C) and/or paired or bonded playback devices (e.g., the playback devices 110*l* and 110*m* of FIG. 1B). In some embodiments, for example, the playback device 110*a* is full-range playback device configured to render low frequency, mid-range frequency, and high frequency audio content, and the playback device 110*i* is a subwoofer configured to render low frequency audio content. In some aspects, the playback device 110*a*, when bonded with the first playback device, is configured to render only the mid-range and high frequency components of a particular audio content, while the playback device 110*i* renders the low frequency component of the particular audio content. In some embodiments, the bonded playback device 110*q* includes additional playback devices and/or another bonded playback device. Additional playback device embodiments are described in further detail below with respect to FIGS. 2A-3D.

c. Suitable Network Microphone Devices (NMDs)

Figure 1F:
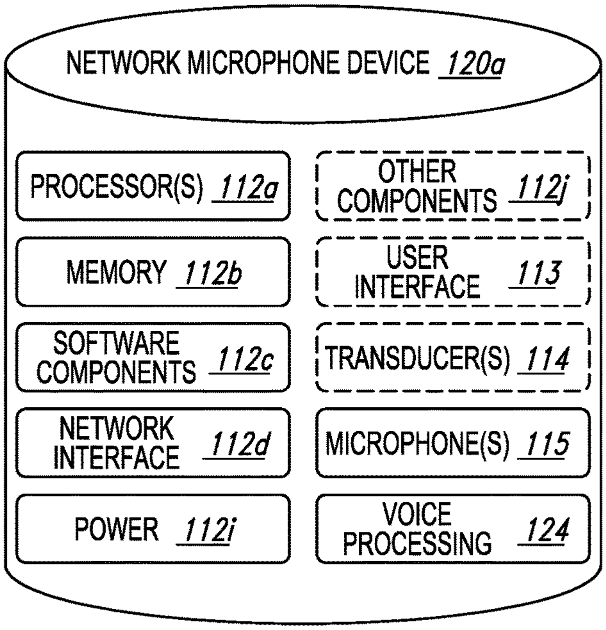
FIG. 1F shows a block diagram of a network microphone device.

FIG. 1F is a block diagram of the NMD 120*a* (FIGS. 1A and 1B). The NMD 120*a* includes one or more voice processing components 124 (hereinafter "the voice components 124") and several components described with respect to the playback device 110*a* (FIG. 1C) including the processors 112*a*, the memory 112*b*, and the microphones 115. The NMD 120*a* optionally comprises other components also included in the playback device 110*a* (FIG. 1C), such as the user interface 113 and/or the transducers 114. In some embodiments, the NMD 120*a* is configured as a media playback device (e.g., one or more of the playback devices 110), and further includes, for example, one or more of the audio processing components 112*g* (FIG. 1C), the transducers 114, and/or other playback device components. In certain embodiments, the NMD 120*a* comprises an Internet of Things (IoT) device such as, for example, a thermostat, alarm panel, fire and/or smoke detector, etc. In some embodiments, the NMD 120*a* comprises the microphones 115, the voice processing 124, and only a portion of the components of the electronics 112 described above with respect to FIG. 1B. In some aspects, for example, the NMD 120*a* includes the processor 112*a* and the memory 112*b* (FIG. 1B), while omitting one or more other components of the electronics 112. In some embodiments, the NMD 120*a* includes additional components (e.g., one or more sensors, cameras, thermometers, barometers, hygrometers).

Figure 1G:
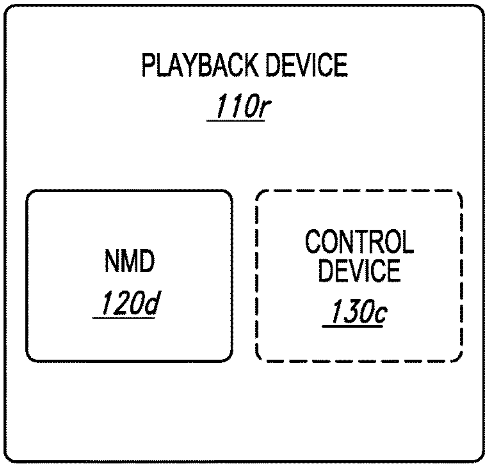
FIG. 1G shows a block diagram of a playback device.

In some embodiments, an NMD can be integrated into a playback device. FIG. 1G is a block diagram of a playback device 110*r* comprising an NMD 120*d*. The playback device 110*r* can comprise many or all of the components of the playback device 110*a* and further include the microphones 115 and voice processing 124 (FIG. 1F). The playback device 110*r* optionally includes an integrated control device 130*c*. The control device 130*c* can comprise, for example, a user interface (e.g., the user interface 113 of FIG. 1B) configured to receive user input (e.g., touch input, voice input) without a separate control device. In other embodiments, however, the playback device 110*r* receives commands from another control device (e.g., the control device 130*a* of FIG. 1B). Additional NMD embodiments are described in further detail below with respect to FIGS. 3A-3F.

Referring again to FIG. 1F, the microphones 115 are configured to acquire, capture, and/or receive sound from an environment (e.g., the environment 101 of FIG. 1A) and/or a room in which the NMD 120*a* is positioned. The received sound can include, for example, vocal utterances, audio played back by the NMD 120*a* and/or another playback device, background voices, ambient sounds, etc. The microphones 115 convert the received sound into electrical signals to produce microphone data. The voice processing 124 receives and analyzes the microphone data to determine whether a voice input is present in the microphone data. The voice input can comprise, for example, an activation word followed by an utterance including a user request. As those of ordinary skill in the art will appreciate, an activation word is a word or other audio cue that signifying a user voice input. For instance, in querying the AMAZON® VAS, a user might speak the activation word "Alexa." Other examples include "Ok, Google" for invoking the GOOGLE® VAS and "Hey, Siri" for invoking the APPLE® VAS.

After detecting the activation word, voice processing 124 monitors the microphone data for an accompanying user request in the voice input. The user request may include, for example, a command to control a third-party device, such as a thermostat (e.g., NEST® thermostat), an illumination device (e.g., a PHILIPS HUE® lighting device), or a media playback device (e.g., a Sonos® playback device). For example, a user might speak the activation word "Alexa" followed by the utterance "set the thermostat to 68 degrees" to set a temperature in a home (e.g., the environment 101 of FIG. 1A). The user might speak the same activation word followed by the utterance "turn on the living room" to turn on illumination devices in a living room area of the home. The user may similarly speak an activation word followed by a request to play a particular song, an album, or a playlist of music on a playback device in the home. Additional description regarding receiving and processing voice input data can be found in further detail below with respect to FIGS. 3A-3F.

d. Suitable Control Devices

Figure 1H:
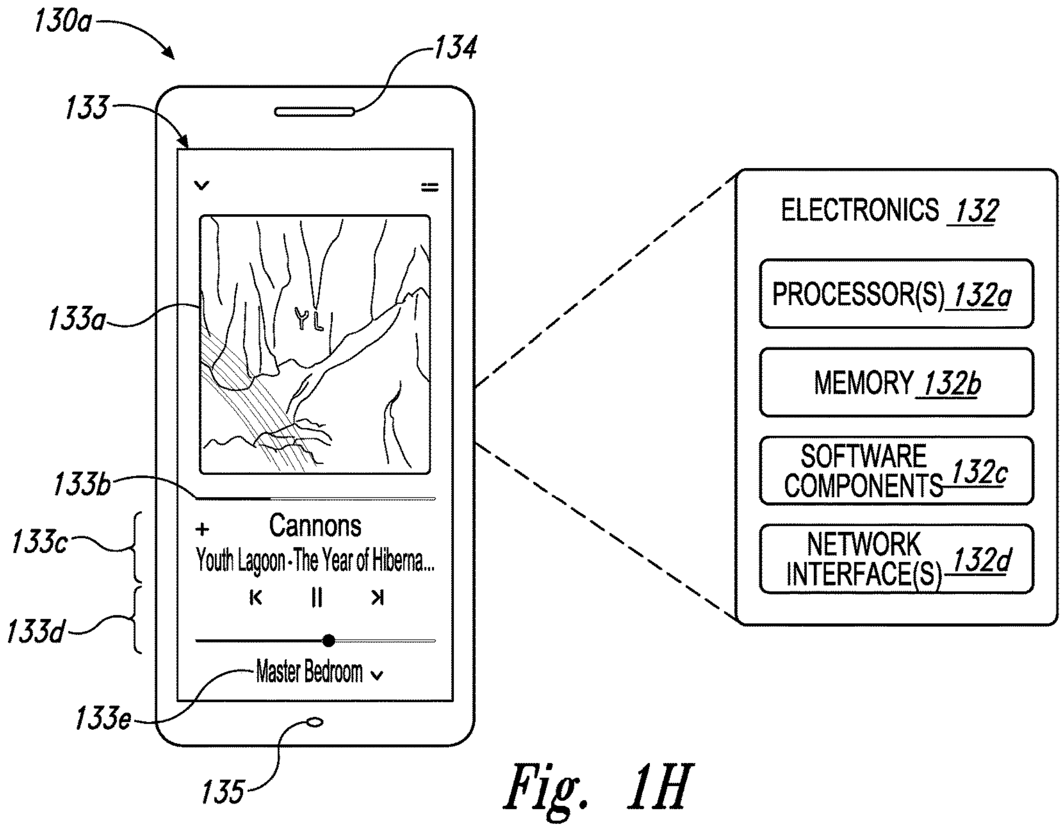
FIG. 1H shows a partially schematic diagram of a control device.
Figure 1I:
FIGS. 1-I through 1L show schematic diagrams of corresponding media playback system zones.
FIG. 1M shows a schematic diagram of media playback system areas.

FIG. 1H is a partially schematic diagram of the control device 130*a* (FIGS. 1A and 1B). As used herein, the term "control device" can be used interchangeably with "controller" or "control system." Among other features, the control device 130*a* is configured to receive user input related to the media playback system 100 and, in response, cause one or more devices in the media playback system 100 to perform an action(s) or operation(s) corresponding to the user input. In the illustrated embodiment, the control device 130*a* comprises a smartphone (e.g., an iPhone™, an Android phone) on which media playback system controller application software is installed. In some embodiments, the control device 130*a* comprises, for example, a tablet (e.g., an iPad™), a computer (e.g., a laptop computer, a desktop computer), and/or another suitable device (e.g., a television, an automobile audio head unit, an IoT device). In certain embodiments, the control device 130*a* comprises a dedicated controller for the media playback system 100. In other embodiments, as described above with respect to FIG. 1G, the control device 130*a* is integrated into another device in the media playback system 100 (e.g., one more of the playback devices 110, NMDs 120, and/or other suitable devices configured to communicate over a network).

The control device 130*a* includes electronics 132, a user interface 133, one or more speakers 134, and one or more microphones 135. The electronics 132 comprise one or more processors 132*a* (referred to hereinafter as "the processors 132*a*"), a memory 132*b*, software components 132*c*, and a network interface 132*d*. The processor 132*a* can be configured to perform functions relevant to facilitating user access, control, and configuration of the media playback system 100. The memory 132*b* can comprise data storage that can be loaded with one or more of the software components executable by the processor 302 to perform those functions. The software components 132*c* can comprise applications and/or other executable software configured to facilitate control of the media playback system 100. The memory 112*b* can be configured to store, for example, the software components 132*c*, media playback system controller application software, and/or other data associated with the media playback system 100 and the user.

The network interface 132*d* is configured to facilitate network communications between the control device 130*a* and one or more other devices in the media playback system 100, and/or one or more remote devices. In some embodiments, the network interface 132*d* is configured to operate according to one or more suitable communication industry standards (e.g., infrared, radio, wired standards including IEEE 802.3, wireless standards including IEEE 802.11a, 802.11b, 802.11g, 802.11n, 802.11ac, 802.15, 4G, LTE). The network interface 132*d* can be configured, for example, to transmit data to and/or receive data from the playback devices 110, the NMDs 120, other ones of the control devices 130, one of the computing devices 106 of FIG. 1B, devices comprising one or more other media playback systems, etc. The transmitted and/or received data can include, for example, playback device control commands, state variables, playback zone and/or zone group configurations. For instance, based on user input received at the user interface 133, the network interface 132*d* can transmit a playback device control command (e.g., volume control, audio playback control, audio content selection) from the control device 304 to one or more of playback devices. The network interface 132*d* can also transmit and/or receive configuration changes such as, for example, adding/removing one or more playback devices to/from a zone, adding/removing one or more zones to/from a zone group, forming a bonded or consolidated player, separating one or more playback devices from a bonded or consolidated player, among others. Additional description of zones and groups can be found below with respect to FIGS. 1-I through 1M.

The user interface 133 is configured to receive user input and can facilitate control of the media playback system 100. The user interface 133 includes media content art 133*a* (e.g., album art, lyrics, videos), a playback status indicator 133*b* (e.g., an elapsed and/or remaining time indicator), media content information region 133*c*, a playback control region 133*d*, and a zone indicator 133*e*. The media content information region 133*c* can include a display of relevant information (e.g., title, artist, album, genre, release year) about media content currently playing and/or media content in a queue or playlist. The playback control region 133*d* can include selectable (e.g., via touch input and/or via a cursor or another suitable selector) icons to cause one or more playback devices in a selected playback zone or zone group to perform playback actions such as, for example, play or pause, fast forward, rewind, skip to next, skip to previous, enter/exit shuffle mode, enter/exit repeat mode, enter/exit cross fade mode, etc. The playback control region 133*d* may also include selectable icons to modify equalization settings, playback volume, and/or other suitable playback actions. In the illustrated embodiment, the user interface 133 comprises a display presented on a touch screen interface of a smartphone (e.g., an iPhone™, an Android phone). In some embodiments, however, user interfaces of varying formats, styles, and interactive sequences may alternatively be implemented on one or more network devices to provide comparable control access to a media playback system.

The one or more speakers 134 (e.g., one or more transducers) can be configured to output sound to the user of the control device 130*a*. In some embodiments, the one or more speakers comprise individual transducers configured to correspondingly output low frequencies, mid-range frequencies, and/or high frequencies. In some aspects, for example, the control device 130*a* is configured as a playback device (e.g., one of the playback devices 110). Similarly, in some embodiments the control device 130*a* is configured as an NMD (e.g., one of the NMDs 120), receiving voice commands and other sounds via the one or more microphones 135.

The one or more microphones 135 can comprise, for example, one or more condenser microphones, electret condenser microphones, dynamic microphones, and/or other suitable types of microphones or transducers. In some embodiments, two or more of the microphones 135 are arranged to capture location information of an audio source (e.g., voice, audible sound) and/or configured to facilitate filtering of background noise. Moreover, in certain embodiments, the control device 130*a* is configured to operate as playback device and an NMD. In other embodiments, however, the control device 130*a* omits the one or more speakers 134 and/or the one or more microphones 135. For instance, the control device 130*a* may comprise a device (e.g., a thermostat, an IoT device, a network device) comprising a portion of the electronics 132 and the user interface 133 (e.g., a touch screen) without any speakers or microphones. Additional control device embodiments are described in further detail below with respect to FIGS. 4A-4D and 5.

e. Suitable Playback Device Configurations

Figure 1J:
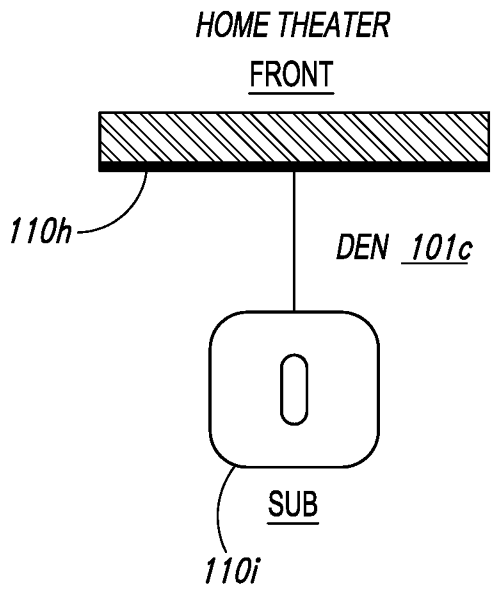
Figure 1K:
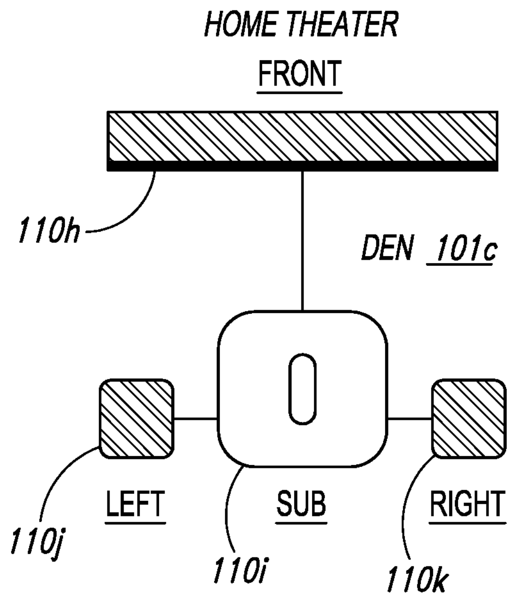
Figure 1L:
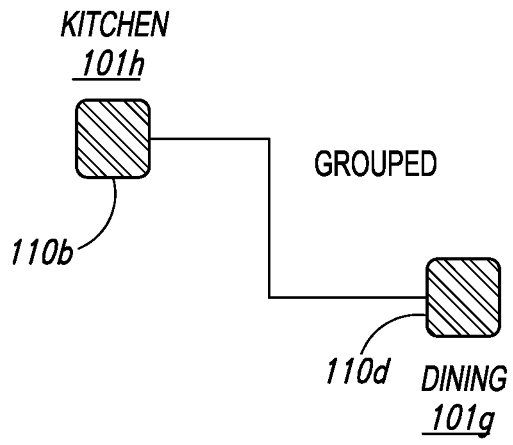
Figure 1M:
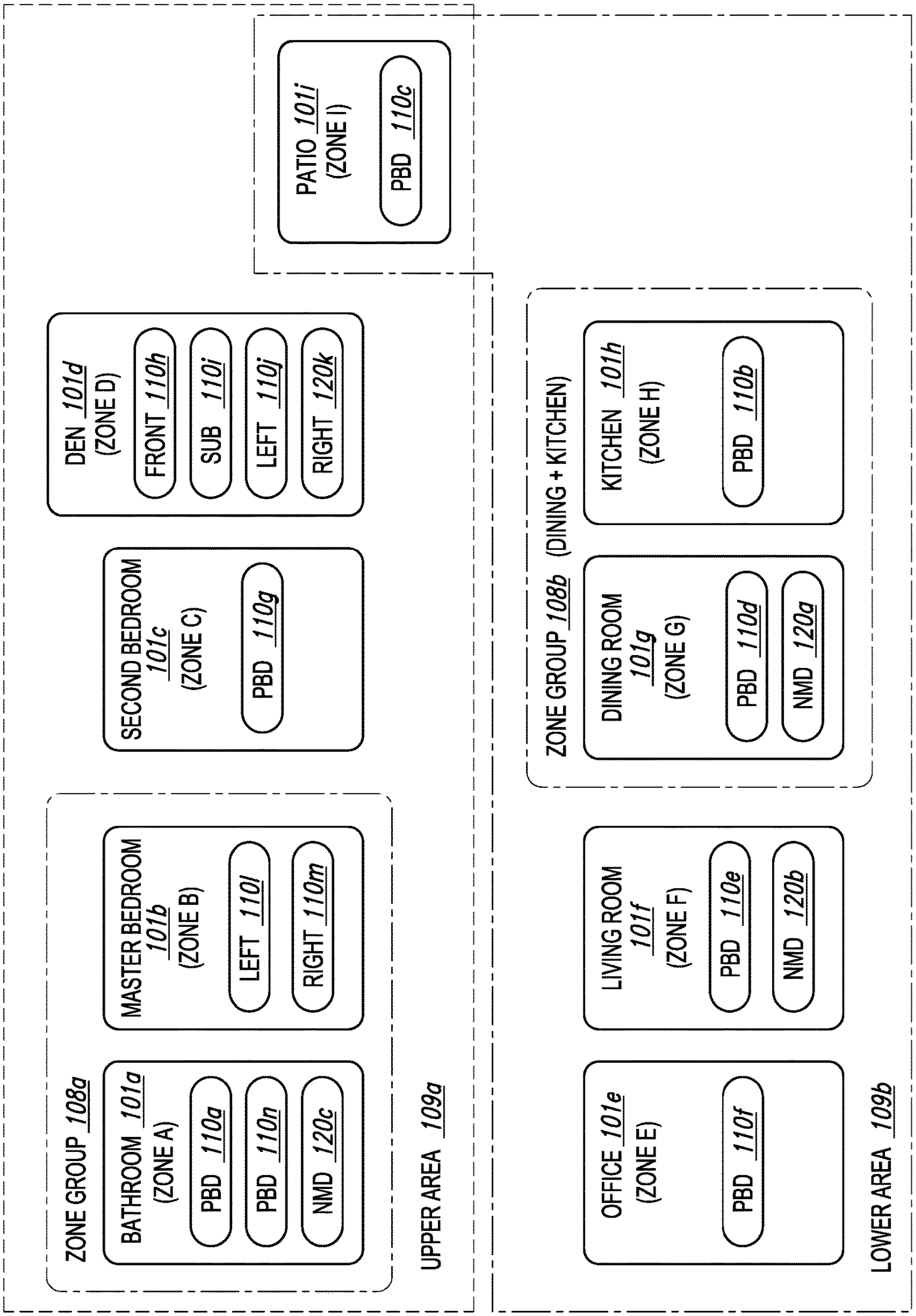

FIGS. 1-1 through 1M show example configurations of playback devices in zones and zone groups. Referring first to FIG. 1M, in one example, a single playback device may belong to a zone. For example, the playback device 110*g* in the second bedroom 101*c* (FIG. 1A) may belong to Zone C. In some implementations described below, multiple playback devices may be "bonded" to form a "bonded pair" which together form a single zone. For example, the playback device 110*l* (e.g., a left playback device) can be bonded to the playback device 110*l* (e.g., a left playback device) to form Zone A. Bonded playback devices may have different playback responsibilities (e.g., channel responsibilities). In another implementation described below, multiple playback devices may be merged to form a single zone. For example, the playback device 110*h* (e.g., a front playback device) may be merged with the playback device 110*i* (e.g., a subwoofer), and the playback devices 110*j* and 110*k* (e.g., left and right surround speakers, respectively) to form a single Zone D. In another example, the playback devices 110*g* and 110*h* can be merged to form a merged group or a zone group 108*b*. The merged playback devices 110*g* and 110*h* may not be specifically assigned different playback responsibilities. That is, the merged playback devices 110*h* and 110*i* may, aside from playing audio content in synchrony, each play audio content as they would if they were not merged.

Each zone in the media playback system 100 may be provided for control as a single user interface (UI) entity. For example, Zone A may be provided as a single entity named Master Bathroom. Zone B may be provided as a single entity named Master Bedroom. Zone C may be provided as a single entity named Second Bedroom.

Playback devices that are bonded may have different playback responsibilities, such as responsibilities for certain audio channels. For example, as shown in FIG. 1-I, the playback devices 110*l* and 110*m* may be bonded so as to produce or enhance a stereo effect of audio content. In this example, the playback device 110*l* may be configured to play a left channel audio component, while the playback device 110*k* may be configured to play a right channel audio component. In some implementations, such stereo bonding may be referred to as "pairing."

Additionally, bonded playback devices may have additional and/or different respective speaker drivers. As shown in FIG. 1J, the playback device 110*h* named Front may be bonded with the playback device 110*i* named SUB. The Front device 110*h* can be configured to render a range of mid to high frequencies and the SUB device 110*i* can be configured render low frequencies. When unbonded, however, the Front device 110*h* can be configured render a full range of frequencies. As another example, FIG. 1K shows the Front and SUB devices 110*h* and 110*i* further bonded with Left and Right playback devices 110*j* and 110*k*, respectively. In some implementations, the Right and Left devices 110*j* and 102*k* can be configured to form surround or "satellite" channels of a home theater system. The bonded playback devices 110*h*, 110*i*, 110*j*, and 110*k* may form a single Zone D (FIG. 1M).

Playback devices that are merged may not have assigned playback responsibilities, and may each render the full range of audio content the respective playback device is capable of. Nevertheless, merged devices may be represented as a single UI entity (i.e., a zone, as discussed above). For instance, the playback devices 110*a* and 110*n* the master bathroom have the single UI entity of Zone A. In one embodiment, the playback devices 110*a* and 110*n* may each output the full range of audio content each respective playback devices 110*a* and 110*n* are capable of, in synchrony.

In some embodiments, an NMD is bonded or merged with another device so as to form a zone. For example, the NMD 120*b* may be bonded with the playback device 110*e*, which together form Zone F, named Living Room. In other embodiments, a stand-alone network microphone device may be in a zone by itself. In other embodiments, however, a stand-alone network microphone device may not be associated with a zone. Additional details regarding associating network microphone devices and playback devices as designated or default devices may be found, for example, in previously referenced U.S. patent application Ser. No. 15/438,749.

Zones of individual, bonded, and/or merged devices may be grouped to form a zone group. For example, referring to FIG. 1M, Zone A may be grouped with Zone B to form a zone group 108*a* that includes the two zones. Similarly, Zone G may be grouped with Zone H to form the zone group 108*b*. As another example, Zone A may be grouped with one or more other Zones C-I. The Zones A-I may be grouped and ungrouped in numerous ways. For example, three, four, five, or more (e.g., all) of the Zones A-I may be grouped. When grouped, the zones of individual and/or bonded playback devices may play back audio in synchrony with one another, as described in previously referenced U.S. Pat. No. 8,234,395. Playback devices may be dynamically grouped and ungrouped to form new or different groups that synchronously play back audio content.

In various implementations, the zones in an environment may be the default name of a zone within the group or a combination of the names of the zones within a zone group. For example, Zone Group 108*b* can have be assigned a name such as "Dining+Kitchen", as shown in FIG. 1M. In some embodiments, a zone group may be given a unique name selected by a user.

Certain data may be stored in a memory of a playback device (e.g., the memory 112*b* of FIG. 1C) as one or more state variables that are periodically updated and used to describe the state of a playback zone, the playback device(s), and/or a zone group associated therewith. The memory may also include the data associated with the state of the other devices of the media system, and shared from time to time among the devices so that one or more of the devices have the most recent data associated with the system.

In some embodiments, the memory may store instances of various variable types associated with the states. Variables instances may be stored with identifiers (e.g., tags) corresponding to type. For example, certain identifiers may be a first type "a1" to identify playback device(s) of a zone, a second type "b1" to identify playback device(s) that may be bonded in the zone, and a third type "c1" to identify a zone group to which the zone may belong. As a related example, identifiers associated with the second bedroom 101*c* may indicate that the playback device is the only playback device of the Zone C and not in a zone group. Identifiers associated with the Den may indicate that the Den is not grouped with other zones but includes bonded playback devices 110*h*-110*k*. Identifiers associated with the Dining Room may indicate that the Dining Room is part of the Dining+Kitchen zone group 108*b* and that devices 110*b* and 110*d* are grouped (FIG. 1L). Identifiers associated with the Kitchen may indicate the same or similar information by virtue of the Kitchen being part of the Dining+Kitchen zone group 108*b*. Other example zone variables and identifiers are described below.

In yet another example, the media playback system 100 may variables or identifiers representing other associations of zones and zone groups, such as identifiers associated with Areas, as shown in FIG. 1M. An area may involve a cluster of zone groups and/or zones not within a zone group. For instance, FIG. 1M shows an Upper Area 109*a* including Zones A-D, and a Lower Area 109*b* including Zones E-I. In one aspect, an Area may be used to invoke a cluster of zone groups and/or zones that share one or more zones and/or zone groups of another cluster. In another aspect, this differs from a zone group, which does not share a zone with another zone group. Further examples of techniques for implementing Areas may be found, for example, in U.S. application Ser. No. 15/682,506 filed Aug. 21, 2017 and titled "Room Association Based on Name," and U.S. Pat. No. 8,483,853 filed Sep. 11, 2007, and titled "Controlling and manipulating groupings in a multi-zone media system." Each of these applications is incorporated herein by reference in its entirety. In some embodiments, the media playback system 100 may not implement Areas, in which case the system may not store variables associated with Areas.

III. Example Systems and Devices

Figure 2A:
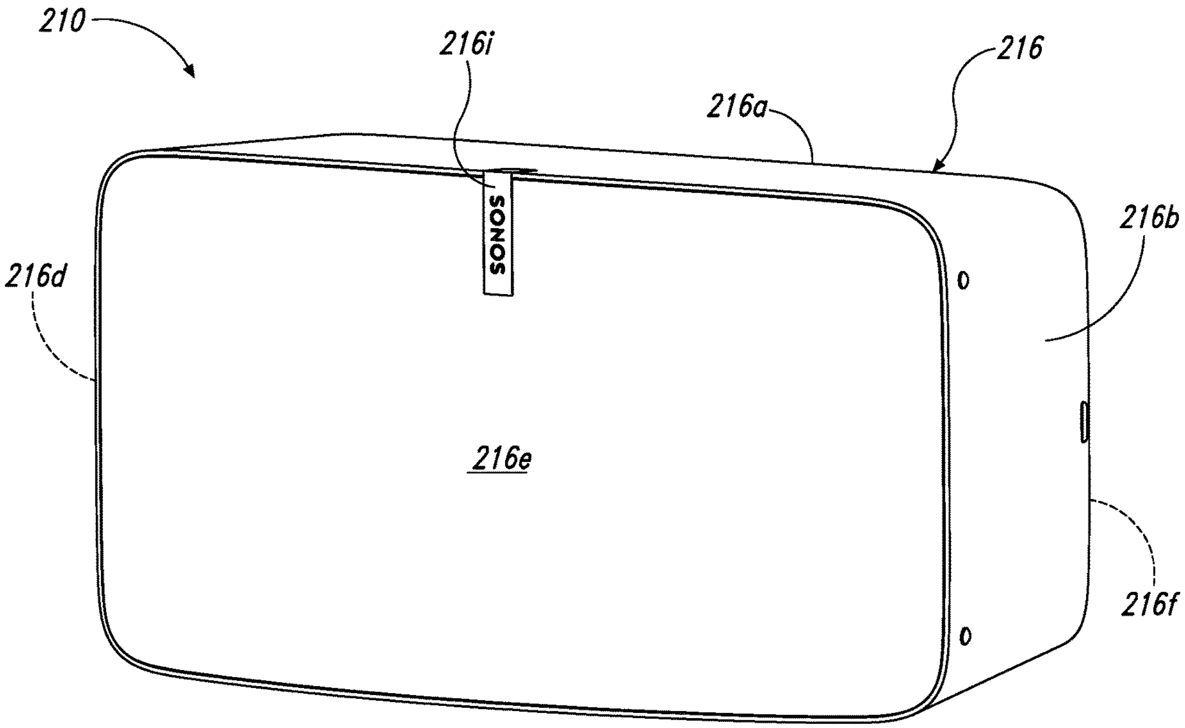
FIG. 2A shows a front isometric view of a playback device configured in accordance with aspects of the disclosed technology.
Figure 2B:
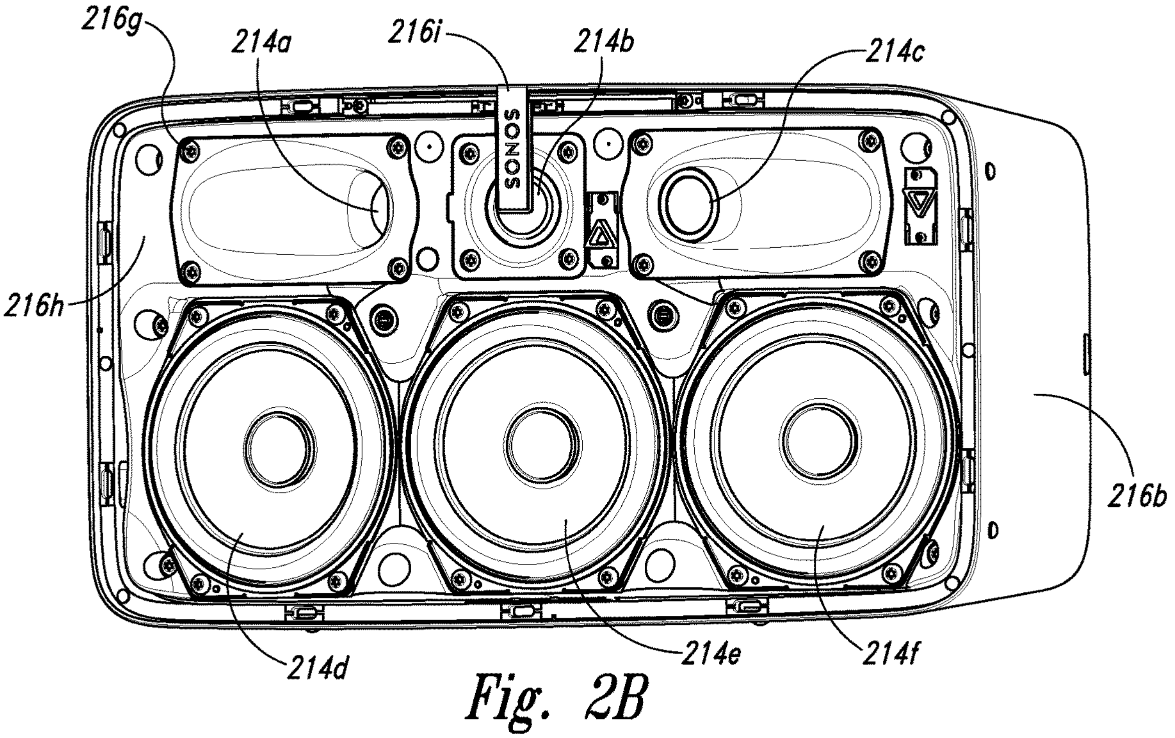
FIG. 2B shows a front isometric view of the playback device of FIG. 3A without a grille.
Figure 2C:
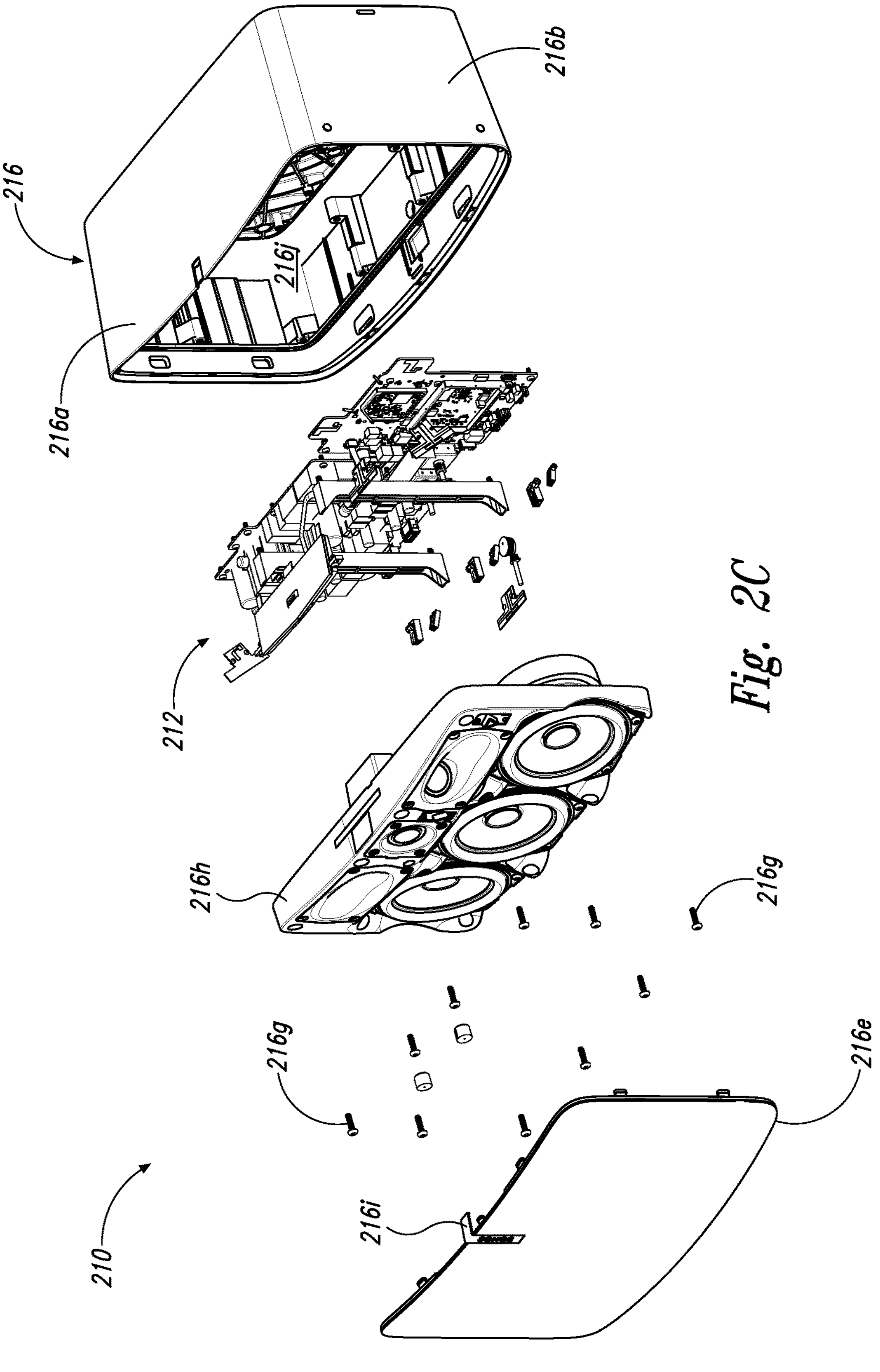
FIG. 2C shows an exploded view of the playback device of FIG. 2A.

FIG. 2A is a front isometric view of a playback device 210 configured in accordance with aspects of the disclosed technology. FIG. 2B is a front isometric view of the playback device 210 without a grille 216*e*. FIG. 2C is an exploded view of the playback device 210. Referring to FIGS. 2A-2C together, the playback device 210 comprises a housing 216 that includes an upper portion 216*a*, a right or first side portion 216*b*, a lower portion 216*c*, a left or second side portion 216*d*, the grille 216*e*, and a rear portion 216*f*. A plurality of fasteners 216*g* (e.g., one or more screws, rivets, clips) attaches a frame 216*h* to the housing 216. A cavity 216*j* (FIG. 2C) in the housing 216 is configured to receive the frame 216*h* and electronics 212. The frame 216*h* is configured to carry a plurality of transducers 214 (identified individually in FIG. 2B as transducers 214*a-f*). The electronics 212 (e.g., the electronics 112 of FIG. 1C) is configured to receive audio content from an audio source and send electrical signals corresponding to the audio content to the transducers 214 for playback.

The transducers 214 are configured to receive the electrical signals from the electronics 112, and further configured to convert the received electrical signals into audible sound during playback. For instance, the transducers 214*a-c* (e.g., tweeters) can be configured to output high frequency sound (e.g., sound waves having a frequency greater than about 2 kHz). The transducers 214*d-f* (e.g., mid-woofers, woofers, midrange speakers) can be configured output sound at frequencies lower than the transducers 214*a-c* (e.g., sound waves having a frequency lower than about 2 kHz). In some embodiments, the playback device 210 includes a number of transducers different than those illustrated in FIGS. 2A-2C. For example, as described in further detail below with respect to FIGS. 3A-3C, the playback device 210 can include fewer than six transducers (e.g., one, two, three). In other embodiments, however, the playback device 210 includes more than six transducers (e.g., nine, ten). Moreover, in some embodiments, all or a portion of the transducers 214 are configured to operate as a phased array to desirably adjust (e.g., narrow or widen) a radiation pattern of the transducers 214, thereby altering a user's perception of the sound emitted from the playback device 210.

In the illustrated embodiment of FIGS. 2A-2C, a filter 216*i* is axially aligned with the transducer 214*b*. The filter 216*i* can be configured to desirably attenuate a predetermined range of frequencies that the transducer 214*b* outputs to improve sound quality and a perceived sound stage output collectively by the transducers 214. In some embodiments, however, the playback device 210 omits the filter 216*i*. In other embodiments, the playback device 210 includes one or more additional filters aligned with the transducers 214*b* and/or at least another of the transducers 214.

Figure 3A:
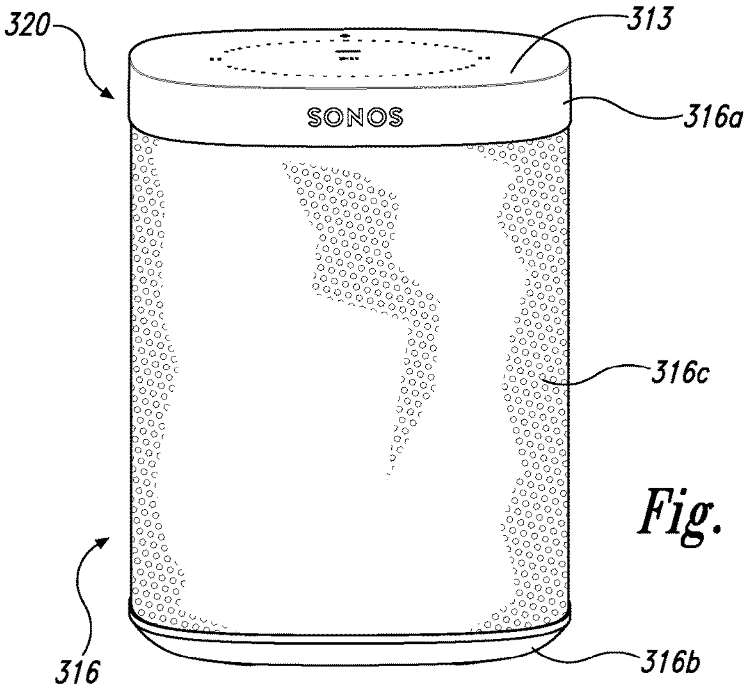
FIG. 3A shows a front view of a network microphone device configured in accordance with aspects of the disclosed technology.
Figure 3B:
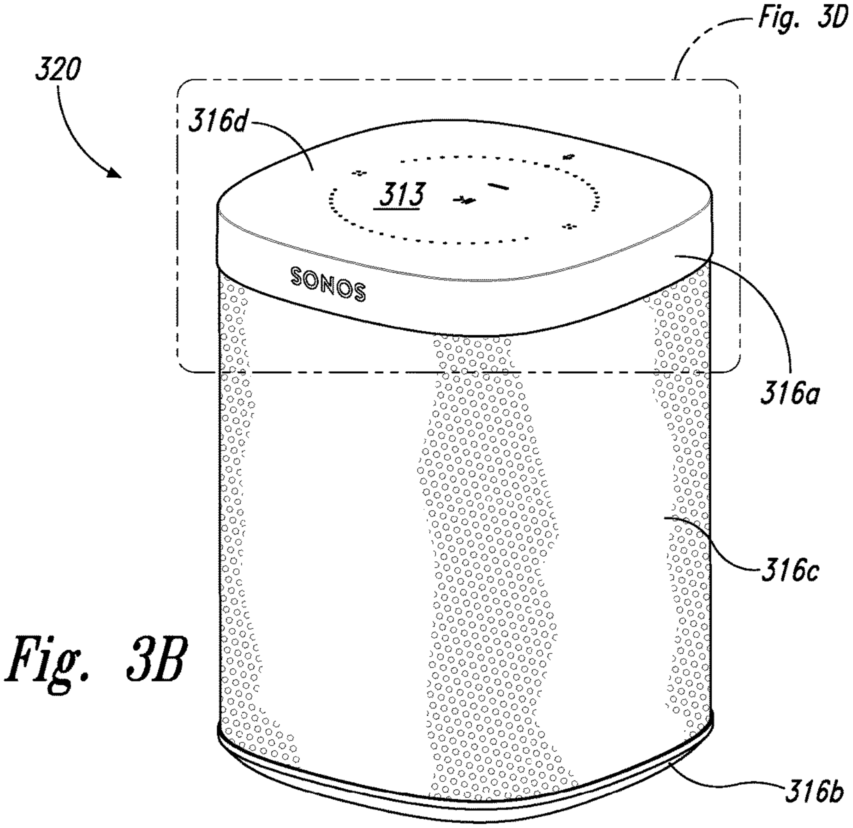
FIG. 3B shows a side isometric view of the network microphone device of FIG. 3A.
Figure 3C:
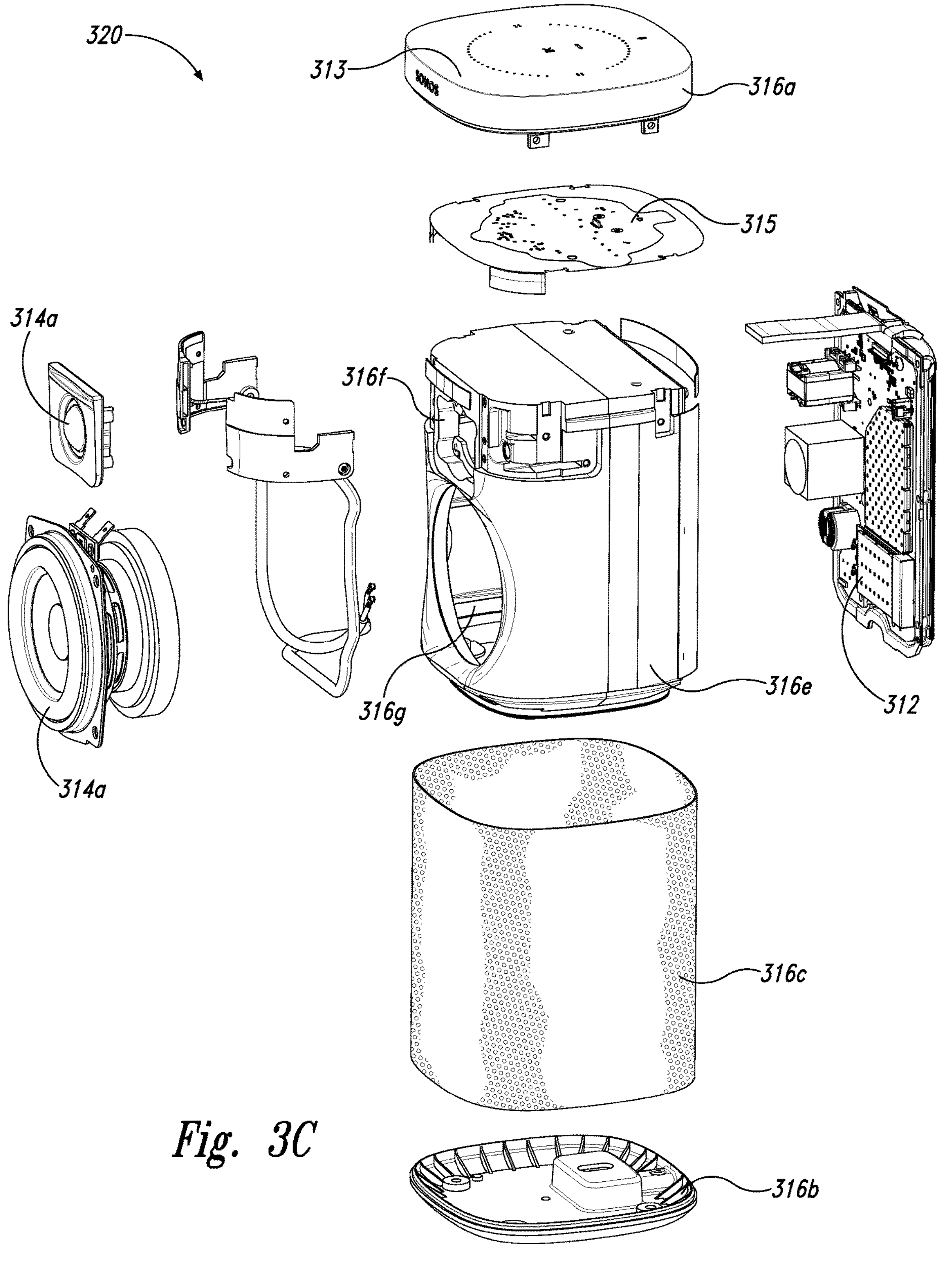
FIG. 3C shows an exploded view of the network microphone device of FIGS. 3A and 3B.
Figure 3D:
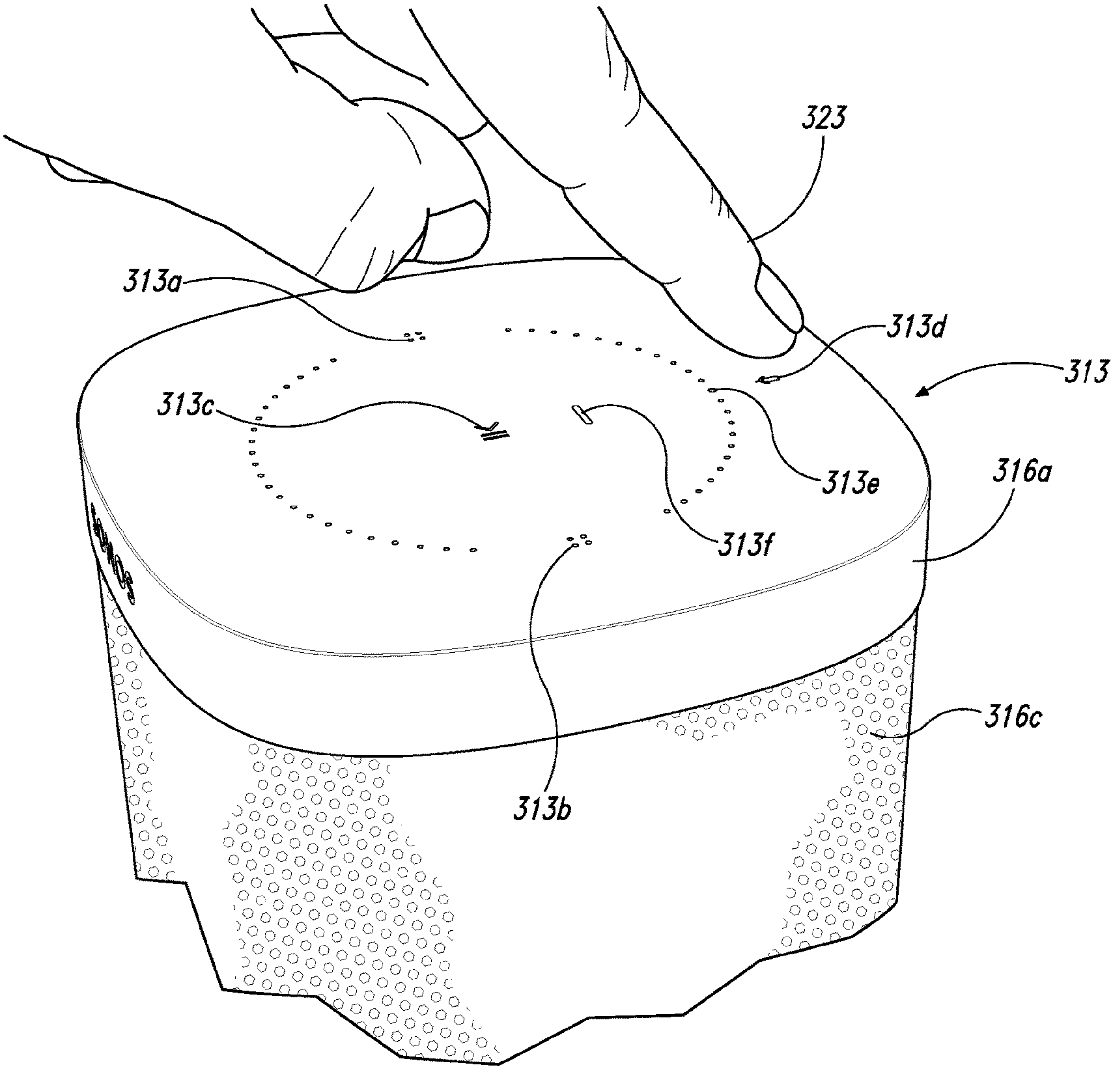
FIG. 3D shows an enlarged view of a portion of FIG. 3B.

FIGS. 3A and 3B are front and right isometric side views, respectively, of an NMD 320 configured in accordance with embodiments of the disclosed technology. FIG. 3C is an exploded view of the NMD 320. FIG. 3D is an enlarged view of a portion of FIG. 3B including a user interface 313 of the NMD 320. Referring first to FIGS. 3A-3C, the NMD 320 includes a housing 316 comprising an upper portion 316*a*, a lower portion 316*b* and an intermediate portion 316*c* (e.g., a grille). A plurality of ports, holes or apertures 316*d* in the upper portion 316*a* allow sound to pass through to one or more microphones 315 (FIG. 3C) positioned within the housing 316. The one or more microphones 316 are configured to received sound via the apertures 316*d* and produce electrical signals based on the received sound. In the illustrated embodiment, a frame 316*e* (FIG. 3C) of the housing 316 surrounds cavities 316*f* and 316*g* configured to house, respectively, a first transducer 314*a* (e.g., a tweeter) and a second transducer 314*b* (e.g., a mid-woofer, a midrange speaker, a woofer). In other embodiments, however, the NMD 320 includes a single transducer, or more than two (e.g., two, five, six) transducers. In certain embodiments, the NMD 320 omits the transducers 314*a* and 314*b* altogether.

Electronics 312 (FIG. 3C) includes components configured to drive the transducers 314*a* and 314*b*, and further configured to analyze audio data corresponding to the electrical signals produced by the one or more microphones 315. In some embodiments, for example, the electronics 312 comprises many or all of the components of the electronics 112 described above with respect to FIG. 1C. In certain embodiments, the electronics 312 includes components described above with respect to FIG. 1F such as, for example, the one or more processors 112*a*, the memory 112*b*, the software components 112*c*, the network interface 112*d*, etc. In some embodiments, the electronics 312 includes additional suitable components (e.g., proximity or other sensors).

Referring to FIG. 3D, the user interface 313 includes a plurality of control surfaces (e.g., buttons, knobs, capacitive surfaces) including a first control surface 313*a* (e.g., a previous control), a second control surface 313*b* (e.g., a next control), and a third control surface 313*c* (e.g., a play and/or pause control). A fourth control surface 313*d* is configured to receive touch input corresponding to activation and deactivation of the one or microphones 315. A first indicator 313*e* (e.g., one or more light emitting diodes (LEDs) or another suitable illuminator) can be configured to illuminate only when the one or more microphones 315 are activated. A second indicator 313*f* (e.g., one or more LEDs) can be configured to remain solid during normal operation and to blink or otherwise change from solid to indicate a detection of voice activity. In some embodiments, the user interface 313 includes additional or fewer control surfaces and illuminators. In one embodiment, for example, the user interface 313 includes the first indicator 313*e*, omitting the second indicator 313*f*. Moreover, in certain embodiments, the NMD 320 comprises a playback device and a control device, and the user interface 313 comprises the user interface of the control device.

Referring to FIGS. 3A-3D together, the NMD 320 is configured to receive voice commands from one or more adjacent users via the one or more microphones 315. As described above with respect to FIG. 1B, the one or more microphones 315 can acquire, capture, or record sound in a vicinity (e.g., a region within 10 m or less of the NMD 320) and transmit electrical signals corresponding to the recorded sound to the electronics 312. The electronics 312 can process the electrical signals and can analyze the resulting audio data to determine a presence of one or more voice commands (e.g., one or more activation words). In some embodiments, for example, after detection of one or more suitable voice commands, the NMD 320 is configured to transmit a portion of the recorded audio data to another device and/or a remote server (e.g., one or more of the computing devices 106 of FIG. 1B) for further analysis. The remote server can analyze the audio data, determine an appropriate action based on the voice command, and transmit a message to the NMD 320 to perform the appropriate action. For instance, a user may speak "Sonos, play Michael Jackson." The NMD 320 can, via the one or more microphones 315, record the user's voice utterance, determine the presence of a voice command, and transmit the audio data having the voice command to a remote server (e.g., one or more of the remote computing devices 106 of FIG. 1B, one or more servers of a VAS and/or another suitable service). The remote server can analyze the audio data and determine an action corresponding to the command. The remote server can then transmit a command to the NMD 320 to perform the determined action (e.g., play back audio content related to Michael Jackson). The NMD 320 can receive the command and play back the audio content related to Michael Jackson from a media content source. As described above with respect to FIG. 1B, suitable content sources can include a device or storage communicatively coupled to the NMD 320 via a LAN (e.g., the network 104 of FIG. 1B), a remote server (e.g., one or more of the remote computing devices 106 of FIG. 1B), etc. In certain embodiments, however, the NMD 320 determines and/or performs one or more actions corresponding to the one or more voice commands without intervention or involvement of an external device, computer, or server.

Figure 3E:
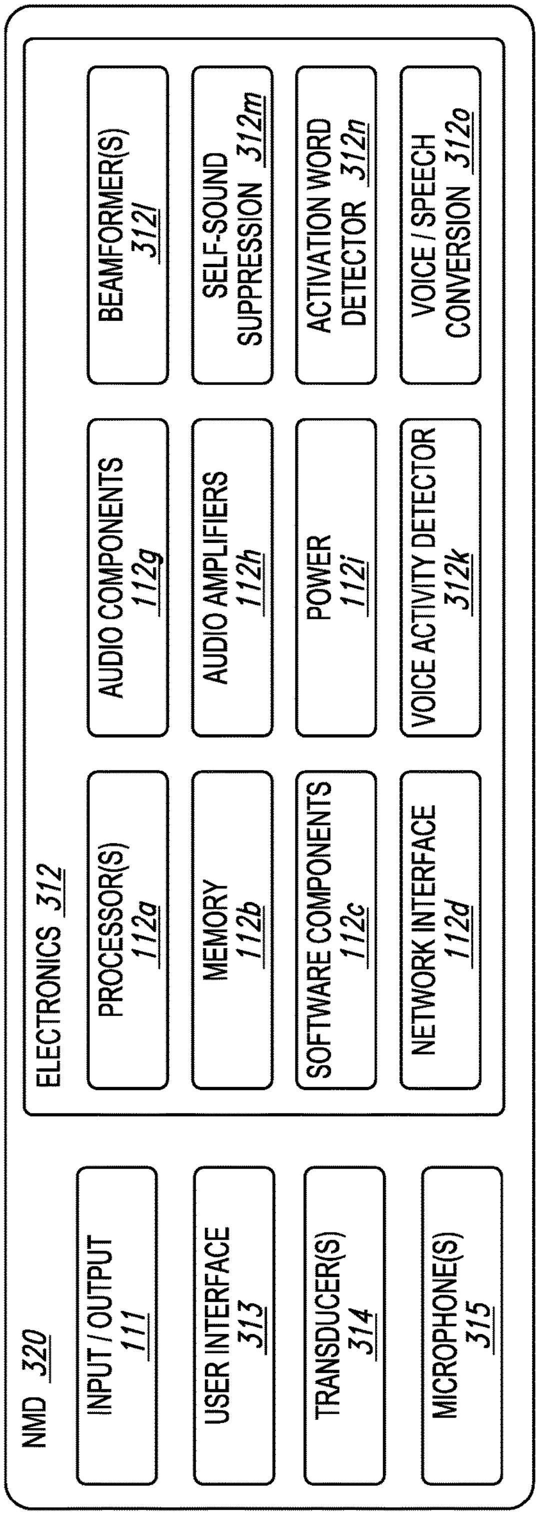
FIG. 3E shows a block diagram of the network microphone device of FIGS. 3A-3D

FIG. 3E is a functional block diagram showing additional features of the NMD 320 in accordance with aspects of the disclosure. The NMD 320 includes components configured to facilitate voice command capture including voice activity detector component(s) 312*k*, beam former components 312*l*, acoustic echo cancellation (AEC) and/or self-sound suppression components 312*m*, activation word detector components 312*n*, and voice/speech conversion components 3120 (e.g., voice-to-text and text-to-voice). In the illustrated embodiment of FIG. 3E, the foregoing components 312*k*-3120 are shown as separate components. In some embodiments, however, one or more of the components 312*k*-3120 are subcomponents of the processors 112*a*.

The beamforming and self-sound suppression components 312*l* and 312*m* are configured to detect an audio signal and determine aspects of voice input represented in the detected audio signal, such as the direction, amplitude, frequency spectrum, etc. The voice activity detector activity components 312*k* are operably coupled with the beamforming and AEC components 312*l* and 312*m* and are configured to determine a direction and/or directions from which voice activity is likely to have occurred in the detected audio signal. Potential speech directions can be identified by monitoring metrics which distinguish speech from other sounds. Such metrics can include, for example, energy within the speech band relative to background noise and entropy within the speech band, which is measure of spectral structure. As those of ordinary skill in the art will appreciate, speech typically has a lower entropy than most common background noise. The activation word detector components 312*n* are configured to monitor and analyze received audio to determine if any activation words (e.g., wake words) are present in the received audio. The activation word detector components 312*n* may analyze the received audio using an activation word detection algorithm. If the activation word detector 312*n* detects an activation word, the NMD 320 may process voice input contained in the received audio. Example activation word detection algorithms accept audio as input and provide an indication of whether an activation word is present in the audio. Many first- and third-party activation word detection algorithms are known and commercially available. For instance, operators of a voice service may make their algorithm available for use in third-party devices. Alternatively, an algorithm may be trained to detect certain activation words. In some embodiments, the activation word detector 312*n* runs multiple activation word detection algorithms on the received audio simultaneously (or substantially simultaneously). As noted above, different voice services (e.g. AMAZON's ALEXA®, APPLE's SIRI®, or MICROSOFT's CORTANA®) can each use a different activation word for invoking their respective voice service. To support multiple services, the activation word detector 312*n* may run the received audio through the activation word detection algorithm for each supported voice service in parallel.

The speech/text conversion components 3120 may facilitate processing by converting speech in the voice input to text. In some embodiments, the electronics 312 can include voice recognition software that is trained to a particular user or a particular set of users associated with a household. Such voice recognition software may implement voice-processing algorithms that are tuned to specific voice profile(s). Tuning to specific voice profiles may require less computationally intensive algorithms than traditional voice activity services, which typically sample from a broad base of users and diverse requests that are not targeted to media playback systems.

Figure 3F:
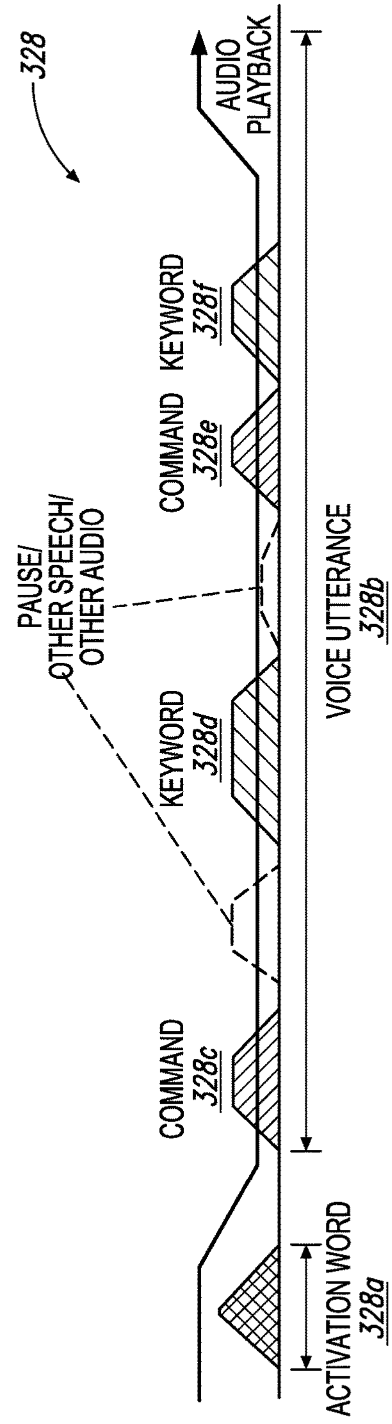
FIG. 3F shows a schematic diagram of an example voice input.

FIG. 3F is a schematic diagram of an example voice input 328 captured by the NMD 320 in accordance with aspects of the disclosure. The voice input 328 can include a activation word portion 328*a* and a voice utterance portion 328*b*. In some embodiments, the activation word 557*a* can be a known activation word, such as "Alexa," which is associated with AMAZON's ALEXA®. In other embodiments, however, the voice input 328 may not include a activation word. In some embodiments, a network microphone device may output an audible and/or visible response upon detection of the activation word portion 328*a*. In addition or alternately, an NMB may output an audible and/or visible response after processing a voice input and/or a series of voice inputs.

The voice utterance portion 328*b* may include, for example, one or more spoken commands (identified individually as a first command 328*c* and a second command 328*e*) and one or more spoken keywords (identified individually as a first keyword 328*d* and a second keyword 328*f*). In one example, the first command 328*c* can be a command to play music, such as a specific song, album, playlist, etc. In this example, the keywords may be one or words identifying one or more zones in which the music is to be played, such as the Living Room and the Dining Room shown in FIG. 1A. In some examples, the voice utterance portion 328*b* can include other information, such as detected pauses (e.g., periods of non-speech) between words spoken by a user, as shown in FIG. 3F. The pauses may demarcate the locations of separate commands, keywords, or other information spoke by the user within the voice utterance portion 328*b*.

In some embodiments, the media playback system 100 is configured to temporarily reduce the volume of audio content that it is playing while detecting the activation word portion 557*a*. The media playback system 100 may restore the volume after processing the voice input 328, as shown in FIG. 3F. Such a process can be referred to as ducking, examples of which are disclosed in U.S. patent application Ser. No. 15/438,749, incorporated by reference herein in its entirety.

Figure 4A:
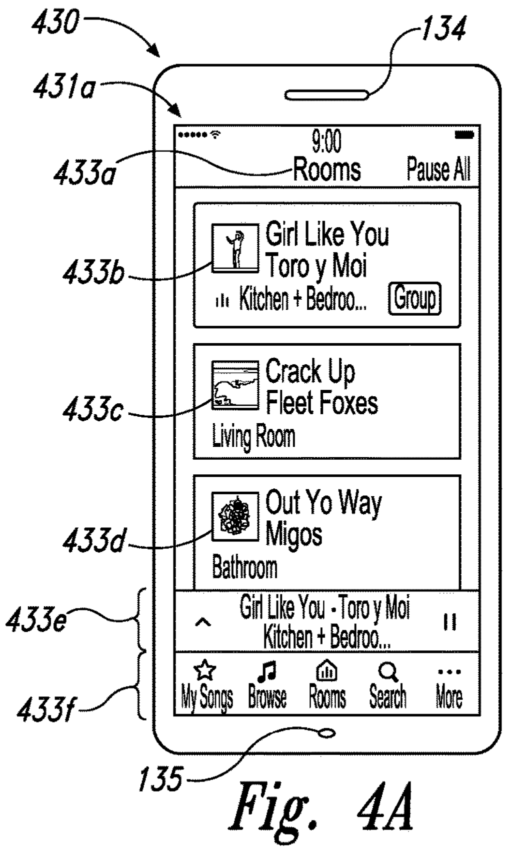
FIGS. 4A-4D show schematic diagrams of a control device in various stages of operation in accordance with aspects of the disclosed technology.
Figure 4B:
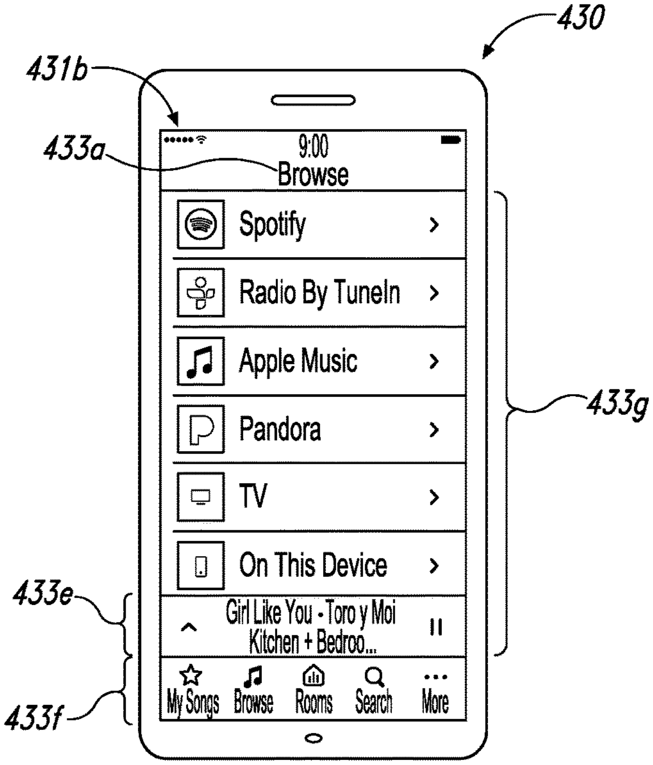
Figure 4C:
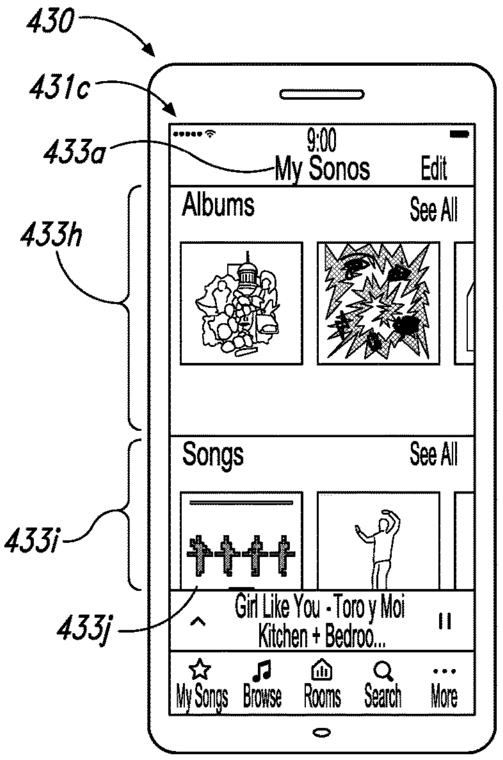
Figure 4D:
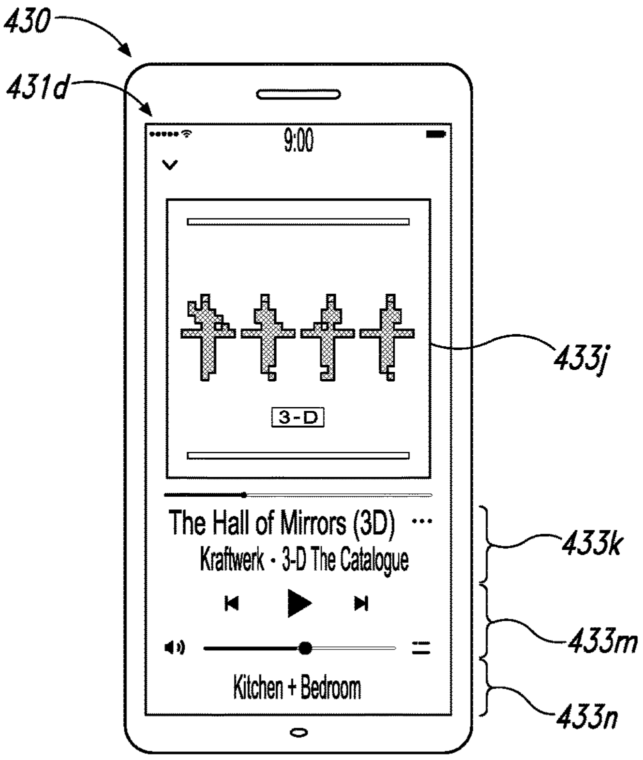

FIGS. 4A-4D are schematic diagrams of a control device 430 (e.g., the control device 130*a* of FIG. 1H, a smartphone, a tablet, a dedicated control device, an IoT device, and/or another suitable device) showing corresponding user interface displays in various states of operation. A first user interface display 431*a* (FIG. 4A) includes a display name 433*a* (i.e., "Rooms"). A selected group region 433*b* displays audio content information (e.g., artist name, track name, album art) of audio content played back in the selected group and/or zone. Group regions 433*c* and 433*d* display corresponding group and/or zone name, and audio content information audio content played back or next in a playback queue of the respective group or zone. An audio content region 433*e* includes information related to audio content in the selected group and/or zone (i.e., the group and/or zone indicated in the selected group region 433*b*). A lower display region 433*f* is configured to receive touch input to display one or more other user interface displays. For example, if a user selects "Browse" in the lower display region 433*f*, the control device 430 can be configured to output a second user interface display 431*b* (FIG. 4B) comprising a plurality of music services 433*g* (e.g., Spotify, Radio by Tunein, Apple Music, Pandora, Amazon, TV, local music, line-in) through which the user can browse and from which the user can select media content for play back via one or more playback devices (e.g., one of the playback devices 110 of FIG. 1A). Alternatively, if the user selects "My Sonos" in the lower display region 433*f*, the control device 430 can be configured to output a third user interface display 431*c* (FIG. 4C). A first media content region 433*h* can include graphical representations (e.g., album art) corresponding to individual albums, stations, or playlists. A second media content region 433*i* can include graphical representations (e.g., album art) corresponding to individual songs, tracks, or other media content. If the user selections a graphical representation 433*j* (FIG. 4C), the control device 430 can be configured to begin play back of audio content corresponding to the graphical representation 433*j* and output a fourth user interface display 431*d* fourth user interface display 431*d* includes an enlarged version of the graphical representation 433*j*, media content information 433*k* (e.g., track name, artist, album), transport controls 433*m* (e.g., play, previous, next, pause, volume), and indication 433*n* of the currently selected group and/or zone name.

Figure 5:
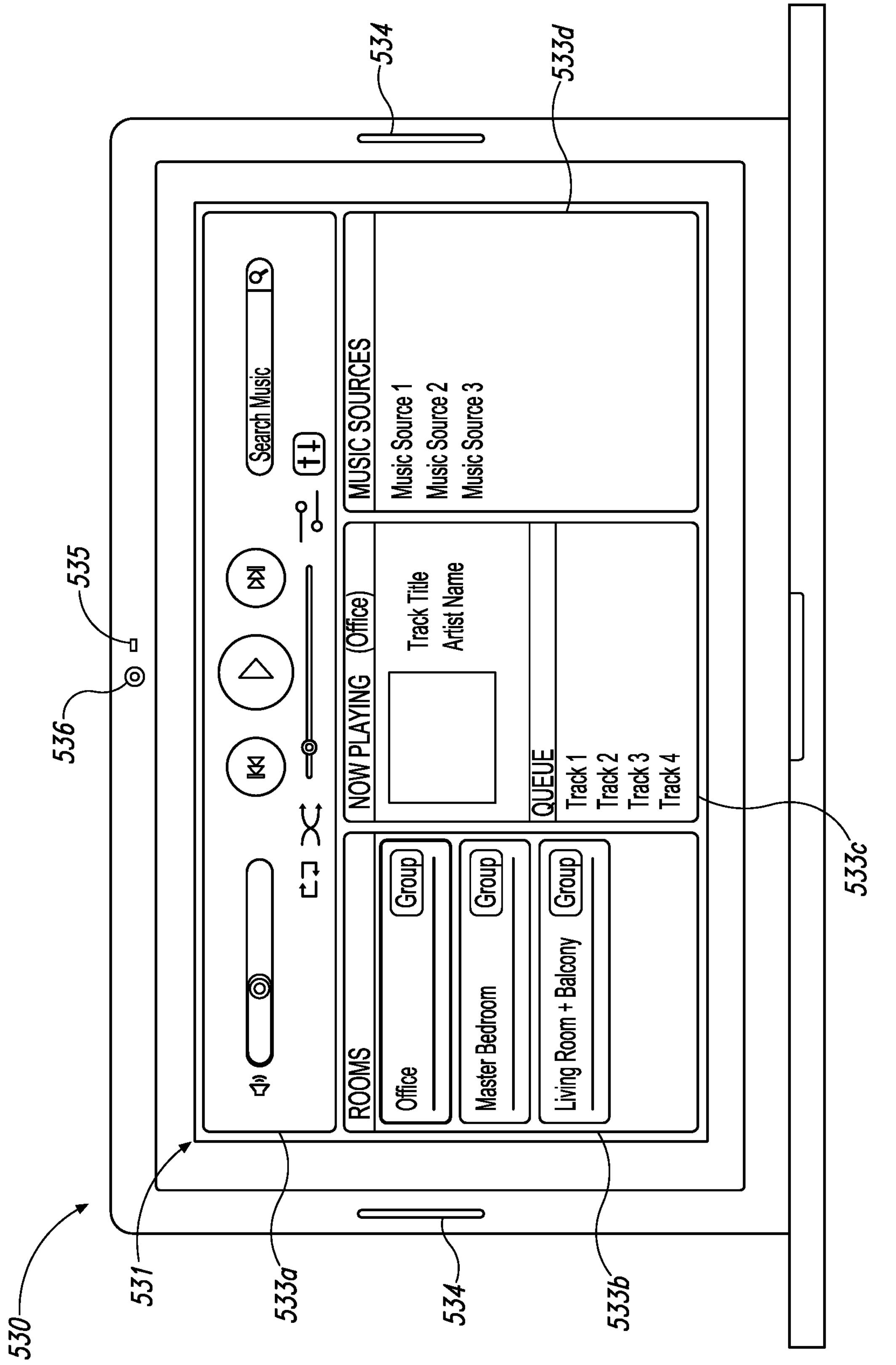
FIG. 5 shows front view of a control device.

FIG. 5 is a schematic diagram of a control device 530 (e.g., a laptop computer, a desktop computer). The control device 530 includes transducers 534, a microphone 535, and a camera 536. A user interface 531 includes a transport control region 533*a*, a playback status region 533*b*, a playback zone region 533*c*, a playback queue region 533*d*, and a media content source region 533*e*. The transport control region comprises one or more controls for controlling media playback including, for example, volume, previous, play/pause, next, repeat, shuffle, track position, crossfade, equalization, etc. The audio content source region 533*e* includes a listing of one or more media content sources from which a user can select media items for play back and/or adding to a playback queue.

The playback zone region 533*b* can include representations of playback zones within the media playback system 100 (FIGS. 1A and 1B). In some embodiments, the graphical representations of playback zones may be selectable to bring up additional selectable icons to manage or configure the playback zones in the media playback system, such as a creation of bonded zones, creation of zone groups, separation of zone groups, renaming of zone groups, etc. In the illustrated embodiment, a "group" icon is provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone can be configured to play audio content in synchrony with the playback device(s) in the particular zone. Analogously, a "group" icon may be provided within a graphical representation of a zone group. In the illustrated embodiment, the "group" icon may be selectable to bring up options to deselect one or more zones in the zone group to be removed from the zone group. In some embodiments, the control device 530 includes other interactions and implementations for grouping and ungrouping zones via the user interface 531. In certain embodiments, the representations of playback zones in the playback zone region 533*b* can be dynamically updated as playback zone or zone group configurations are modified.

The playback status region 533*c* includes graphical representations of audio content that is presently being played, previously played, or scheduled to play next in the selected playback zone or zone group. The selected playback zone or zone group may be visually distinguished on the user interface, such as within the playback zone region 533*b* and/or the playback queue region 533*d*. The graphical representations may include track title, artist name, album name, album year, track length, and other relevant information that may be useful for the user to know when controlling the media playback system 100 via the user interface 531.

The playback queue region 533*d* includes graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device. In some embodiments, for example, a playlist can be added to a playback queue, in which information corresponding to each audio item in the playlist may be added to the playback queue. In some embodiments, audio items in a playback queue may be saved as a playlist. In certain embodiments, a playback queue may be empty, or populated but "not in use" when the playback zone or zone group is playing continuously streaming audio content, such as Internet radio that may continue to play until otherwise stopped, rather than discrete audio items that have playback durations. In some embodiments, a playback queue can include Internet radio and/or other streaming audio content items and be "in use" when the playback zone or zone group is playing those items.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped.

Figure 6:
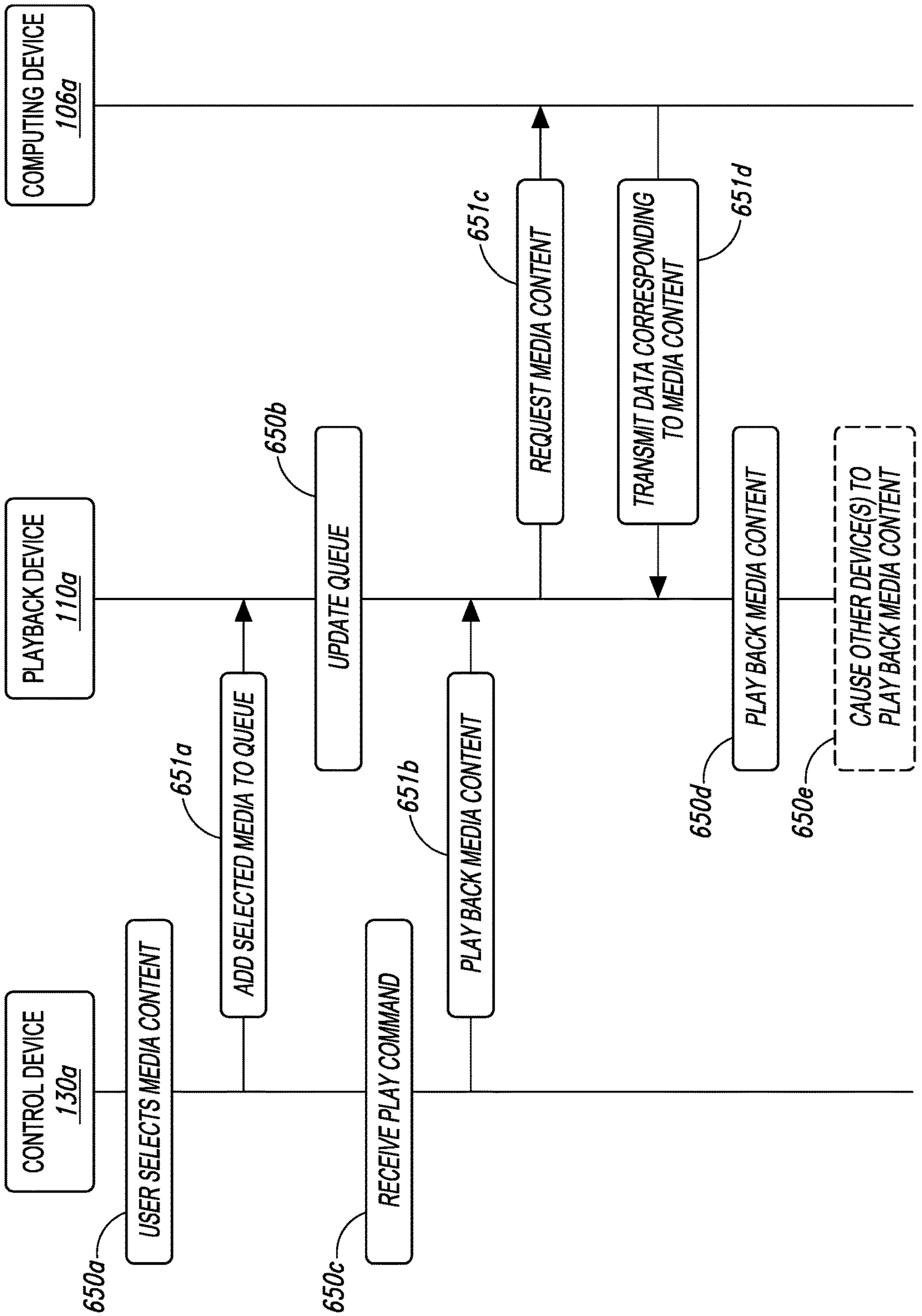
FIG. 6 shows a message flow diagram of a media playback system.

FIG. 6 is a message flow diagram illustrating data exchanges between devices of the media playback system 100 (FIGS. 1A-1M).

At step 650*a*, the media playback system 100 receives an indication of selected media content (e.g., one or more songs, albums, playlists, podcasts, videos, stations) via the control device 130*a*. The selected media content can comprise, for example, media items stored locally on or more devices (e.g., the audio source 105 of FIG. 1C) connected to the media playback system and/or media items stored on one or more media service servers (one or more of the remote computing devices 106 of FIG. 1B). In response to receiving the indication of the selected media content, the control device 130*a* transmits a message 651*a* to the playback device 110*a* (FIGS. 1A-1C) to add the selected media content to a playback queue on the playback device 110*a*.

At step 650*b*, the playback device 110*a* receives the message 651*a* and adds the selected media content to the playback queue for play back.

At step 650*c*, the control device 130*a* receives input corresponding to a command to play back the selected media content. In response to receiving the input corresponding to the command to play back the selected media content, the control device 130*a* transmits a message 651*b* to the playback device 110*a* causing the playback device 110*a* to play back the selected media content. In response to receiving the message 651*b*, the playback device 110*a* transmits a message 651*c* to the first computing device 106*a* requesting the selected media content. The first computing device 106*a*, in response to receiving the message 651*c*, transmits a message 651*d* comprising data (e.g., audio data, video data, a URL, a URI) corresponding to the requested media content.

At step 650*d*, the playback device 110*a* receives the message 651*d* with the data corresponding to the requested media content and plays back the associated media content.

At step 650*e*, the playback device 110*a* optionally causes one or more other devices to play back the selected media content. In one example, the playback device 110*a* is one of a bonded zone of two or more players (FIG. 1M). The playback device 110*a* can receive the selected media content and transmit all or a portion of the media content to other devices in the bonded zone. In another example, the playback device 110*a* is a coordinator of a group and is configured to transmit and receive timing information from one or more other devices in the group. The other one or more devices in the group can receive the selected media content from the first computing device 106*a*, and begin playback of the selected media content in response to a message from the playback device 110*a* such that all of the devices in the group play back the selected media content in synchrony.

IV. Overview of Example Embodiments

As mentioned above, wireless surround sound systems are desirable for many reasons, including their ease of deployment, use, reconfigurability, and upgradeability. In the embodiments disclosed and described herein, the multi-channel surround sound system can play audio content both (i) out loud in a listening area via a set of playback devices and/or (ii) via one or more headphone sets. In some embodiments, the multi-channel surround sound system is configured to switch between (i) playing audio content out loud in a listening area via a set of playback devices and (ii) playing audio content via one or more wireless headphone sets. For clarity, the example embodiments disclosed and described herein focus on scenarios where a multi-channel surround sound system plays audio content via one or more wireless headphone sets. However, persons of skill in the art will understand that the systems and methods disclosed and described herein are equally applicable to multi-channel surround sound systems where a surround sound controller provides audio content to one or more playback devices having at least two-channel playback capability. Similarly, for clarity, the example embodiments disclosed and described herein focus on scenarios where a surround sound processor generates (and headphone sets play) surround sound. However, persons of skill in the art will understand that the systems and methods disclosed and described herein are equally applicable to audio other than surround sound, including but not limited to stereo, quadraphonic, and/or other multi-channel audio.

As used herein, a set of headphones, a pair of headphones, and a headphone set all refer to a wireless headphone device configured to be worn by a user, where the headphone device comprises one or more left speakers and one or more right speakers, and where, when properly worn by a user, the headphone device is configured to play a left channel of audio content into the user's left ear and play a right channel of audio content into the user's right ear.

As mentioned above, technical challenges arise when generating and transmitting surround sound audio information to multiple headphone sets. In some embodiments, the surround sound controller generates and transmits different headphone-specific surround sound audio information to each headphone set, and each headphone set receives, processes, and plays surround sound content sufficiently fast so that a headphone wearer does not experience a "lip sync" delay. The time and wireless spectrum available to distribute content to every headphone set is finite. The surround sound controller and the headphone sets can use higher order wireless Modulation and Coding Schemes (MCS) for distributing surround sound audio information to all the headphone sets. But while higher order MCSs may have greater throughput, they tend to have lower wireless link margin, which can affect wireless range and transmission signal quality.

More particularly, in the context of the disclosed systems and methods, transmitting data at a higher MCS generally enables a surround sound controller to transmit more channel streams comprising surround sound audio content to more headphone sets more quickly (thereby avoiding or at least ameliorating undesirable "lip sync delay") because of the higher data throughput achievable at the higher MCS compared to lower MCSs. However, the higher MCS has lower wireless link margin, and thus, the higher MCS has lower range (i.e., shorter transmission distance) and is less robust when operating in environments having wireless interference, which can increase retransmissions and/or cause audio playback to drop out because of low wireless signal-to-noise ratio. Transmitting data at a lower MCS enables the surround sound processor to transmit channel streams comprising surround sound audio information to wireless headphones with a higher wireless link margin, and thus more reliably, particularly over longer distances and in environments with greater wireless interference. However, the lower data throughput at the lower MCS compared to the higher MCSs reduces the number of headphone sets that the surround sound controller can support simultaneously, at least in embodiments where the surround sound controller is configured to generate and transmit separate channel streams to each wireless headphone set. To strike a balance between data throughput and wireless link robustness, in some embodiments, the surround sound controller and the wireless headphone sets are configured to use different MCSs based on the number of headphone sets in concurrent operation as described herein.

V. Technical Features

In some embodiments, at least some aspects of the technical solutions derive from the technical structure and organization of the channel streams (and/or perhaps subchannels thereof), surround sound audio information, playback timing, and clock timing information generated by the surround sound controller and used by the one or more headphone sets to play surround sound audio information transmitted/received via channel streams.

Therefore, to aid in understanding certain aspects of the disclosed technical solutions, certain technical details of the channel streams, surround sound audio information, playback timing, and clock timing information, as well the generation and use of playback timing and clock timing for playing surround sound audio information are described below. Except where noted, the technical details of the channel streams, surround sound audio information, playback timing, and clock timing information described below are the same or at least substantially the same for the examples shown and described with reference to FIGS. 7, 8, 9, and 10.

a. Surround Sound Content

Surround sound content may be any type of surround sound content now known or later developed. In some embodiments, the surround sound audio content comprises surround sound content associated with video content. However, not all surround sound content is necessarily associated with video content. For example, some audio-only surround sound content may include movie soundtracks (without video), live concert recordings, immersive audio tracks, or similar content that may have been recorded for reproduction via a surround sound system but yet not have corresponding video content associated therewith.

In some embodiments, a surround sound processor for the surround sound system (i) receives surround sound content from a surround sound content source, (ii) processes the surround sound content to generate a plurality of channel streams (described further herein) comprising portions of the surround sound content (e.g., referred to as surround sound audio information, or audio samples of surround sound audio information), and (iii) transmits the channel streams comprising the surround sound audio information to one or more pairs of headphones over a Local Area Network (LAN), as described further herein. In some embodiments, the surround sound processor transmits channel streams comprising the surround sound information to one or more playback devices equipped with loudspeakers instead of (or perhaps in addition to) transmitting channel streams comprising the surround sound information to the one or more pairs of headphones.

In some embodiments, the surround sound processor is a standalone surround sound controller comprising one or more processors, one or more network and/or other interfaces, and tangible, non-transitory computer-readable media storing program code executed by the one or more processors to cause the surround sound controller to perform the surround sound processing features and functions described herein. In some embodiments, the surround sound controller or processor is a component of a playback device within the multi-channel surround sound system. For example, the surround sound processor in some embodiments may be a component of a soundbar, entertainment head-end, television, audio tuner, computer, or other device comprising one or more processors, one or more network and/or other interfaces, and tangible, non-transitory computer-readable media storing program code executed by the one or more processors to cause the surround sound processor to perform the features and functions described herein.

In some embodiments, the surround sound content received by the surround sound processor comprises multiple discrete surround sound channels, where each discrete surround sound channel is intended for playback by one or more speakers in a set of speakers in the surround sound system, e.g., left front, right front, center, sub, left rear, right rear, etc. in a Dolby® Pro Logic® 5.1, 7.1, 9.1, 11.1 or other channel-based surround sound format. In some embodiments, when the surround sound content comprises multiple discrete surround sound channels, the surround sound processor mixes the multiple channels to create virtual surround sound audio played via a left channel and a right channel of a headphone set.

In some embodiments, the surround sound content received by the surround sound processor comprises surround sound audio content and surround sound audio object data, e.g., in a Dolby Atmos® format, DTS:X® format, or other audio object-based format. In some embodiments that use audio object data (or similar data) like Dolby Atmos®, DTS:X®, and similar formats, the surround sound processor uses the surround sound audio content and the surround sound audio object data to render virtual surround sound audio played via a left channel and a right channel of a headphone set.

In some embodiments, the surround sound processor receives the surround sound content from a surround sound content source in digital form, e.g., as a stream of packets. In some embodiments, individual packets in the stream of packets have a sequence number or other identifier that specifies an ordering of the packets. Packets transmitted over a data packet network (e.g., Ethernet, WIFI, or other packet networks) may arrive out of order, so the surround sound processor uses the sequence number or other identifier to reassemble the stream of packets in the correct order before performing further processing of the surround sound content. In some embodiments, the sequence number or other identifier that specifies the ordering of the packets is or at least comprises a timestamp indicating a time when the packet was created by a device that transmitted the packet. The packet creation time can be used as a sequence number based on an assumption that packets are created in the order in which they should be subsequently processed to create channel streams.

After obtaining the surround sound content from the surround sound content source and processing the surround sound content to generate the virtual surround sound audio for the one or more headphone sets, the surround sound processor sends the left and right channels of virtual surround sound audio to each headphone set via one or more channel streams (described herein). In some embodiments, the surround sound processor generates first virtual surround sound audio (comprising left and right channels) for a first headphone set and second virtual surround sound audio (comprising left and right channels) for a second headphone set, where the first virtual surround sound audio is different than the second virtual surround sound audio. In such embodiments, the surround sound processor generates the first virtual surround sound audio and the second virtual surround sound audio based on the same incoming surround sound content (described above). But the difference between the first virtual surround sound audio and the second virtual surround sound audio is based on the difference in the positions of the first and second headphone sets relative to a screen displaying video content associated with the surround sound content.

b. Surround Sound Content Source

In operation, the surround sound processor component obtains any of the aforementioned types of surround sound content from a surround sound content source via an interface, e.g., a wired or wireless network interface(s), a "line-in" analog interface, a digital audio interface, an HDMI interface, an optical interface, or any other interface suitable for receiving audio content in digital or analog format now known or later developed.

A surround sound content source is any system, device, or application that generates, provides, or otherwise makes available any of the aforementioned surround sound content to a surround sound processor. For example, in some embodiments, a surround sound content source includes any one or more of a streaming media (audio, video) service, digital media server or other computing system, Voice Assistant Service (VAS), gaming console, television, cable set-top-box, streaming media player (e.g., AppleTV®, Roku®, gaming console), CD/DVD player, telephone, tablet, or any other source of surround sound content now known or later developed.

c. Channel Streams

Figure 7:
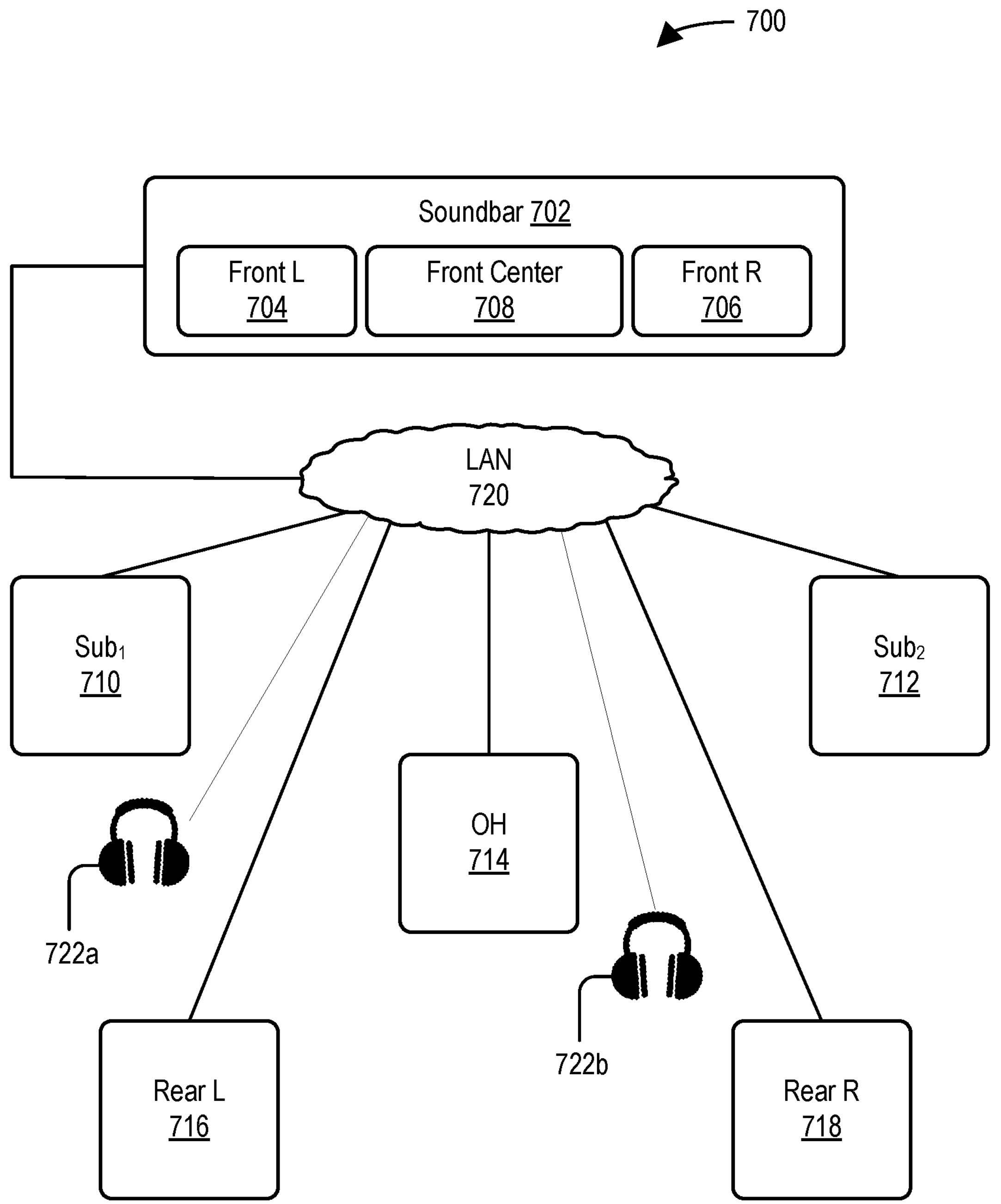
FIG. 7 shows an example configuration of a multichannel audio system with wireless headphones according to some embodiments.

In some embodiments, and as mentioned above, the surround sound processor (i) generates one or more channel streams based on the surround sound content and (ii) transmits one or more of the generated one or more channel streams (or at least one or more portions thereof) to one or more headphone sets. As illustrated in FIG. 7, in some embodiments, a soundbar comprising the surround sound processor (i) generates channel streams based on the surround sound content and (ii) transmits one or more of the generated channel streams (or at least one or more portions thereof) to individual headphone sets.

In operation, each channel stream for a headphone set includes surround sound audio information based on at least a portion of the surround sound content received by the surround sound processor. In some embodiments, each channel stream may additionally include playback timing for the surround sound audio information in the channel stream. In some embodiments, the surround sound processor generates the playback timing for the surround sound audio information in each channel stream. In some embodiments, individual channel streams comprise multiple subchannels of surround sound audio information. For example, an individual channel stream for a headphone set may include left and right subchannels. In some headphone embodiments, rather than generating a single channel comprising left and right subchannels, the surround sound processor may instead generate a first channel stream comprising surround sound audio content for playback by a left headphone and a second channel stream comprising surround sound audio content for playback by a right headphone.

In some embodiments, an individual channel stream includes both (i) the surround sound audio information for the channel stream and (ii) the playback timing for the surround sound audio information of the channel stream. For some embodiments where a channel stream includes multiple subchannels, each subchannel includes audio information for the subchannel and playback timing for the surround sound audio information of the subchannel. But for some embodiments where a channel stream includes multiple subchannels, each subchannel includes audio information for the subchannel, but the channel stream includes playback timing for the set of subchannels.

Alternatively, in some embodiments, an individual channel stream includes the surround sound audio information for the channel stream, and the playback timing for the surround sound audio information for the channel stream is sent separately from the surround sound audio information of the channel stream.

In some embodiments, an individual channel stream includes a plurality of frames (or cells, or packets), wherein an individual frame includes a portion (e.g., a set of audio samples) of surround sound audio information and a playback time for that portion of the surround sound audio information (e.g., a playback time for that set of audio samples). In some embodiments, and as described further herein, the playback time for that portion of the surround sound audio information corresponds to a future time relative to a clock time of a clock that the surround sound processor uses to generate the playback timing for that portion of the surround sound audio information.

In some embodiments, the soundbar (or other component comprising the surround sound processor) transmits individual channel streams to individual headphone sets using each headphone set's individual network address. For example, in some embodiments, each headphone set has a corresponding unicast network address, and the soundbar transmits each individual channel stream to the channel stream's corresponding headphone set via that headphone set's corresponding unicast network address. Each headphone set receives its corresponding channel stream(s) via its corresponding unicast network address.

In some embodiments, the soundbar (or other component comprising the surround sound processor) alternatively transmits one or more of the channel streams to one or more of the headphone sets using a multicast network address, and one or more headphone sets in the surround sound system receive the channel stream via that multicast address. For example, in some embodiments, the soundbar transmits all of the channel streams to a multicast network address, and all of the headphone sets receive all of the channel streams via the multicast network address. Then, at each headphone set, the headphone set determines which channel stream(s) it should process to generate analog audio signals for playback via the speakers in each of its headphones.

d. Playback Timing

In some embodiments, each headphone set uses playback timing for surround sound audio information in a channel stream to generate and playback analog audio signals based on surround sound audio information in the channel stream. In some embodiments, the soundbar (or other component comprising a surround sound processor) generates the playback timing for the surround sound audio information for each channel stream based on clock timing (described below).

In some embodiments, the soundbar (i) generates playback timing for surround sound audio information of an individual channel stream based on clock timing from a local clock at the soundbar, and (ii) transmits the generated playback timing to all the headphone sets configured to receive the individual channel stream and play the surround sound audio information in that individual channel stream.

In operation, when generating playback timing for an individual frame (or packet) of a channel stream (or sub-channel thereof), the soundbar adds a "timing advance" to the current clock time of a local reference clock at the soundbar. Adding this "timing advance" to the current clock time results in a playback time for the frame/packet (or frames/packets) that amounts to a future time relative to that current clock time of the soundbar at the time the soundbar generated the frame(s)/packet(s) comprising the portion(s) of the surround sound audio information.

In some embodiments, the "timing advance" is based on an amount of time that is greater than or equal to the sum of (i) the network transit time required for frames and/or packets of the channel stream comprising the surround sound audio information transmitted from the soundbar to arrive at the headphone set(s) configured to use the playback timing for playing the surround sound audio information in that channel stream and (ii) the amount of time required for the headphone set(s) configured to use that playback timing to receive, process, and play the surround sound audio information in that channel stream.

In some embodiments, the soundbar determines a timing advance by sending one or more test packets to one or more (or perhaps all) headphone sets configured to play surround sound content, and then receiving test response packets back from one or more of the headphone sets. In some embodiments, the soundbar and the one or more headphone sets negotiate a timing advance via multiple test and response messages. In some embodiments with multiple headphone sets, the soundbar determines a timing advance by exchanging test and response messages with each headphone set, and then setting a timing advance that is sufficient for the headphone set having the longest total of network transmit time and packet processing time.

In some embodiments, the timing advance is less than about 15-20 milliseconds. In further embodiments, the timing advance is less than about 10 milliseconds. In some embodiments, the timing advance remains constant after being determined, or at least remains constant for a substantial duration, e.g., during an entire surround sound playback session. In other embodiments, the soundbar can change the timing advance (including changing the timing advance during a surround sound playback session) in response to a request from a headphone set indicating that a greater timing advance is required (e.g., because the headphone set is not receiving packets of its channel stream comprising portions of surround sound audio content until after the playback time for those packets or without enough time to process and play the audio information in those packets at the designated playback time) or a shorter timing advance would be sufficient (e.g., because the headphone set is buffering more packets of its channel stream comprising portions of surround sound audio information than necessary to provide consistent, reliable playback).

In some embodiments, the playback timing is generated for individual frames (or packets), or individual sets of frames or packets, comprising audio samples of the surround sound audio information of a channel stream. As described above, in some embodiments, the surround sound audio information is packaged in a series of frames (or packets) where individual frames (or packets) comprise a portion of the surround sound audio information, e.g., audio samples of the surround sound audio information. In some embodiments, the playback timing for the surround sound audio information includes a playback time for each frame (or packet) of the surround sound audio information. In some embodiments, the playback timing for an individual frame is included within the frame (or packet), e.g., in the header of the frame, in an extended header of the frame, in the payload portion of the frame, and/or in some other designated portion of the frame. In other embodiments, the playback timing for a set of frames (or packets) is included within one frame of the set of frames, or alternatively, the playback timing for the set of frames is included in a separate frame associated with the corresponding set of frames.

In some embodiments, the playback time for an individual frame (or packet) is identified within a timestamp or other indication. In such embodiments, the timestamp (or other indication) represents a time to play the surround sound audio information within that individual frame (or packet), or perhaps groups/sets of frames or packets. In operation, when the playback timing for an individual frame (or packet) is generated, the playback timing for that individual frame is a future time relative to a current clock time of a reference clock at the time that the playback timing for that individual frame is generated.

e. Clock Timing

Clock timing can play an important role in synchronous playback of the surround sound content disclosed and described herein. In some embodiments when the soundbar is in an operating mode where it plays audio content in synchrony with one or more satellite playback devices, the soundbar uses its own local clock and playback timing for surround sound audio information in a channel stream to generate and play analog audio signals based on the surround sound audio information in that channel stream in synchrony with the one or more satellite playback devices. In the embodiments described herein where the soundbar is in an operating mode where it does not play audio content in synchrony with one or more satellite playback devices, but instead, generates and transmit channel streams comprising audio information to one or more headphone sets, each headphone set uses clock timing information from the soundbar, the headphone set's local clock timing, and the playback timing for the surround sound audio information in the channel stream to generate and play analog audio signals based on the surround sound audio information received via the channel stream.

In embodiments where synchronous playback of the surround sound content by multiple headphone sets is desirable, the soundbar (or other device comprising the surround sound processor) provides clock timing information to each headphone set in the system. This clock timing information includes a clock time of the reference clock that the soundbar uses to generate playback timing for surround sound audio information in an individual channel stream.

In some embodiments, each headphone set receives one or more channel streams comprising surround sound audio information and playback timing information for the surround sound audio information in the channel stream. The combination of the surround sound audio information and the playback timing for the surround sound audio information in each channel stream is unique to each channel stream. However, the soundbar generates the playback timing for each channel stream using the same reference clock. So, while each headphone set receives surround sound audio information and playback timing (for that surround sound audio information) unique to its channel stream(s), all the headphone sets receive the same clock timing information from the soundbar (or other device comprising the surround sound processor).

h. Headphone Set Using Playback Timing and Clock Timing to Play Surround Sound Content in Synchrony with Other Headphone Sets Recall that, in some embodiments, the soundbar (or other device comprising the surround sound processor) transmits channel streams comprising surround sound audio information along with playback timing for the surround sound audio information to one or more headphone sets. The soundbar (or other device comprising the surround sound processor) also transmits clock timing information to the headphone sets. And while each headphone set receives surround sound audio information and playback timing (for that surround sound audio information) that is unique to its channel stream(s), all the headphone sets receive the same clock timing information from the soundbar (or other device comprising the surround sound processor).

To play an individual frame (or packet) of surround sound audio information in synchrony with another headphone set, the headphone set, for each channel stream that the headphone set is configured to process, (i) receives the frames (or packets) of the channel stream comprising the portions of the surround sound audio information from the soundbar, (ii) receives the playback timing for the surround sound audio information from the soundbar (e.g., in the frame and/or packet headers of the frames and/or packets of the channel stream comprising the portions of the surround sound audio information or perhaps separately from the frames and/or packets of the channel stream comprising the portions of the surround sound audio information), (iii) receives the clock timing from the soundbar, and (iv) plays the portion(s) of the surround sound audio information in the individual frame (or packet) when the headphone set's local clock that the headphone set uses for playback reaches the playback time specified in the playback timing for that individual frame (or packet) of surround sound audio information received from the soundbar, as adjusted by a "timing offset."

In operation, after the headphone set receives clock timing from the soundbar (or other device comprising the surround sound processor), the headphone set determines a "timing offset" for the headphone set. This "timing offset" comprises (or at least corresponds to) a difference between the "reference" clock at the soundbar (that the soundbar used to generate the playback timing) and a "local" clock at the headphone set that the headphone set uses to play the surround sound content. In operation, each headphone set that receives the clock timing from the soundbar calculates its own "timing offset" based on the difference between its local clock and the clock timing received from the soundbar, and thus, the "timing offset" that each headphone set determines is specific to that particular headphone set. As such, each headphone set may operate with a different timing offset.

In some embodiments, when playing back the surround sound audio information of a particular channel stream, the headphone set generates new playback timing (specific to the headphone set) for individual frames (or packets) of surround sound audio information by adding the previously determined "timing offset" to the playback timing for each frame (or packet) of surround sound audio information of the channel stream received from the soundbar. With this approach, the headphone set converts the playback timing for the surround sound audio information received from the soundbar into "local" playback timing for the headphone set. Because each headphone set calculates its own "timing offset," each headphone set's determined "local" playback timing for an individual frame is specific to that particular headphone set.

And when the "local" clock that the headphone set is using for playing back the surround sound audio information received via the channel stream reaches the "local" playback time for an individual frame (or packet) comprising portions (e.g., audio samples) of the surround sound audio information, the headphone set plays the portions of surround sound audio information (e.g., the audio samples of surround sound information) associated with that individual frame (or packet).

Thus, each headphone set plays frames (or packets) comprising portions of the surround sound audio information of its assigned channel stream(s) according to the playback timing for that surround sound audio information as adjusted by the "timing offset" based on a difference between the headphone set's clock timing and the soundbar's clock timing. And because the soundbar generated the playback timing for those frames (or packets) of surround sound audio information for each headphone set's assigned channel stream(s) relative to the soundbar's local clock timing, and further, because each headphone set uses the clock timing received from the soundbar to calculate its own headphone-set-specific "timing offset," each headphone set plays its corresponding frames (or packets) comprising corresponding portions of surround sound audio information for the same surround sound content in synchrony, i.e., at the same time or at substantially the same time, even when none of the headphone sets are synchronized to a master clock.

VI. Example System Architecture

FIG. 7 shows an example configuration of a multichannel audio system with wireless headphones according to some embodiments.

The multichannel surround sound system 700 comprises a plurality of playback devices, including a Soundbar 702, a $Sub_1$ 710, a $Sub_2$ 712, an Overhead 714, a Rear L 716, and a Rear R 718. In operation, the plurality of playback devices 702, 710-718 are configured to communicate with each other directly and/or indirectly via a Local Area Network (LAN) 720. In some embodiments, the Soundbar 702, $Sub_1$ 710, $Sub_2$ 712, Overhead 714, Rear L 716, and Rear R 718 playback devices are connected to the LAN 720, and the Soundbar 702 communicates directly with the satellite playback devices (i.e., the $Sub_1$ 710, $Sub_2$ 712, Overhead 714, Rear L 716, and Rear R 718 playback devices) via direct wireless transmissions so that packets and/or frames transmitted between and among the Soundbar 702, $Sub_1$ 710, $Sub_2$ 712, Overhead 714, Rear L 716, and Rear R 718 playback devices need not traverse a WIFI router or LAN access point. In other embodiments, packets and/or frames transmitted between and among the Soundbar 702, $Sub_1$ 710, $Sub_2$ 712, Overhead 714, Rear L 716, and Rear R 718 playback devices traverse an intermediate WIFI router or LAN access point as in a typical WIFI LAN configuration. In some embodiments, some packets/frames are transmitted directly between and among the Soundbar 702, $Sub_1$ 710, $Sub_2$ 712, Overhead 714, Rear L 716, and Rear R 718 playback devices without traversing a WIFI router or access point, and some packets/frames are transmitted indirectly (e.g., traverse a WIFI router or access point) between and among the Soundbar 702, $Sub_1$ 710, $Sub_2$ 712, Overhead 714, Rear L 716, and Rear R 718 playback devices. For example, in some embodiments, the Soundbar 702 may transmit channel streams (and perhaps other transmissions associated with synchronous playback, such as clock timing and/or playback timing) to individual satellite playback devices (i.e., the $Sub_1$ 710, $Sub_2$ 712, Overhead 714, Rear L 716, and Rear R 718 playback devices) via direct wireless transmissions that do not traverse a WIFI router or access point, but the Soundbar 702 may transmit packets/frames comprising other data (e.g., other management and control signaling and messages) to the individual satellite playback devices via transmissions that traverse the WIFI router or access point.

The Soundbar 702 is configured to play (i) a front left channel (FL) via Front L speaker 704, (ii) a front right channel (FR) via Front R speaker 706, and (iii) a front center channel (FC) via Front Center speaker 708. Collectively, the set of FL, FR, and FC channels are sometimes referred to herein as the front channels, or F channels. In some embodiments, the Soundbar 702 is additionally configured to play certain overhead channels via upward-firing speaker drivers, such as a front right up-firing channel (FRU), a front left up-firing channel (FLU), and a center up-firing channel (FCU). In some such embodiments, the front (F) channels include the set of FL, FLU, FR, FRU, FC, and FCU channels.

In some embodiments, Soundbar 702 includes a surround sound processor configured to perform the surround sound processor functions disclosed and described herein. In some embodiments, the Soundbar 702 is considered a surround sound system controller and the playback devices $Sub_1$ 710, $Sub_2$ 712, Overhead 714, Rear L 716, and Rear R 718 are considered surround sound satellites or satellite playback devices.

Some embodiments additionally include one or more of headphones 722*a* and 722*b* for listening to surround sound content when the Soundbar 702 and satellite playback devices 710-718 in the system 700 are muted. For example, and as mentioned above, in some embodiments, the Soundbar 702 is configured to operate in multiple modes, including (i) one or more operating modes where the Soundbar 702 is configured to play audio out loud in synchrony with one or more satellite playback devices, and (ii) one or more operating modes where the Soundbar 702 is configured to transmit audio information to one or more headphone sets, e.g., headphone sets 722*a* and 722*b*. Although the example in FIG. 7 shows two headphone sets 722*a* and 722*b*, persons of skill in the art will understand that the system 700 could operate with a single headphone set or with more than two headphone sets.

In some embodiments, the Soundbar 702 and the headphone sets 722*a* and 722*b* are connected to the LAN 720, and the Soundbar 702 communicates directly with the headphone sets 722*a* and 722*b* via direct wireless transmissions so that packets and/or frames transmitted between and among the Soundbar 702 and the headphone sets 722*a* and 722*b* need not traverse a WIFI router or LAN access point. In some embodiments, the Soundbar 702 and the headphone sets 722*a* and 722*b* communicate directly with each other via direct BLUETOOTH or other point-to-point and/or point-to-multipoint wireless transmissions (not shown) so that packets and/or frames transmitted between and among the Soundbar 702 and the headphone sets 722*a* and 722*b* are separate from and preferably do not interfere with transmissions traversing the LAN 720.

In other embodiments, packets and/or frames transmitted between and among the Soundbar 702 and the headphone sets 722*a* and 722*b* traverse an intermediate WIFI router or LAN access point as in a typical WIFI LAN configuration. In some embodiments, some packets/frames are transmitted directly (e.g., via direct 2.4 GHz, 5.0 GHz or other wireless transmission, including but not limited to WIFI, WIFI-type, and BLUETOOTH transmission) between and among the Soundbar 702 and the headphone sets 722*a* and 722*b* without traversing a wireless router or access point, and some packets/frames are transmitted indirectly (e.g., traverse a wireless router or access point) between and among the Soundbar 702 and the headphone sets 722*a* and 722*b*. For example, in some embodiments, the Soundbar 702 may transmit channel streams (and perhaps other transmissions, such as clock timing and/or playback timing) to individual headphone sets 722*a* and 722*b* via direct wireless transmissions that do not traverse a wireless router or access point, but the Soundbar 702 may transmit packets/frames comprising other data (e.g., other management and control signaling and messages) to the individual headphone sets 722*a* and 722*b* via transmissions that traverse a wireless router or access point.

In operation, in the example system 700, Soundbar 702 receives surround sound content from a surround sound content source and processes the surround sound content as described herein to generate a plurality of channel streams. Depending on the Soundbar's 702 mode of operation, the individual channel streams include surround sound audio information for playback by a playback device (e.g., the Soundbar 702 and/or one more of the satellite playback devices 710-718) and/or a headphone set (e.g., one or more of headphone sets 722*a* and 722*b*).

VII. Example Timing Diagram

Figure 8:
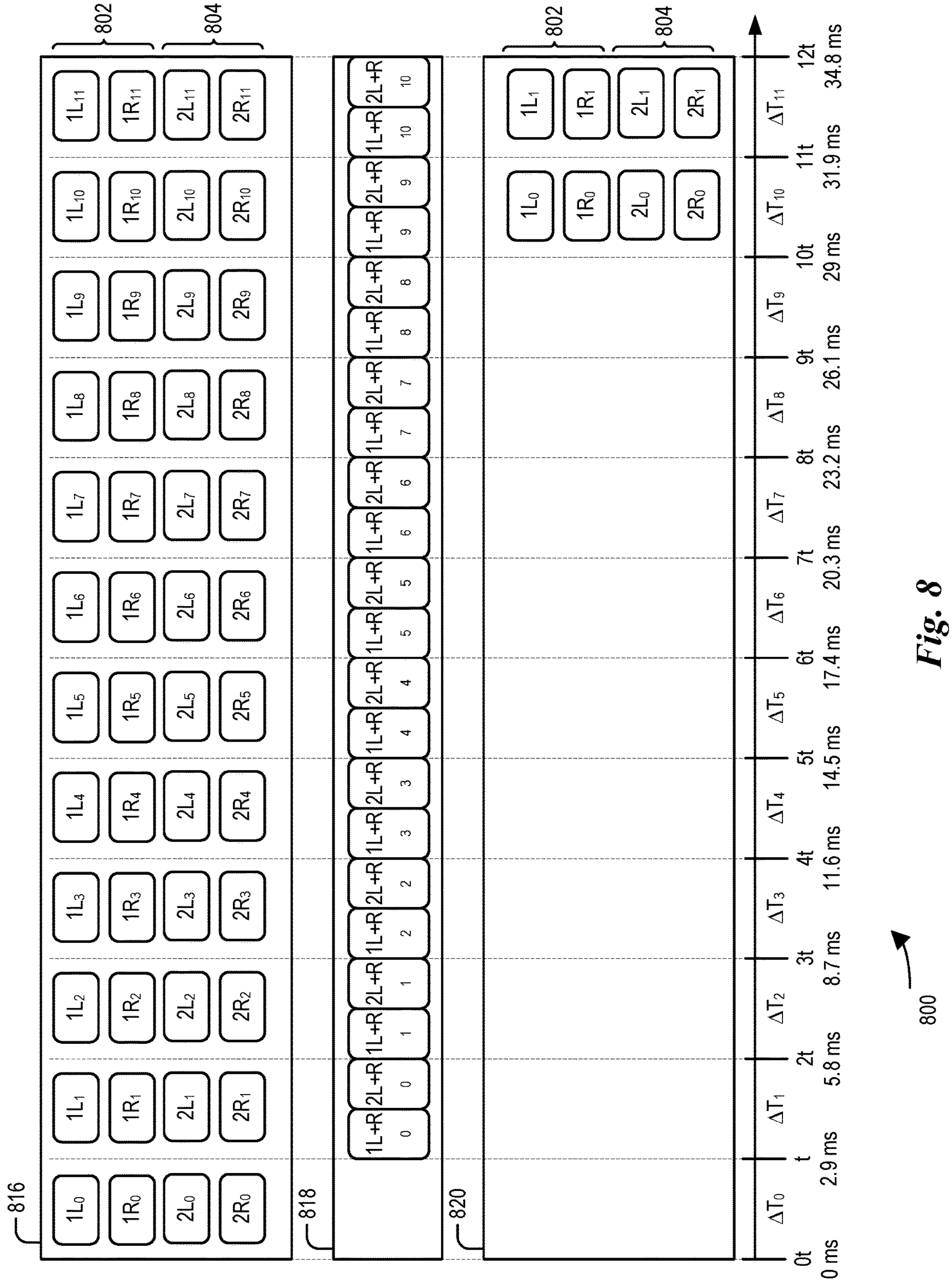
FIG. 8 shows an example timing diagram for generating and transmitting surround sound audio information to multiple sets of wireless headphones according to some embodiments.

FIG. 8 shows an example timing diagram for generating and transmitting surround sound audio information to multiple sets of wireless headphones according to some embodiments. Persons of skill in the art will appreciate that the size of the frames (or sets of frames) of the channel streams shown in diagram 800 do not necessarily correspond to specific amounts of data, number of audio samples, frame/packet size, transmission duration, or other physical attributes relating to the packaging, transmission, or playback of the surround sound audio information.

With reference to the example system architecture 700 in FIG. 7, timing diagram 800 illustrates one example implementation of how Soundbar 702 generates a plurality of channel streams 802-804 and transmits the channel streams 802-804 to the headphone sets for playback, including headphone set 722*a* and 722*b*.

More particularly, region 816 of the timing diagram 800 shows the generation of channel streams 802-804 as function of a plurality of multi-millisecond timeframes illustrated along the x-axis of the diagram 800, region 818 of the timing diagram 800 shows the transmission of channel streams 802-804 as a function of the plurality of multi-millisecond timeframes, and region 820 of the timing diagram 800 shows playback of channel streams 802-804 at individual headphone sets as a function of the plurality of multi-millisecond timeframes.

The example procedures illustrated in example timing diagram 800 satisfy two important technical requirements for enabling the surround sound system 700 to play surround sound content having corresponding video content, e.g., video content for a television show, movie, video game, web video, or other video content.

First, in some embodiments, it is desirable in some instances for the headphones 722*a* and 722*b* to also play their respective portions of the surround sound content (with or without corresponding surround video content) in synchrony (or at least substantially in synchrony) with each other. In some embodiments, a first headphone sets plays surround sound content "substantially in synchrony" with a second headphone set when the first headphone set plays a portion of surround sound content within a threshold timeframe before or after the second headphone set plays a corresponding portion of the surround sound content (e.g., the first headphone set playing a portion of surround sound content between about −180 ms and about +80 ms of the second headphone set playing a corresponding portion of surround sound content, the first headphone set playing a portion of surround sound content between about −130 ms and about +50 ms of the second headphone set playing a corresponding portion of surround sound content, and/or the first headphone set playing a portion of surround sound content between about −100 ms and +25 ms of the second headphone set playing a corresponding portion of surround sound content).

Second, and for surround sound content that has corresponding video content, it can be important for the Soundbar 702 to process and distribute the surround sound content to the headphone sets 722*a* and 722*b* for processing and playback sufficiently quickly such that the surround sound content played by the headphone sets 722*a* and 722*b* is not perceived to be out of sync with the corresponding video content. In some embodiments, playing the surround sound content "substantially in sync" with its corresponding video content refers to playing the surround sound content within a threshold timeframe before or after the corresponding video content is displayed on a screen (e.g., playing the surround sound content between about −180 ms and about +80 ms of displaying the corresponding video content, playing the surround sound content between about −130 ms and about +50 ms of displaying the corresponding video content, and/or playing the surround sound content between about −100 ms and +25 ms of displaying the corresponding video content).

In some embodiments, the time difference between playback of a portion of surround sound content by a headphone set and display of that portion of surround sound content's corresponding portion of video content on a video display is based at least in part on the time required for the Soundbar 702 to transmit the surround sound content to the headphone set.

For embodiments where the Soundbar 702 transmits one or more channel streams comprising surround sound audio information to a headphone set via WIFI (directly from the Soundbar 702 to the headphone set or indirectly from the Soundbar 702 to the headphone set via a wireless router or access point), one factor that affects the time required to transmit the surround sound content from the Soundbar 702 to the headphone set is the radio frequency Modulation and Coding Scheme (MCS) that the Soundbar 702 uses to transmit the channel stream(s) comprising the surround sound audio information to the headphone set.

For WIFI embodiments, the MCS specifies a combination of (i) the number of spatial streams, (ii) the modulation type, and (iii) the coding rate for WIFI transmissions between the Soundbar 702 and the headphone set(s). The number of spatial streams refers to the number of separate data transmissions in the same frequency space. With WIFI Multiple Input/Multiple Output (MIMO) schemes, it is possible transmit and receive up to four separate spatial streams of data. Future standards will allow up to eight or more separate spatial streams. The modulation type refers to how the data is encoded for transmission. More complex modulation methods (e.g., 16-QAM and 64-QAM) can sustain higher data rates but generally require less interference and good line of sight (LOS) between the transmitter and receiver. In contrast, less complex modulation methods (e.g., BPSK, QPSK) tend to be more tolerant to interference but generally have lower data rates. The coding rate refers to how much of the data stream is actually being used to transmit usable data. In operation, the coding rate is expressed as a fraction with the most efficient rate being 5/6 or 83.3% of the data stream being used.

In the context of the disclosed systems, transmitting data at a higher MCS generally enables the Soundbar 702 to transmit more channel streams to more headphone sets more quickly (thereby avoiding or at least ameliorating undesirable "lip sync delay") because of the higher data throughput achievable at the higher MCS compared to lower MCSs. However, the higher MCS has lower wireless link margin, and thus, the higher MCS has lower range (i.e., shorter transmission distance) and is less robust when operating in environments having wireless interference, which can increase retransmissions and/or cause audio playback to drop out because of low wireless signal-to-noise ratio. Transmitting data at a lower MCS enables the Soundbar 702 to transmit channel streams to headphones with a higher wireless link margin, and thus more reliably, particularly over longer distances and in environments with greater wireless interference. However, the lower data throughput at the lower MCS compared to the higher MCSs reduces the number of headphone sets that the Soundbar 702 can support simultaneously, at least in embodiments where the Soundbar 702 is configured to generate and transmit separate channel streams to each headphone set.

a. Switching Between Headphone Operating Modes

To strike a balance between data throughput and wireless link robustness, in some embodiments, the Soundbar 702 and the headphone sets 722*a* and 722*b* are configured to use different MCSs based on the number of headphone sets in simultaneous operation.

For example, in some embodiments, the Soundbar 702 is configured to operate in a plurality of different operating modes (or states), including but not limited to multiple headphone operating modes (or states). In some embodiments, the operating modes include (i) a first headphone connectivity mode, where the Soundbar 702 is configured to use a first MCS to transmit a first channel stream comprising first surround sound audio information to a first pair of headphones 722*a*, and (ii) a second headphone connectivity state, where the Soundbar 702 is configured to concurrently use a second MCS to transmit (a) the first channel stream comprising the first surround sound audio information to the first pair of headphones 722*a* and (b) a second channel stream comprising second surround sound audio information to a second pair of headphones 722*b*. In such embodiments, the first MCS corresponds to a lower data throughput at a higher wireless link margin than the second MCS. In embodiments with three, four, or perhaps more headphone sets, the Soundbar 702 and the headphone sets can use MCSs with higher data throughput but lower wireless link margin as the number of concurrent headphone sets grows, as long as the wireless link margin is sufficient to support reliable transmission from the Soundbar 702 to the multiple headphone sets. In operation, the Soundbar 702 (and the headphone sets) are configured to switch between operating modes (and corresponding higher or lower MCSs) as headphone sets join and/or leave the system 700.

For example, when the Soundbar 702 is operating in a non-headphone mode (e.g., operating in a mode where the Soundbar 702 is configured to play audio content out loud in synchrony with one or more satellite playback devices), the Soundbar 702 switches from that non-headphone mode into operating in the first headphone connectivity mode in response to one or more of (i) a request from a headphone set (e.g., headphone set 722*a*) to connect to the Soundbar 702, (ii) detecting that a headphone set (e.g., headphone set 722*a*) associated with the Soundbar 702 is been powered on, (iii) detecting that a headphone set (e.g., headphone set 722*a*) associated with the Soundbar 702 is powered on and within wireless transmission range of the Soundbar 702, (iv) a request received from a controller device (e.g., a controller application running on a smartphone, tablet, or other computing device) to switch to operating in the first headphone connectivity mode, and/or (v) detecting actuation of a physical switch or button on the Soundbar 702 that causes the Soundbar 702 to switch between and among various operating modes.

Similarly, when Soundbar 702 is operating in the first headphone connectivity mode, the Soundbar 702 switches from operating in the first headphone connectivity mode to operating in the second headphone connectivity mode in response to one or more of (i) a request from an additional headphone set (e.g., headphone set 722*b*) to connect to the Soundbar 702, (ii) detecting that an additional headphone set (e.g., headphone set 722*b*) associated with the Soundbar 702 is been powered on, (iii) detecting that an additional headphone set (e.g., headphone set 722*b*) associated with the Soundbar 702 is powered on and within wireless transmission range of the Soundbar 702, (iv) a request received from a controller device (e.g., a controller application running on a smartphone, tablet, or other computing device) to switch to operating in the second headphone connectivity mode and/or (v) detecting actuation of a physical switch or button on the Soundbar 702 that causes the Soundbar 702 to switch between and among various operating modes.

Further, when Soundbar 702 is operating in the second headphone connectivity mode, the Soundbar 702 switches from operating in the second headphone connectivity mode to operating in the first headphone connectivity mode in response to one or more of (i) a request from a headphone set (e.g., headphone set 722*a* or 722*b*) to disconnect to the Soundbar 702, (ii) detecting that a headphone set (e.g., headphone set 722*a* or 722*b*) associated with the Soundbar 702 is been powered on, (iii) a request received from a controller device (e.g., a controller application running on a smartphone, tablet, or other computing device) to switch to operating in the first headphone connectivity mode, and/or (iv) detecting actuation of a physical switch or button on the Soundbar 702 that causes the Soundbar 702 to switch between and among various operating modes.

b. Generating Channel Streams

As described above, the Soundbar 702 generates channel streams 802-804 for individual headphone sets, where each channel stream 802-804 comprises surround sound audio information for an individual headphone set. In operation, the Soundbar 702 uses incoming surround sound content to generate the surround sound audio information that it transmits to the headphone sets 722*a* and 722*b*.

In some embodiments, processing the incoming surround sound content includes mixing channels of incoming surround sound content to generate individual channels of surround sound audio information for playback by one or both of the headphone sets 722*a* and 722*b*. In some embodiments, processing the incoming surround sound content includes using audio object information (e.g., Dolby Atmos® or DTS:X® audio object information) to generate a plurality of channel streams of surround sound audio information for playback by one or both of the headphone sets 722*a* and 722*b*.

In some embodiments, the channel stream for an individual headphone set is based on the surround sound audio content, the audio object information, and a position of the first pair of headphones relative to a video screen configured to display video content associated with the surround sound content. For example, in such embodiments, if the first headphone set 722*a* is to the right of the video screen and the second headphone set 722*b* is to the left of the video screen, then the surround sound audio information played by the first headphone set 722*a* would be different than the surround sound audio information played by the second headphone set 724*b* because the two headphone sets 722*a* and 722*b* are at different positions relative the video screen configured to display the video content associated with the surround sound content.

In operation, the Soundbar 702 can determine the position of a headphone set relative to the video screen in a number of ways. For example, if the Soundbar 702 is positioned under or above the video screen, which is typical, then the Soundbar 702 can use the position of a headphone set relative to the Soundbar 702 as an approximation of the position of the headphone set relative to the screen. The Soundbar 702 can determine the position of a headphone set relative to the Soundbar 702 via one or more of (i) wireless (e.g., WIFI, BLUETOOTH, etc.) signal strength (e.g., received signal strength (RSS) measurements), (ii) wireless round-trip transmission time (RTT), (iii) wireless time of flight (TOF) measurements, (iv) wireless time of arrival (TOA) measurements, (v) beamforming, (vi) wireless ranging approaches now known or later developed, and/or (vi) any combination of two or more of the aforementioned approaches. The Soundbar 702 can additionally or alternatively determine the position of a headphone set relative to the Soundbar 702 via ultrasonic acoustic signaling transmitted by one or both of the Soundbar 702 and/or the headphone set in combination with acoustic beamforming, RTT, TOF, TOA, or other approaches for sound location now known or later developed.

In some embodiments, the Soundbar 702 may use one or more of the aforementioned wireless and/or acoustic methods (individually or in combination) to determine the position of a headphone set relative to the Soundbar 702. Additionally, or alternatively, a headphone set may use one or more of the aforementioned wireless and/or acoustic methods (individually or in combination) to determine its position relative to the Soundbar 702 and then transmit an indication of its determined position to the Soundbar 702. In some embodiments, the Soundbar 702 may receive the position of a headphone set relative to the screen via a user input at a controller application configured to control the system 700. In still further embodiments, if the Soundbar 702 is not positioned above or below the screen, but the position of the Soundbar 702 relative to the screen is known, then the Soundbar 702 can use any of the aforementioned methods to determine the position of a headphone set relative to the Soundbar 702, and then determine the position of the headphone set relative to the screen based on (i) the position of the Soundbar 702 relative to the screen and (ii) the position of the headphone set relative to the Soundbar 702.

In operation, each of the channel streams 802-804 contains surround sound audio information for playback by one of the headphone sets 722*a* or 722*b*. In the example shown in FIG. 8, the Soundbar 702 generates channel stream 802 for headphone set 722*a* and channel stream 804 for headphone set 722*b*. Channel stream 802 includes (i) a left subchannel 1L comprising audio information for playback via one or more left speakers of the first headphone set 722*a*, and (ii) a right subchannel 1R comprising audio information for playback via one more right speakers of the first headphone set 722*a*. And channel stream 804 includes (i) a left subchannel 2L comprising audio information for playback via one or more left speakers of the second headphone set 722*b*, and (ii) a right subchannel 2R comprising audio information for playback via one more right speakers of the second headphone set 722*b*. However, in other embodiments, the Soundbar 702 may generate two channel streams for each headphone set rather than a single channel stream with two subchannels as show in FIG. 8. In some embodiments, each of the channel streams 802-804 also includes playback timing information for the audio information transmitted via the channel stream.

In some embodiments, generating the plurality of channel streams 802-804 includes the Soundbar 702 generating, for each channel stream (or for channel streams with multiple subchannels, generating for each subchannel of the channel stream), a series of frames (or packets, cells, or similar) comprising the surround sound audio information for the channel stream (or subchannel thereof), where each frame includes at least a portion of the surround sound audio information of the channel stream (or subchannel thereof). In embodiments where each of the channel streams 802-804 includes playback timing information for the surround sound audio information transmitted via the channel streams 802-804, generating the plurality of channel streams 802-804 additionally includes the Soundbar 702 generating, for each channel stream, playback timing for the surround sound audio information within the frames (or packets, cells, or similar) of the channel stream.

In some embodiments, individual frames in the series of frames include both (i) a portion of the surround sound audio information and (ii) playback timing for that portion of the surround sound audio information in the frame. In some embodiments, each frame in the series of frames includes both (i) a portion of the surround sound audio information and (ii) playback timing for that portion of the surround sound audio information in the frame. As described previously, the playback timing for an individual frame includes a future time, relative to the clock time of the Soundbar 702, at which the surround sound audio information in the frame is to be played by the headphone set configured to play that surround sound audio information.

In some embodiments of the example timing diagram 800, individual channel streams (or subchannels thereof) comprise the above-described plurality of frames comprising portions of surround sound audio information and playback timing for the surround sound audio information.

For example, in some embodiments, channel stream 802 includes two subchannels, where the first subchannel includes a plurality of frames represented as $1L_0$-$1L_{10}$, and where the second subchannel includes a plurality of frames represented as $1R_0$-$1R_{10}$, where each of $1L_0$-$1L_{10}$ and $1R_0$-$1R_{10}$ represents one frame, and where each frame comprises a portion of the surround sound audio information to be played by the first headphone set 722*a*. In some embodiments, the channel steam 802 includes playback timing for the individual frames in the channel stream 802. For example, in some embodiments, each frame includes playback timing for that portion of the surround sound audio information in the frame. In other embodiments, the channel stream 802 includes playback timing for each set of frames in each subchannel. For example, in some embodiments, the channel stream 802 includes (i) playback $timing_0$ for frames $1L_0$ and $1R_0$; (ii) playback $timing_1$ for frames $1L_1$ and $1R_1$; (iii) playback $timing_2$ for frames $1L_2$ and $1R_2$; (iv) playback $timing_3$ for frames $1L_3$ and $1R_3$; (v) playback $timing_4$ for frames $1L_4$ and $1R_4$; and so on. Similarly, in some embodiments, channel stream 804 includes two subchannels, where the first subchannel includes a plurality of frames represented as $2L_0$-$2L_{10}$, and where the second subchannel includes a plurality of frames represented as $2R_0$-$2R_{10}$, where each of $2L_0$-$2L_{10}$ and $2R_0$-$2R_{10}$ represents one frame, and where each frame comprises a portion of the surround sound audio information to be played by the second headphone set 722*b*. In some embodiments, the channel steam 804 includes playback timing for the individual frames in the channel stream 804. For example, in some embodiments, each frame includes playback timing for that portion of the surround sound audio information in the frame. In other embodiments, the channel stream 802 includes playback timing for each set of frames in each subchannel. For example, in some embodiments, the channel stream 804 includes (i) playback $timing_0$ for frames $2L_0$ and $2R_0$; (ii) playback $timing_1$ for frames $2L_1$ and $2R_1$; (iii) playback $timing_2$ for frames $2L_2$ and $2R_2$; (iv) playback $timing_3$ for frames $2L_3$ and $2R_3$; (v) playback $timing_4$ for frames $2L_4$ and $2R_4$; and so on.

Time-critical applications like distributing the multiple channel streams 802-804 comprising surround sound audio information in a real-time or substantially real-time manner to the plurality of headphone sets 722*a* and 722*b* sufficiently quickly so that the headphone sets 722*a* and 722*b* can play the surround sound content in sync with the corresponding video content (and perhaps additionally in synchrony with each other) requires striking a careful balance between frame size and corresponding frame transmission rates. Accordingly, the frame size of the frames to be transmitted via each channel stream is an important consideration for the transmission scheme. Here, frame size (or packet, cell, or similar data package size) refers to the number of audio samples in each frame.

Larger frame sizes (i.e., more audio samples per frame) can deliver more audio samples per frame to a headphone set, thereby reducing the frequency (i.e., regularity) at which the Soundbar 702 must transmit frames to the headphone set. And because each frame requires some overhead (e.g., addressing, error checking, etc.), using larger frame sizes has a better surround sound audio information to overhead ratio than using smaller frame sizes because more of the transmission bandwidth is used for surround sound audio information rather than frame overhead. However, larger frame sizes take longer to transmit than smaller frame sizes (i.e., fewer audio samples per frame), and because the LAN 720 is a shared transmission medium and prone to collisions with transmissions from other devices on the network and radio frequency (RF) interference, larger frame sizes are more prone to corruption during transmission by collisions and RF interference than smaller frame sizes, which in turn tends to increase the number of retransmissions required to deliver all the frames to all the headphone sets in the network.

On the other hand, while using smaller frame sizes tends to reduce the number of retransmissions, using smaller frame sizes increases the frequency (i.e., regularity) at which the Soundbar 702 must transmit frames to the headphone sets. Further, because, as explained previously, each frame requires some frame overhead (e.g., addressing, error checking, etc.), using a larger number of smaller-sized frames has a lower surround sound audio information to overhead ratio than a transmission scheme that uses a smaller number of larger-sized frames. Thus, using a larger number of smaller-sized frames results in more system bandwidth being used to transmit frame overhead (rather than actual surround sound audio information) as compared to using a smaller number of larger-sized frames. Additionally, using a larger number of smaller-sized frames requires the Soundbar 702 to generate more frames-per-millisecond and requires each headphone set to process more frames-per-millisecond as compared to using a smaller number of larger-sized frames.

In some embodiments, each frame of the plurality of frames in each channel stream of the plurality channel streams 802-804 comprises 256 samples of audio information, corresponding to 5.8 ms of audio at a 44.1 kHz sample rate. Other frame sizes comprising more or fewer audio samples corresponding to more or less audio content at higher or lower sample rates could be used, too, e.g., 128 samples or 512 samples. In some embodiments, the size of frames (or packets) transmitted via some channel streams may be larger or smaller than the size of frames (or packets) transmitted via other channel streams.

In the example timing diagram 800, during timeframe $\Delta T_x$, Soundbar 702 generates frame$_x$ of each channel stream (or subchannel thereof) in the plurality of channel streams 802-804. For example, during timeframe $\Delta T_0$, Soundbar 702 generates (i) frames $1L_0$ and $1R_0$ of channel stream 802 and (ii) frames $2L_0$ and $2R_0$ of channel stream 804.

Similarly, during timeframe $\Delta T_1$, Soundbar 702 generates (i) frames $1L_1$ and $1R_1$ of channel stream 802 and (ii) frames $2L_1$ and $2R_1$ of channel stream 804.

During timeframe $\Delta T_2$, Soundbar 702 generates (i) frames $1L_2$ and $1R_2$ of channel stream 802 and (ii) frames $2L_2$ and $2R_2$ of channel stream 804.

During timeframe $\Delta T_3$, Soundbar 702 generates (i) frames $1L_3$ and $1R_3$ of channel stream 802 and (ii) frames $2L_3$ and $2R_3$ of channel stream 804.

In operation, the Soundbar 702 continues to generate frames for each of the channel streams 802-804 in this manner until the Soundbar 702 ceases to receive surround sound content from the surround sound source.

c. Transmitting Channel Streams

The Soundbar 702 also transmits channel streams 802-804 to the headphone sets 722*a* and 722*b* via the LAN 720. Region 818 of timing diagram 800 shows the transmission of channel streams from the Soundbar 702 to the headphone sets 722*a* and 722*b*.

In the example shown in FIG. 8, the Soundbar transmits two frames of surround sound audio information to each headphone set during each transmit time interval. For example, after a time delay of 1t to accumulate frames for transmission, Soundbar 702 begins transmitting frames comprising surround sound audio information to the headphone sets 722*a* and 722*b*.

In the example shown in FIG. 8, during timeframe $\Delta T_X$, Soundbar 702 transmits (a) the $1L_{X-1}$ and $1R_{X-1}$ frames of channel stream 802 to headphone set 722*a*, and (b) $2L_{X-1}$ and $2R_{X-1}$ frames of channel stream 804 to headphone set 722*b*. For example, during timeframe $\Delta T_1$, Soundbar 702 transmits (a) the $1L_0$ and $1R_0$ frames of channel stream 802 to headphone set 722*a*, and (b) $2L_0$ and $2R_0$ frames of channel stream 804 to headphone set 722*b*. During timeframe $\Delta T_2$, Soundbar 702 transmits (a) the $1L_1$ and $1R_1$ frames of channel stream 802 to headphone set 722*a*, and (b) $2L_1$ and $2R_1$ frames of channel stream 804 to headphone set 722*b*. During timeframe $\Delta T_3$, Soundbar 702 transmits (a) the $1L_2$ and $1R_2$ frames of channel stream 802 to headphone set 722*a*, and (b) $2L_2$ and $2R_2$ frames of channel stream 804 to headphone set 722*b*.

In operation, the Soundbar 702 continues to transmit frames for each of the channel streams 802 and 804 to their corresponding headphone sets 722*a* and 722*b* in this manner until the Soundbar 702 ceases to receive surround sound content from the surround sound source.

Although the timing diagram 800 shows fairly even and consistent transmission of frames (or sets of frames) from the Soundbar 702 to the individual headphone sets 722*a* and 722*b*, in practice, the actual transmission times (and durations) may fluctuate within a particular time interval, and some transmissions may even occur in a later interval because of contentions when seizing the RF channel for transmission, collisions and backoffs, RF interference, retransmissions, processor delays, and/or other computing and/or network situations that may cause minor irregularities and/or inconsistencies in the transmission and reception of the frames between the Soundbar 702 and the headphone sets 722*a* and 722*b*.

And as described above, in some embodiments, the Soundbar 702 and the headphone sets 722*a* and 722*b* are configured to use different MCSs based on the number of headphone sets in simultaneous operation. When only the first headphone set 722*a* is active and in communication with the Soundbar 702, the Soundbar 702 uses a first MCS to transmit channel stream 802 to the first headphone set 722*a*. And when both the first headphone set 722*a* and the second headphone set 722*b* are active and in communication with the Soundbar 702, the Soundbar 702 uses a second MCS to transmit both (a) channel stream 802 to the first headphone set 722*a* and (b) channel stream 804 to the second headphone set 72*b*. In such embodiments, the first MCS has lower data throughput and a higher wireless link margin than the second MCS, i.e., the second MCS has higher data throughput and a lower wireless link margin than the first MCS.

d. Headphone Sets Playing Surround Sound Audio Content from Channel Streams

Each headphone set receives its corresponding channel stream from the Soundbar 702 via the LAN 720. After receiving a channel stream, an individual headphone set processes the channel stream to extract the surround sound audio information from the channel stream, and then uses the surround sound audio information, the playback timing information, and clock information to play the surround sound audio information in sync (or at least substantially in sync) with its corresponding video content.

Region 820 of timing diagram 800 shows when the headphone sets 722*a* and 722*b* play corresponding portions of the surround sound content. In operation, the headphone sets 722*a* and 722*b* each play surround sound audio information of their corresponding channel streams based on playback timing and clock timing as described earlier in detail herein.

During timeframe $\Delta T_{10}$, the first headphone set 722*a* plays the surround sound audio information received via channel stream 802 (i.e., the audio information in frames $1L_0$ and $1R_0$) and the second headphone set 722*b* plays the surround sound audio information received via channel stream 804 (i.e., the audio information in frames $2L_0$ and $2R_0$). During timeframe $\Delta T_{10}$, the first headphone set 722*a* plays the surround sound audio information that the Soundbar 702 generated at time $\Delta T_0$ and transmitted to the first headphone set 722*a* via channel stream 802 (i.e., the audio information in frames $1L_0$ and $1R_0$) and the second headphone set 722*b* plays the surround sound audio information that the Soundbar 702 generated at time $\Delta T_0$ and transmitted to the second headphone set 722*b* via channel stream 804 (i.e., the audio information in frames $2L_0$ and $2R_0$). During timeframe $\Delta T_{11}$, the first headphone set 722*a* plays the surround sound audio information that the Soundbar 702 generated at time $\Delta T_1$ and transmitted to the first headphone set 722*a* via channel stream 802 (i.e., the audio information in frames $1L_1$ and $1R_1$) and the second headphone set 722*b* plays the surround sound audio information that the Soundbar 702 generated at time $\Delta T_1$ and transmitted to the second headphone set 722*b* via channel stream 804 (i.e., the audio information in frames $2L_1$ and $2R_1$).

In operation, each headphone set continues to receive, process, and play surround sound content while the Soundbar 702 continues to transmit channel stream(s) comprising surround sound audio information to the headphone set.

VII. Example Methods

Figure 9:
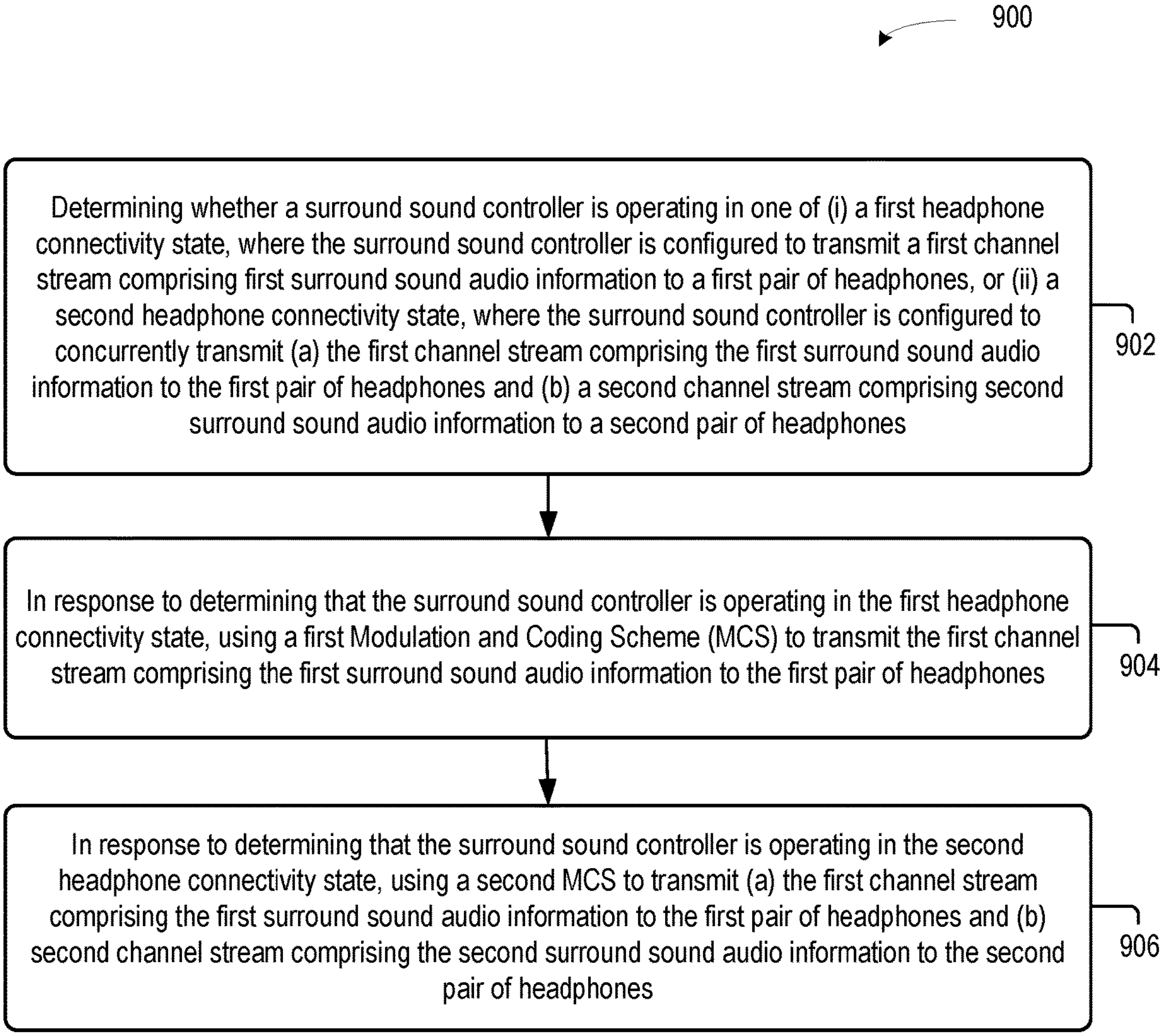
FIG. 9 shows an example method for generating and transmitting surround sound audio information to multiple sets of wireless headphones according to some embodiments.

FIG. 9 shows an example method 900 for generating and transmitting surround sound audio information to multiple sets of wireless headphones according to some embodiments.

Example method 900 includes and describes certain functions performed by a soundbar component, such as Soundbar 702. However, method 900 and/or aspects thereof could be performed by any other type of device comprising one or more processors configured to perform the features and functions described in method 900, including but not limited to one or more of a different type of playback device, a television, a computing device, an audio/video controller, a set-top box, a media streaming device (e.g., an AppleTV®, Amazon Fire®, Roku®, or similar), a gaming console, or similar devices now known or later developed, acting individually or in concert with each other.

Method 900 begins at block 902, which includes determining whether the surround sound controller is operating in one of (i) a first headphone connectivity state, where the surround sound controller is configured to transmit a first channel stream comprising first surround sound audio information to a first pair of headphones, or (ii) a second headphone connectivity state, where the surround sound controller is configured to concurrently transmit (a) the first channel stream comprising the first surround sound audio information to the first pair of headphones and (b) a second channel stream comprising second surround sound audio information to a second pair of headphones.

Next, method 900 advances to block 904, which includes in response to determining that the surround sound controller is operating in the first headphone connectivity state, using a first Modulation and Coding Scheme (MCS) to transmit the first channel stream comprising the first surround sound audio information to the first pair of headphones. Some embodiments additionally include, while the surround sound controller is operating in the first headphone connectivity state, generating the first channel stream.

In some embodiments, in response to determining that the surround sound controller is operating in the first headphone connectivity state, block 904 additionally includes determining a position of the first pair of headphones in a listening area, and generating the first channel stream comprising the first surround sound audio information based on audio content, audio object data, and the position of the first pair of headphones. In some embodiments, determining the position of the first pair of headphones in the listening area comprises determining the position of the first pair of headphones relative to a screen configured to display video content associated with the surround sound content.

Next, method 900 advances to block 906, which includes in response to determining that the surround sound controller is operating in the second headphone connectivity state, using a second MCS to transmit (a) the first channel stream comprising the first surround sound audio information to the first pair of headphones and (b) second channel stream comprising the second surround sound audio information to the second pair of headphone. In some embodiments, the first MCS corresponds to a lower data rate at a higher wireless link margin than the second MCS. Some embodiments additionally include, while the surround sound controller is operating in the second headphone connectivity state, generating the first channel stream and generating the second channel stream.

In some embodiments, using the second MCS to transmit (a) the first channel stream comprising the first surround sound audio information to the first pair of headphones and (b) second channel stream comprising the second surround sound audio information to the second pair of headphones includes (1) during a first time interval, transmitting a first frame of the first channel stream to the first pair of headphones and a first frame of the second channel stream to the second pair of headphones, and (2) during a second time interval following the first time interval, transmitting a second frame of the first channel stream to the first pair of headphones and a second frame of the second channel stream to the second pair of headphones. In some embodiments, each of the first time interval and the second time interval is about 2.9 ms, and an individual frame comprises about 5.8 ms of surround sound audio information In some embodiments, in response to determining that the surround sound controller is operating in the second headphone connectivity state, block 906 additionally includes (i) determining the position of the first pair of headphones in the listening area, and generating the first channel stream comprising the first surround sound audio information based on audio content, audio object data, and the position of the first pair of headphones, and (ii) determining a position of the second pair of headphones in the listening area, and generating the second channel stream comprising second surround sound audio information based on audio content, audio object data, and the position of the second pair of headphones. In some embodiments, determining the position of the first pair of headphones in the listening area comprises determining the position of the first pair of headphones relative to a screen configured to display video content associated with the surround sound content, and determining the position of the second pair of headphones in the listening area comprises determining the position of the second pair of headphones relative to a screen configured to display video content associated with the surround sound content.

In some embodiments, method 900 additionally includes receiving surround sound content comprising audio content and audio object data. In some embodiments, an individual channel stream is based on the audio content and audio object data.

In some embodiments, an individual channel stream comprises a plurality of frames, and an individual frame comprises at least a portion of a left subchannel of the individual channel stream and at least a portion of a right subchannel of the individual channel stream. In some embodiments, an individual frame of an individual channel stream comprises 256 bytes of surround sound audio information for a left subchannel of the individual channel stream and 256 bytes of surround sound audio information for a right subchannel of the individual channel stream.

Figure 10:
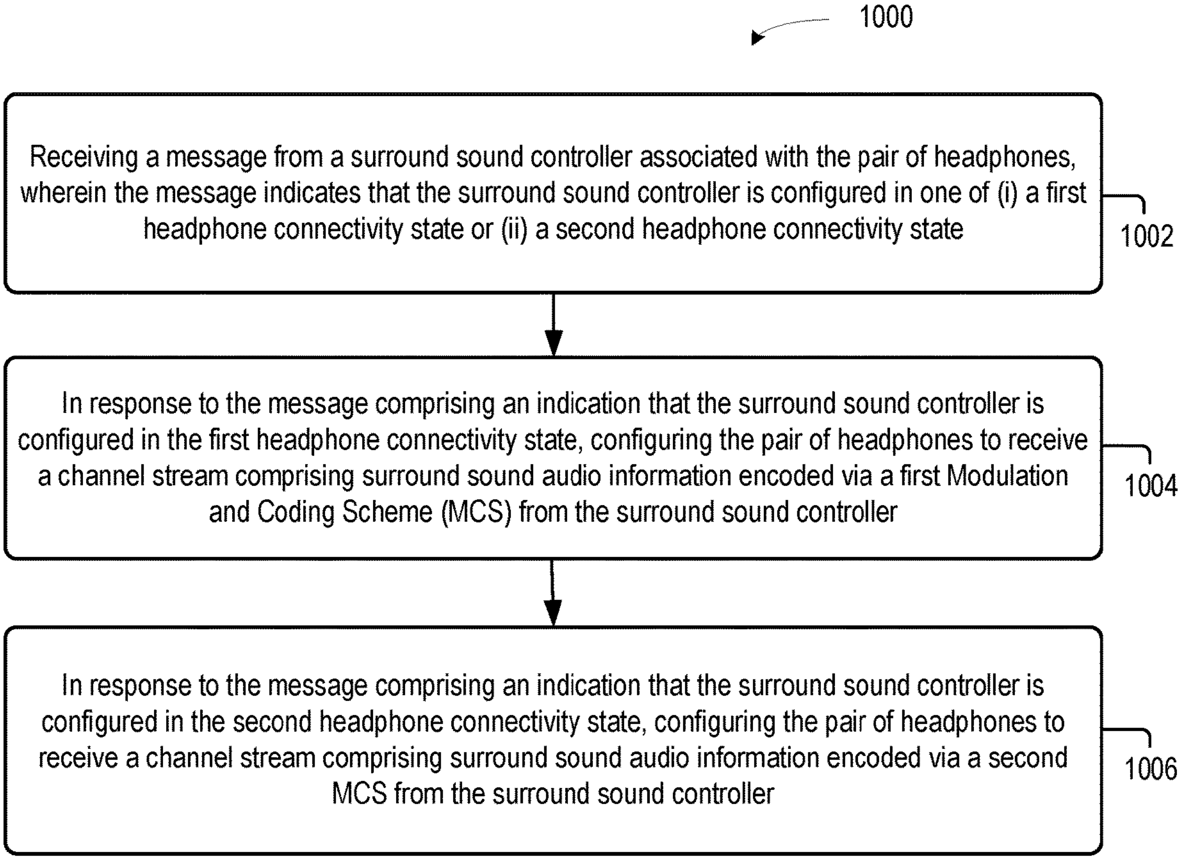
FIG. 10 shows an example method of receiving and processing surround sound audio information at a set of wireless headphones according to some embodiments.

FIG. 10 shows an example method 1000 of receiving and processing surround sound audio information at a set of wireless headphones according to some embodiments.

Example method 1000 includes and describes certain functions performed by a headphone set, such as headphone set 722*a* or headphone set 722*b*.

Method 1000 begins at block 1002, which includes receiving a message from a surround sound controller associated with the pair of headphones, wherein the message indicates that the surround sound controller is configured in one of (i) a first headphone connectivity state or (ii) a second headphone connectivity state.

Next, method 1000 advances to block 1004, which includes in response to the message comprising an indication that the surround sound controller is configured in the first headphone connectivity state, configuring the pair of headphones to receive a channel stream comprising surround sound audio information encoded via a first Modulation and Coding Scheme (MCS) from the surround sound controller.

Next, method 1000 advances to block 1006, which includes in response to the message comprising an indication that the surround sound controller is configured in the second headphone connectivity state, configuring the pair of headphones to receive a channel stream comprising surround sound audio information encoded via a second MCS from the surround sound controller. In some embodiments, the first MCS corresponds to a lower data rate at a higher wireless link margin than the second MCS.

In some embodiments, the channel stream comprises a plurality of frames, and an individual frame comprises at least a portion of a left subchannel of the channel stream and at least a portion of a right subchannel of the channel stream. In some embodiments, an individual frame of the channel stream comprises 256 bytes of surround sound audio information for a left subchannel of the channel stream and 256 bytes of surround sound audio information for a right subchannel of the channel stream.

In some embodiments, the channel stream is based on audio content and audio object data. In some embodiments, the channel stream is based on audio content, audio object data, and a position of the pair of headphones relative to a screen configured to display video content associated with the surround sound audio information.

With regard to the position of the headphone set relative to the screen configured to display video content associated with the surround sound information, in some embodiments, method 1000 additionally includes the pair of headphones transmitting, to the surround sound controller, an indication of the position of the pair of headphones relative to a screen configured to display video content associated with the surround sound audio information. In some embodiments, method 1000 additionally or alternatively includes the pair of headphones transmitting a signal (e.g., a wireless and/or acoustic signal) to the surround sound controller, wherein the signal is sufficient for use by the surround sound controller in determining the position of the pair of headphones relative to the screen configured to display video content associated with the surround sound audio information.

VIII. Conclusion

The above discussions relating to playback devices, controller devices, playback zone configurations, and media/audio content sources provide only some examples of operating environments within which functions and methods described below may be implemented. Other operating environments and configurations of media playback systems, playback devices, and network devices not explicitly described herein may also be applicable and suitable for implementation of the functions and methods.

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only ways) to implement such systems, methods, apparatus, and/or articles of manufacture.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the foregoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

The invention claimed is:

1. A media playback system, comprising:
- a network device that comprises a hardware interface, wherein the hardware interface facilitates operably coupling the network device to a display device, wherein the network device is separate from and moveable in relation to a position of the display device;
- a wearable playback device;
- one or more processors; and
- memory storing instructions that, when executed by the one or more processors, cause the media playback system to perform operations comprising:
  - receiving, via the hardware interface of the network device, multichannel audio;
  - determining a first position of the wearable playback device, wherein determining the first position comprises:
    - determining a position of the wearable playback device with respect to a position of the network device;
    - approximating, based on the position of the network device, the position of the display device; and
    - approximating, based on the position of the display device, a position of the wearable playback device with respect to the position of the display device, wherein the first position of the wearable playback device comprises the position of the wearable playback device with respect to the position of the display device;
  - generating, based on the received multichannel audio and the determined first position, first audio; and
  - causing, via the wearable playback device, playback of the generated first audio.

2. The media playback system of claim 1, wherein determining the first position comprises:
- transmitting, via the network device, one or more acoustic signals from the network device; and
- receiving, via the wearable playback device, at least one portion of the transmitted one or more acoustic signals.

3. The media playback system of claim 2, wherein determining the first position comprises:
- determining, based on the transmitted one or more acoustic signals and the received at least one portion of the transmitted one or more acoustic signals, a time of flight between the transmitting of the one or more acoustic signals and the receiving of the at least one portion of the transmitted one or more acoustic signals.

4. The media playback system of claim 3, wherein determining the first position comprises determining, by the wearable playback device, the time of flight.

5. The media playback system of claim 1, wherein the wearable playback device is a first wearable playback device, wherein the media playback system further comprises a second wearable playback device, and wherein the operations further comprise:
- determining a second position of the second wearable playback device;
- generating, based on the received multichannel audio and the determined second position, second audio;
- transmitting, via the network device to the second wearable playback device, the generated second audio; and
- playing back, via the second wearable playback device, the generated second audio in substantial synchrony with playback of the generated first audio via the first wearable playback device.

6. The media playback system of claim 5, wherein the operations further comprise:
- after determining the second position, determining a third position of the second wearable playback device, wherein the third position is the same as the first position of the first wearable playback device; and
- playing back, via the second wearable device, the generated first audio.

7. The media playback system of claim 1, wherein the generated first audio corresponds to generated first wearable audio, wherein the media playback system further comprises an out-loud playback device, and wherein the operations further comprise:
- operating in a first operating mode, wherein the first operating mode includes:
  - generating, based on the received multichannel audio, out-loud audio; and
  - causing, via the out-loud playback device, playback of the generated out-loud audio; and
- operating in a second operating mode, wherein the second operating mode includes:
  - muting the out-loud playback device; and
  - playing back the generated first wearable audio via the wearable playback device.

8. The media playback system of claim 7, wherein the first operating mode comprises transmitting, via a first communication protocol, the generated out-loud audio to the out-loud playback device, and wherein the second operating mode comprises transmitting via a second communication protocol, the generated first wearable audio to the wearable playback device.

9. The media playback system of claim 8, wherein the first communication protocol comprises a direct WIFI connection, and wherein the second communication protocol comprises a BLUETOOTH connection.

10. The media playback system of claim 7, wherein the operations further comprise transitioning from the first operating mode to the second operating mode in response to a message transmitted via the wearable playback device to the network device.

11. The media playback system of claim 1, wherein generating the first audio comprises:
- mixing two or more channels of the received multichannel audio to generate first virtual surround audio data; and generating, based on the determined first position, first audio object data.

12. The media playback system of claim 11, wherein causing playback of the generated first audio comprises transmitting, via the network device to the wearable playback device, the first virtual surround audio data and the first audio object data.

13. The media playback system of claim 1, wherein causing playback of the generated first audio via the wearable playback device comprises transmitting, based on the determined first position, the generated first audio according to a first data rate via the network device to the wearable playback device, and wherein the operations further comprise:

after determining the first position of the wearable playback device, determining a second position of the wearable playback device, wherein the second position is different from the first position; and transmitting, based on the determined second position, the generated first audio according to a second data rate via the network device to the wearable playback device, wherein the second data rate is different from the first data rate.

14. The media playback system of claim 1, wherein causing playback of the generated first audio via the wearable playback device comprises playing back the generated first audio while the wearable playback device is at the first position.

15. The media playback system of claim 1, wherein the wearable playback device is separate from and wirelessly connected to the network device.

16. Non-transitory computer-readable media having stored thereon instruction code executable by one or more processors of a media playback system for causing the media playback system to perform operations comprising:

receiving, via a hardware interface of a network device of the media playback system, multichannel audio, wherein the network device is separate from and moveable in relation to a position of a display device;

determining a first position of a wearable playback device of the media playback system, wherein determining the first position comprises:

determining a position of the wearable playback device with respect to a position of the network device;

approximating, based on the position of the network device, the position of the display device; and approximating, based on the position of the display device, a position of the wearable playback device with respect to the position of the display device, wherein the first position of the wearable playback device comprises the position of the wearable playback device with respect to the position of the display device;

generating, based on the received multichannel audio and the determined first position, first audio; and causing the wearable playback device to playback the generated first audio.

17. The non-transitory computer-readable media of claim 16, wherein determining the first position comprises:

transmitting, via the network device, one or more acoustic signals from the network device; and receiving, via the wearable playback device, at least one portion of the transmitted one or more acoustic signals.

18. The non-transitory computer-readable media of claim 17, wherein determining the first position comprises:

determining, based on the transmitted one or more acoustic signals and the received at least one portion of the transmitted one or more acoustic signals, a time of flight between the transmitting of the one or more acoustic signals and the receiving of the at least one portion of the transmitted one or more acoustic signals.

19. The non-transitory computer-readable media of claim 18, wherein determining the first position comprises determining, by the wearable playback device, the time of flight.

20. The non-transitory computer-readable media of claim 16, wherein the wearable playback device is separate from and wirelessly connected to the network device.

* * * * *